United States Patent
Van Tuyl Bentley et al.

(10) Patent No.: US 10,154,228 B1
(45) Date of Patent: Dec. 11, 2018

(54) SMOOTHING VIDEO PANNING

(71) Applicant: Amazon Technologies, Inc., Seattle, WA (US)

(72) Inventors: Peter Van Tuyl Bentley, Seattle, WA (US); Mark Eugene Pearson, Mercer Island, WA (US); Robert James Hanson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 14/757,419

(22) Filed: Dec. 23, 2015

(51) Int. Cl.
*H04N 5/77* (2006.01)
*H04N 5/232* (2006.01)
*G11B 27/031* (2006.01)
*G06K 9/00* (2006.01)

(52) U.S. Cl.
CPC ......... *H04N 5/772* (2013.01); *G06K 9/00744* (2013.01); *G06K 9/00758* (2013.01); *G11B 27/031* (2013.01); *H04N 5/23216* (2013.01); *H04N 5/23238* (2013.01)

(58) Field of Classification Search
None
See application file for complete search history.

(56) References Cited

U.S. PATENT DOCUMENTS

2016/0112629 A1* 4/2016 Lee ............... H04N 7/183 348/39
2016/0381323 A1* 12/2016 Garcia, III ............ G06T 19/006 348/38

* cited by examiner

Primary Examiner — Heather R Jones
(74) Attorney, Agent, or Firm — Pierce Atwood LLP

(57) ABSTRACT

Devices, systems and methods are disclosed for smoothing rendering data (e.g., panning data and/or magnification data) prior to rendering a video clip. The rendering data may be recorded using a first sampling rate and the system may determine Bézier points using a second sampling rate. The Bézier points may be aligned with the rendering data and may be used to generate smoothed rendering data. The smoothed rendering data may be used to render a video clip that may be displayed to a user. If the user inputs additional rendering data during playback of the video clip, the system may generate second smoothed rendering data. For example, the system may record additional rendering data for a second half of the video clip and generate second smoothed rendering data, including a first half of the first smoothed rendering data, based on the additional rendering data.

20 Claims, 45 Drawing Sheets

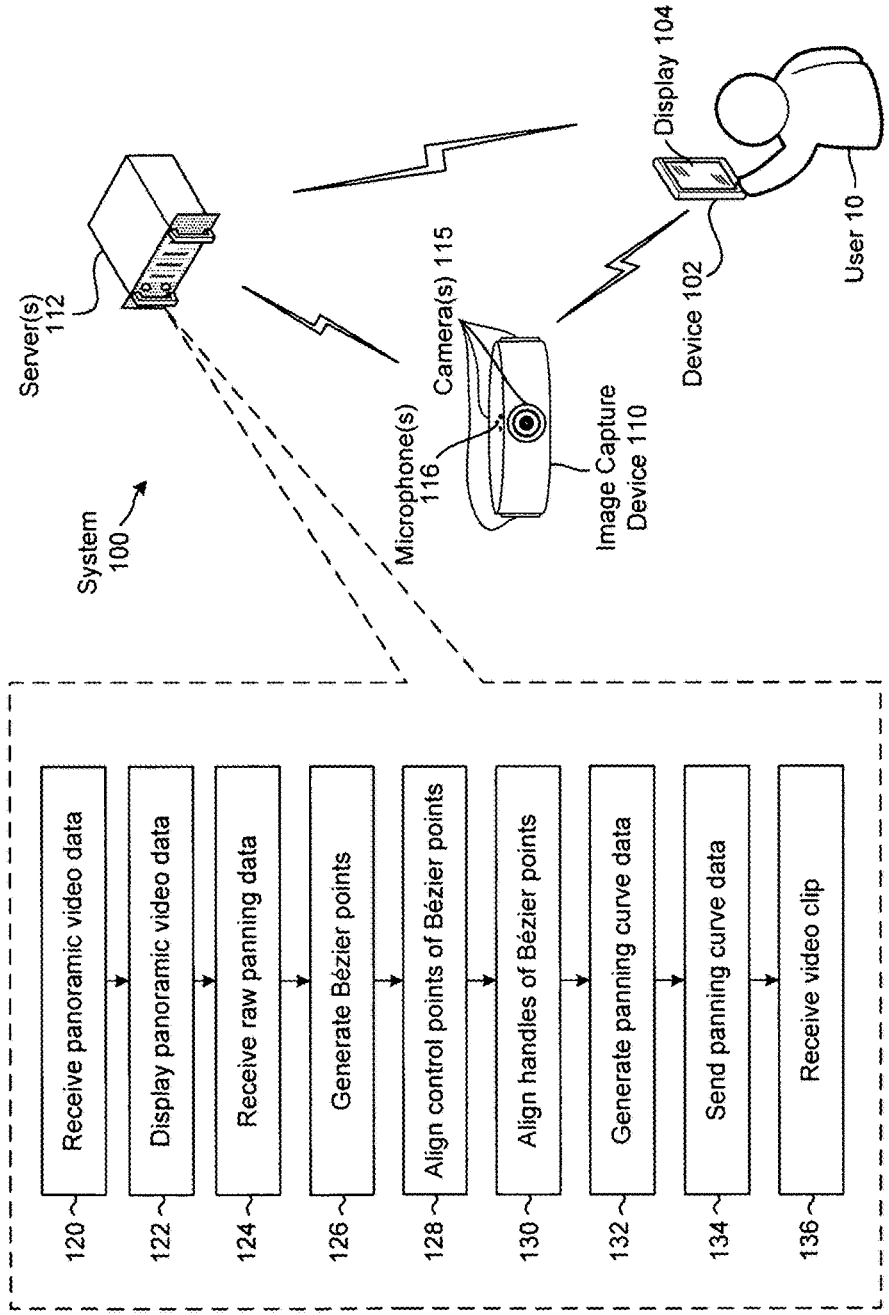

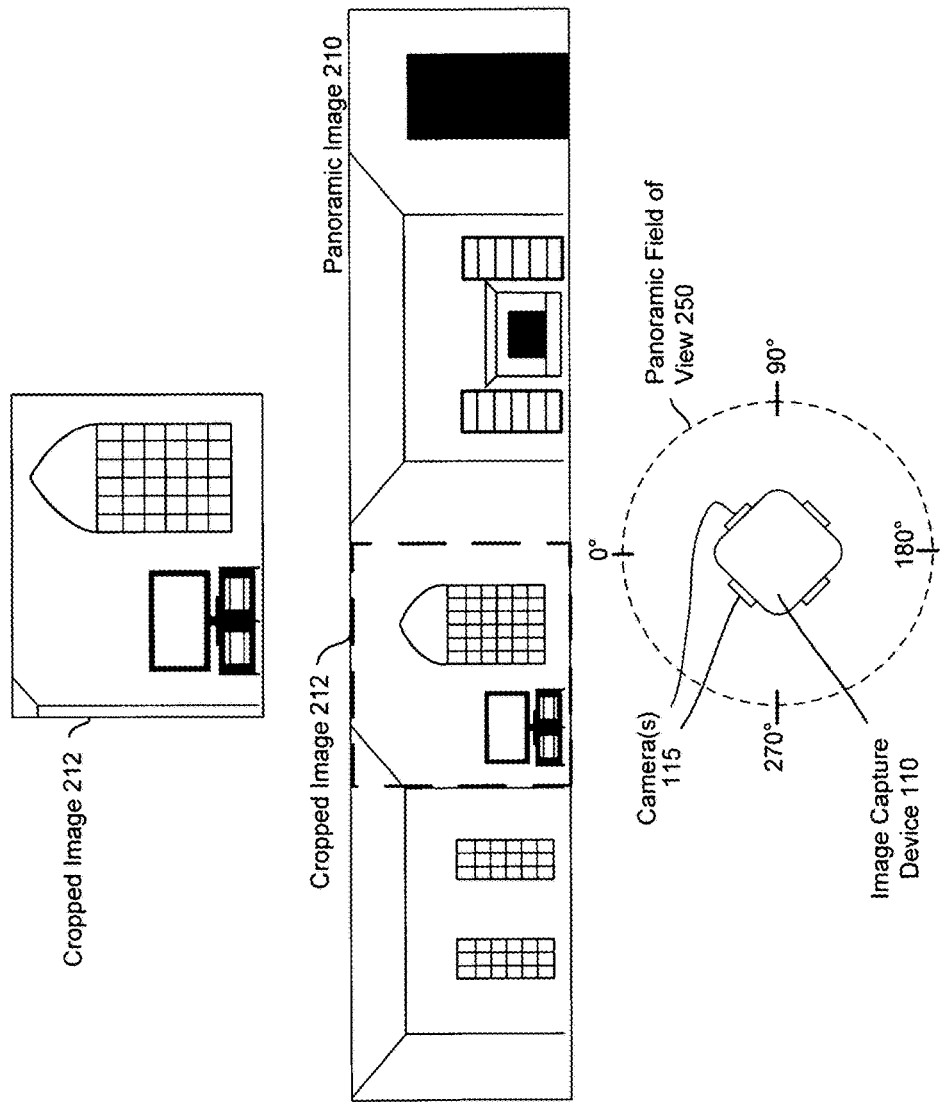

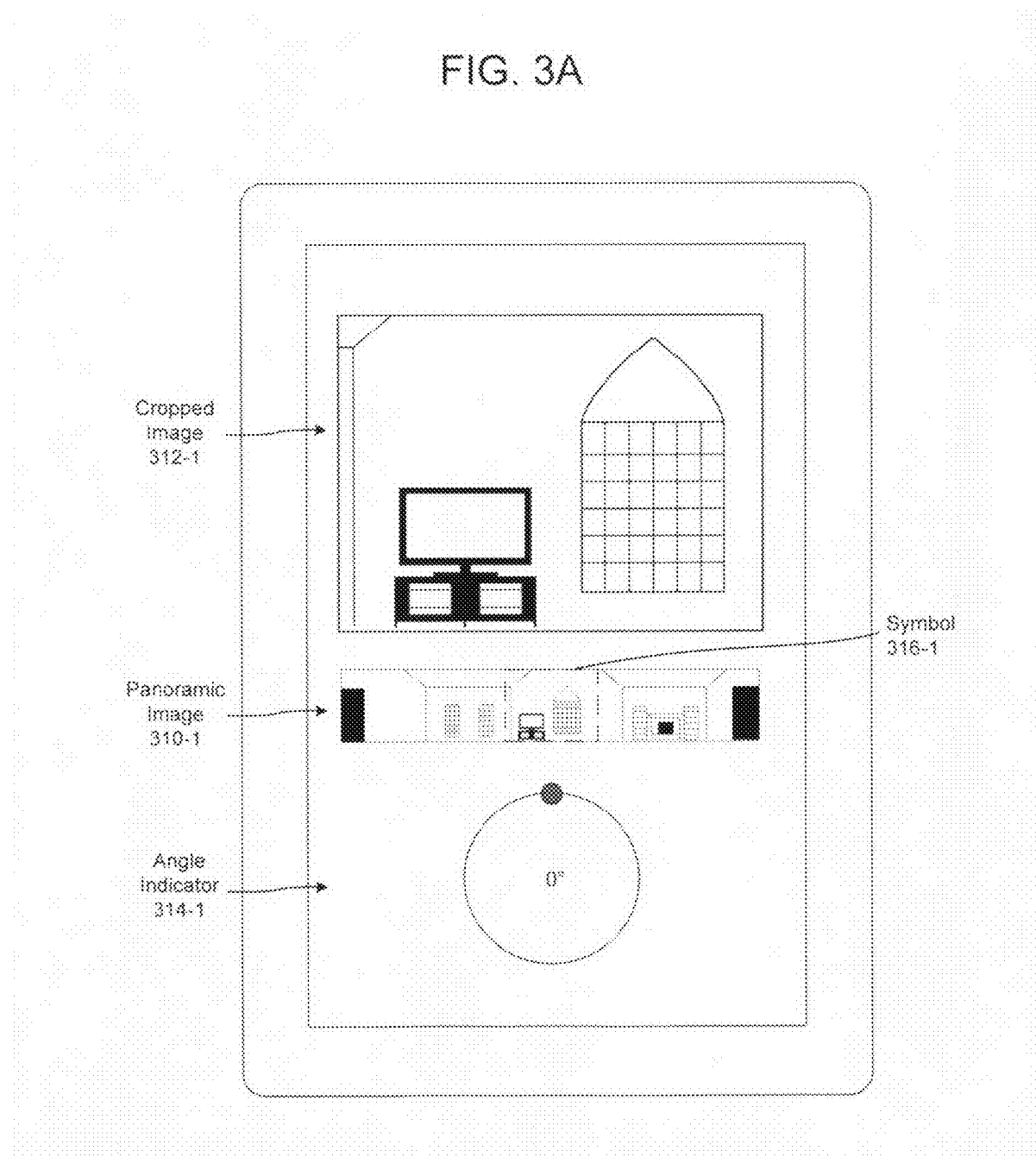

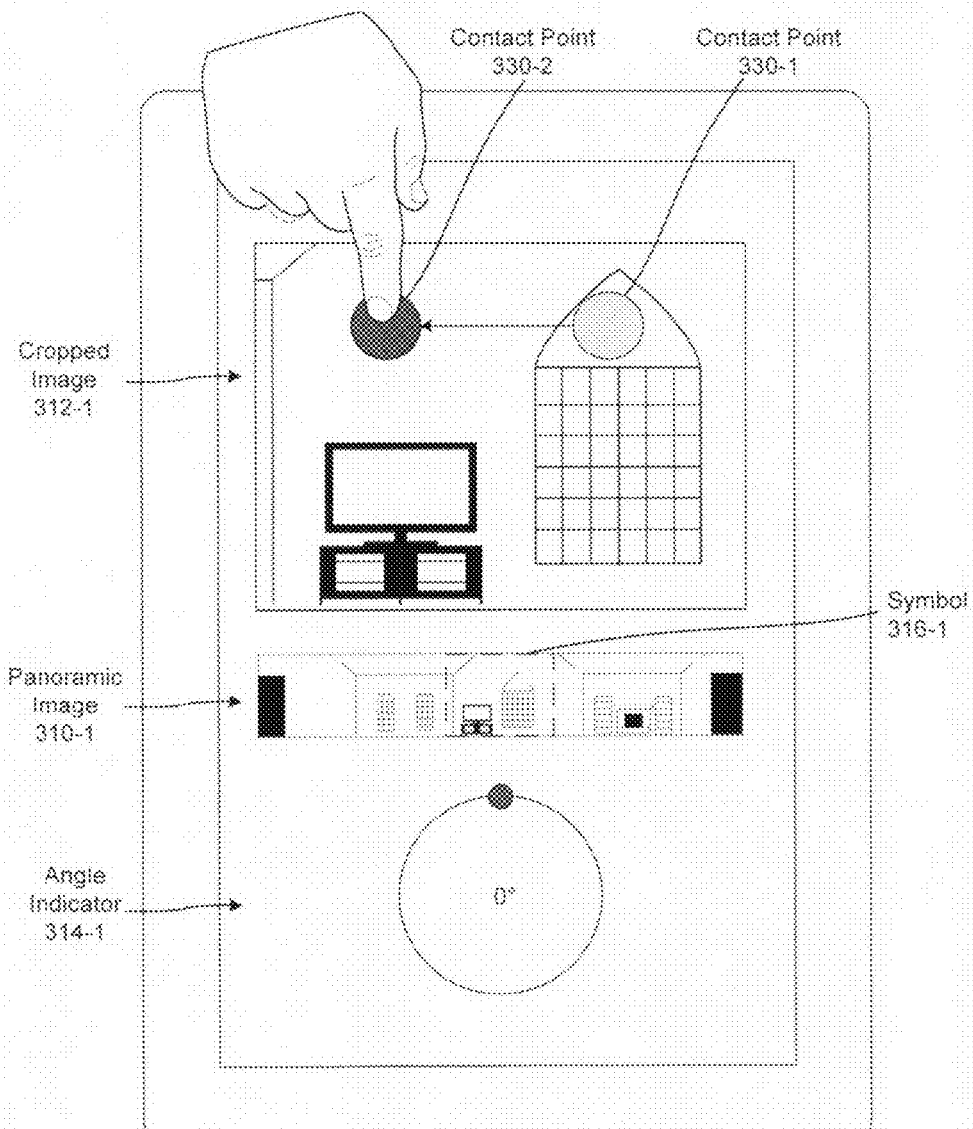

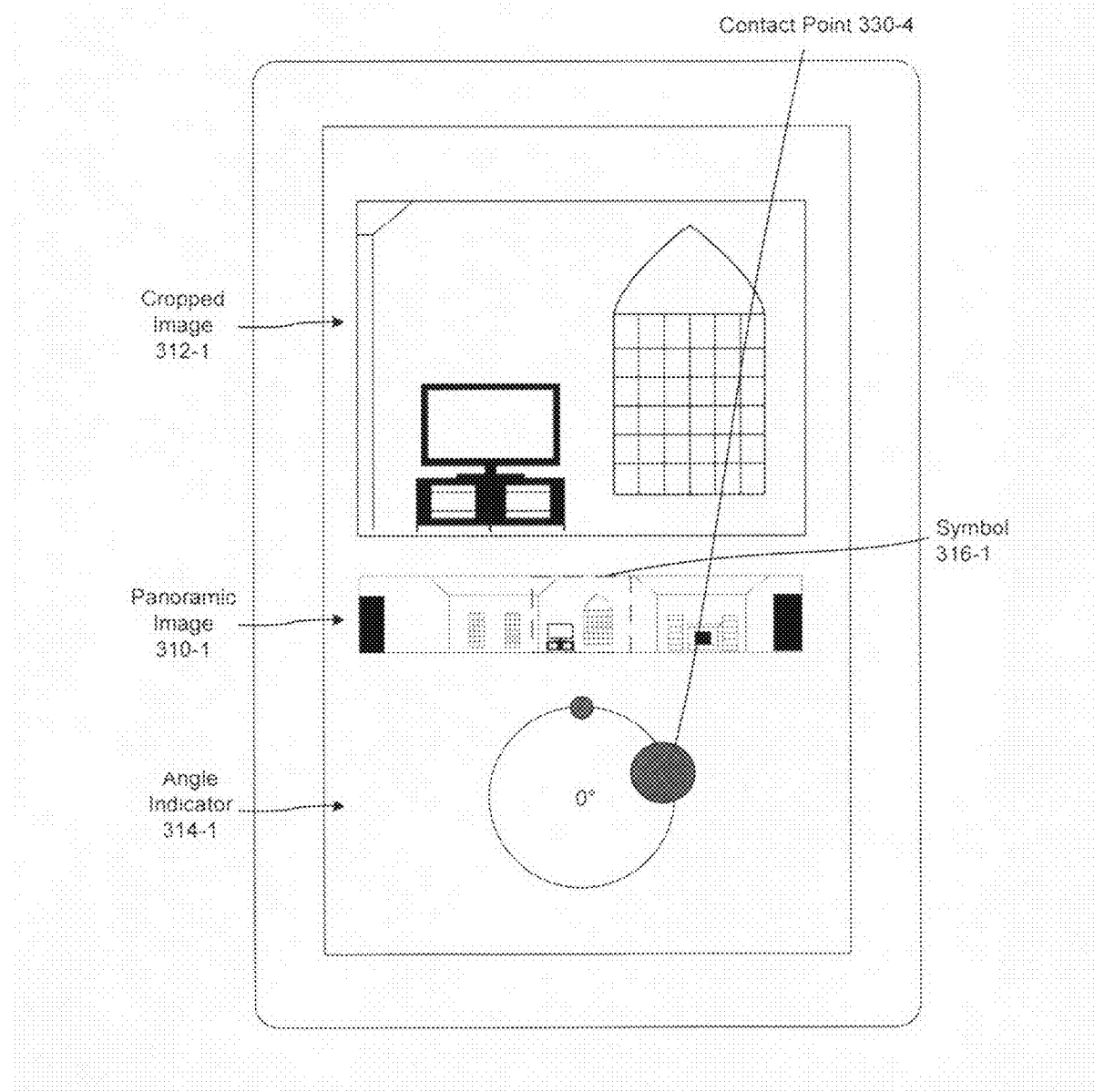

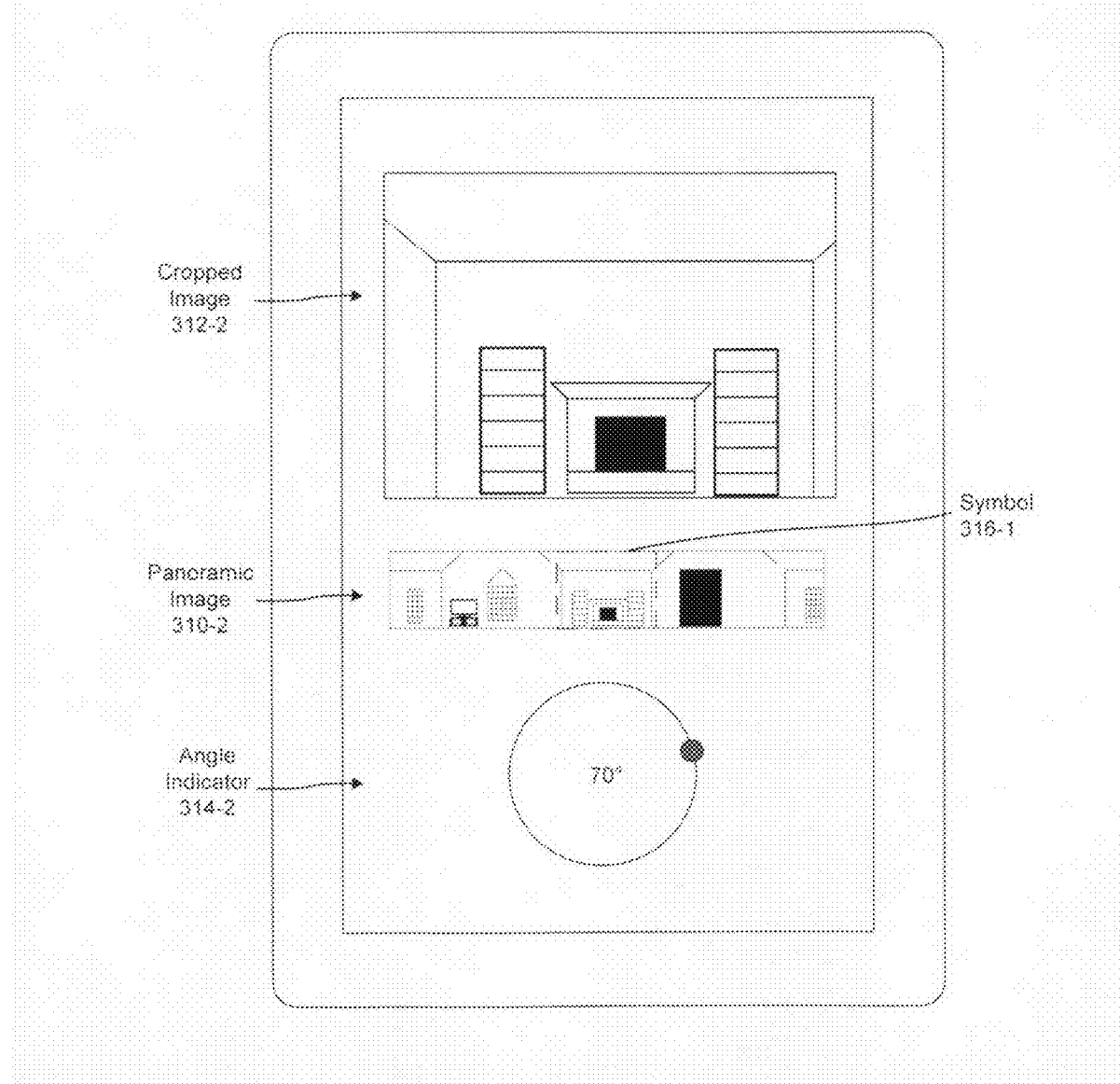

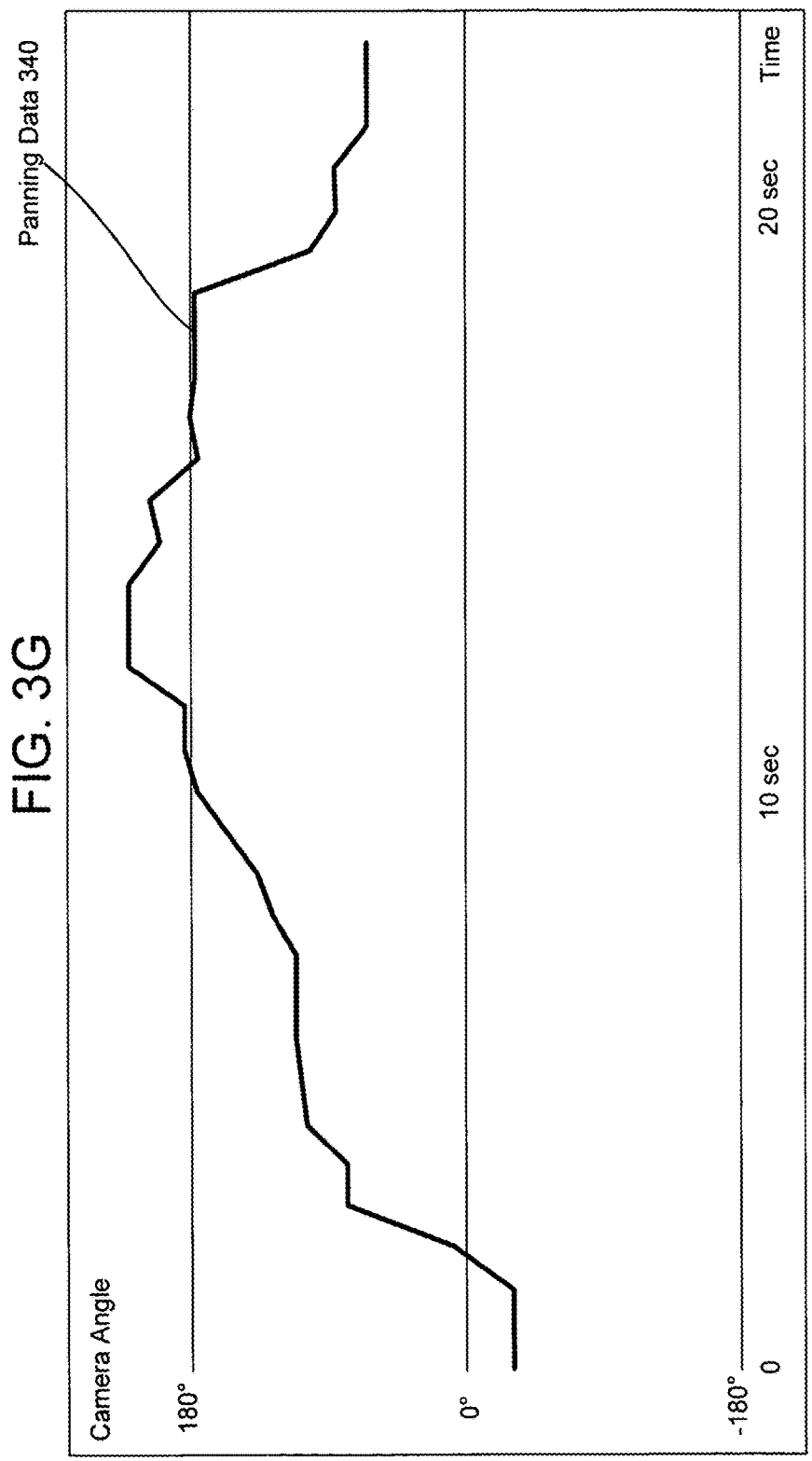

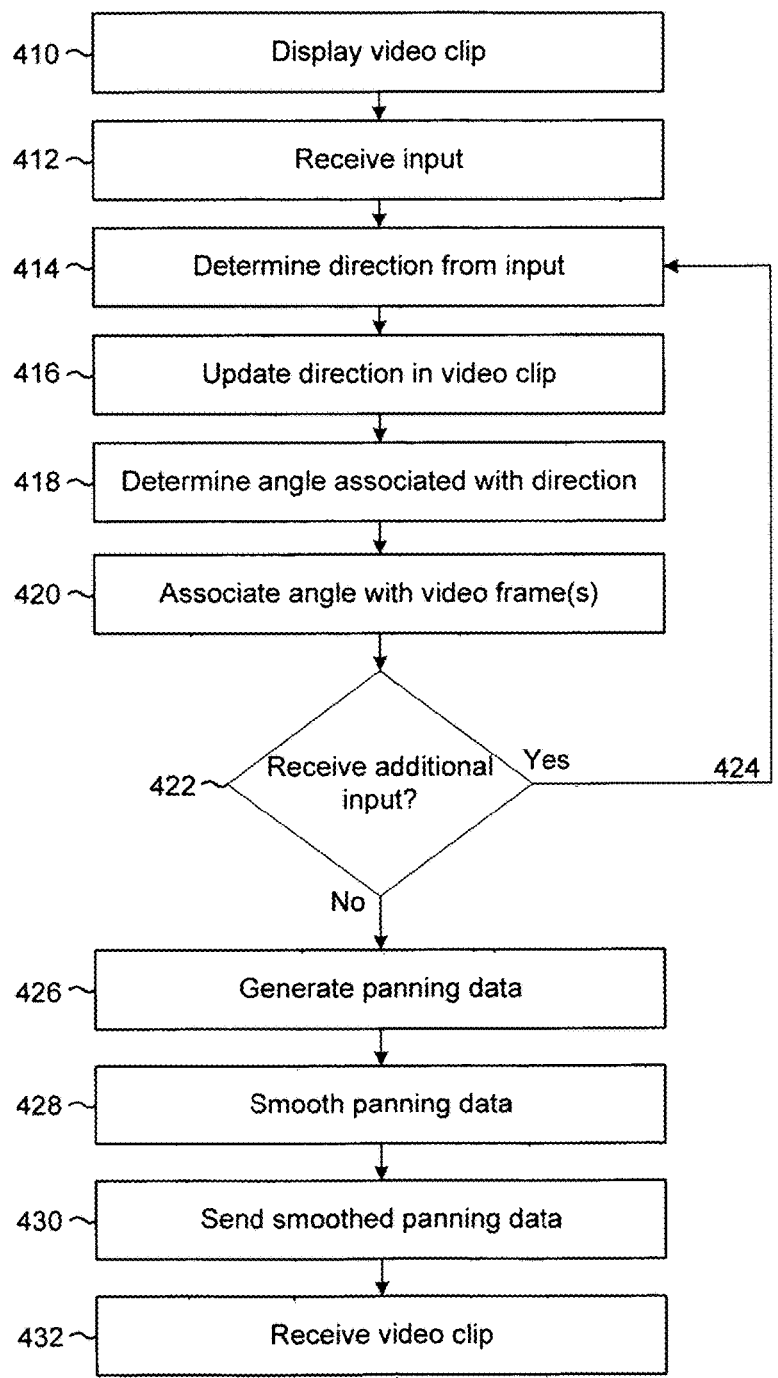

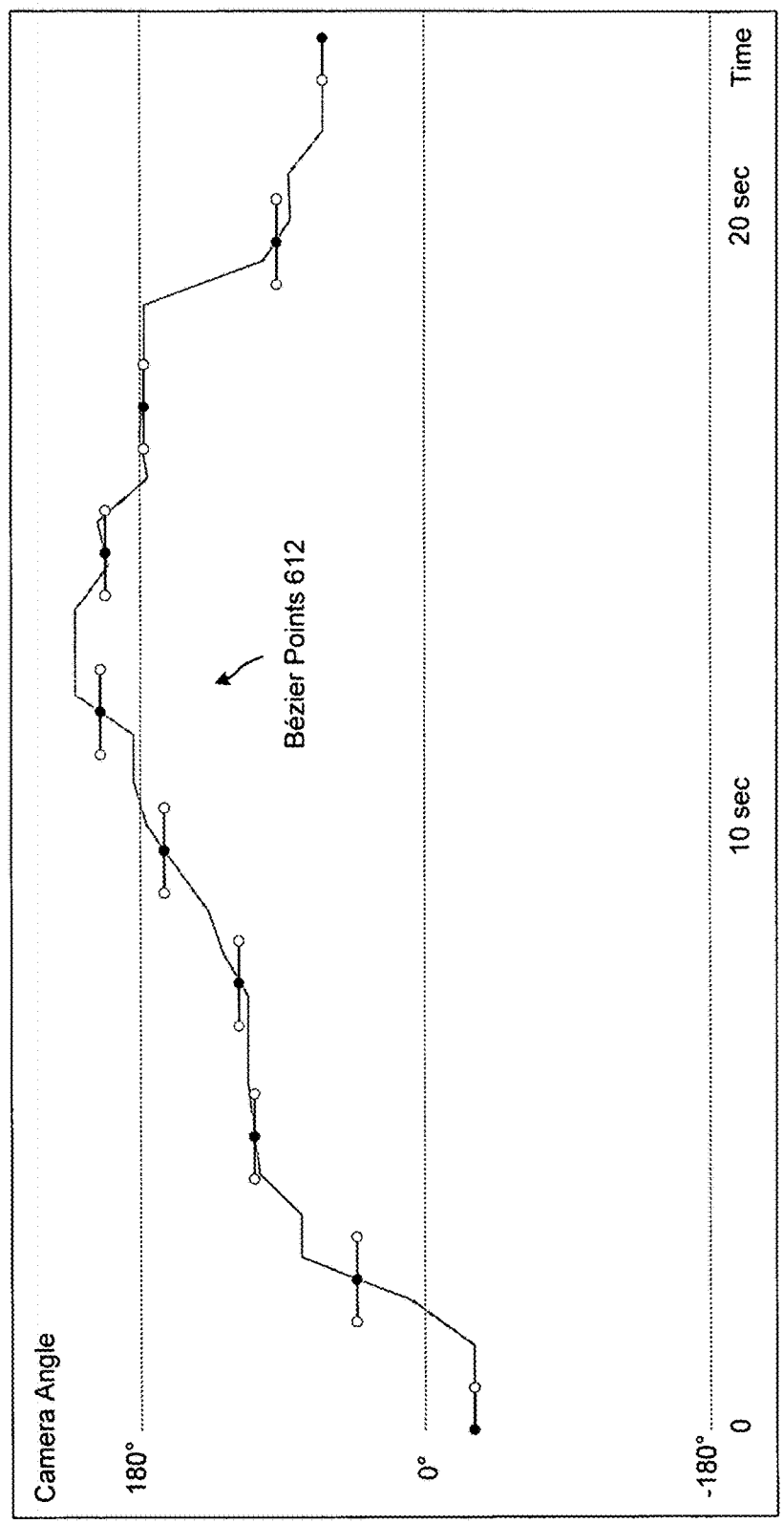

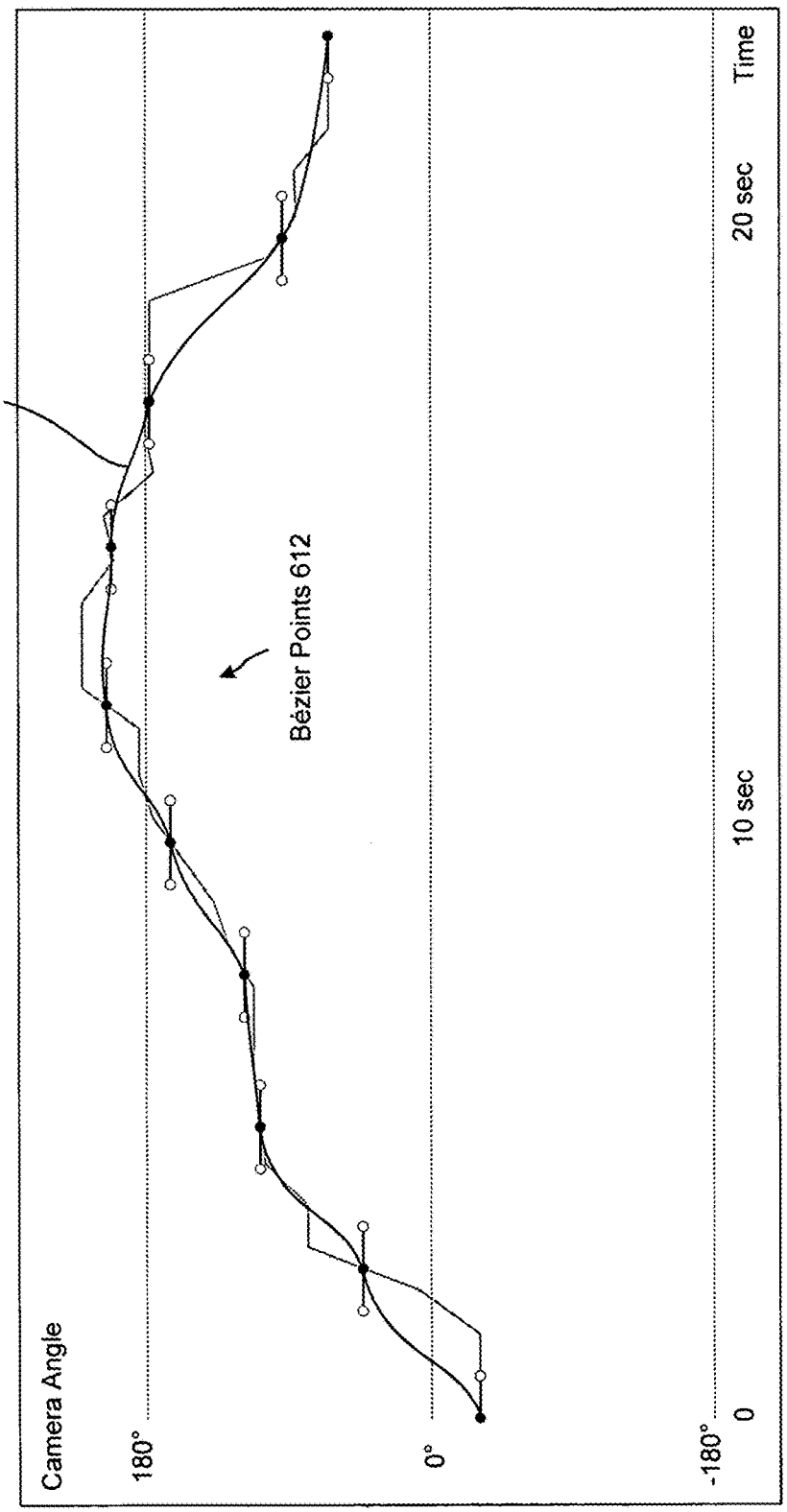

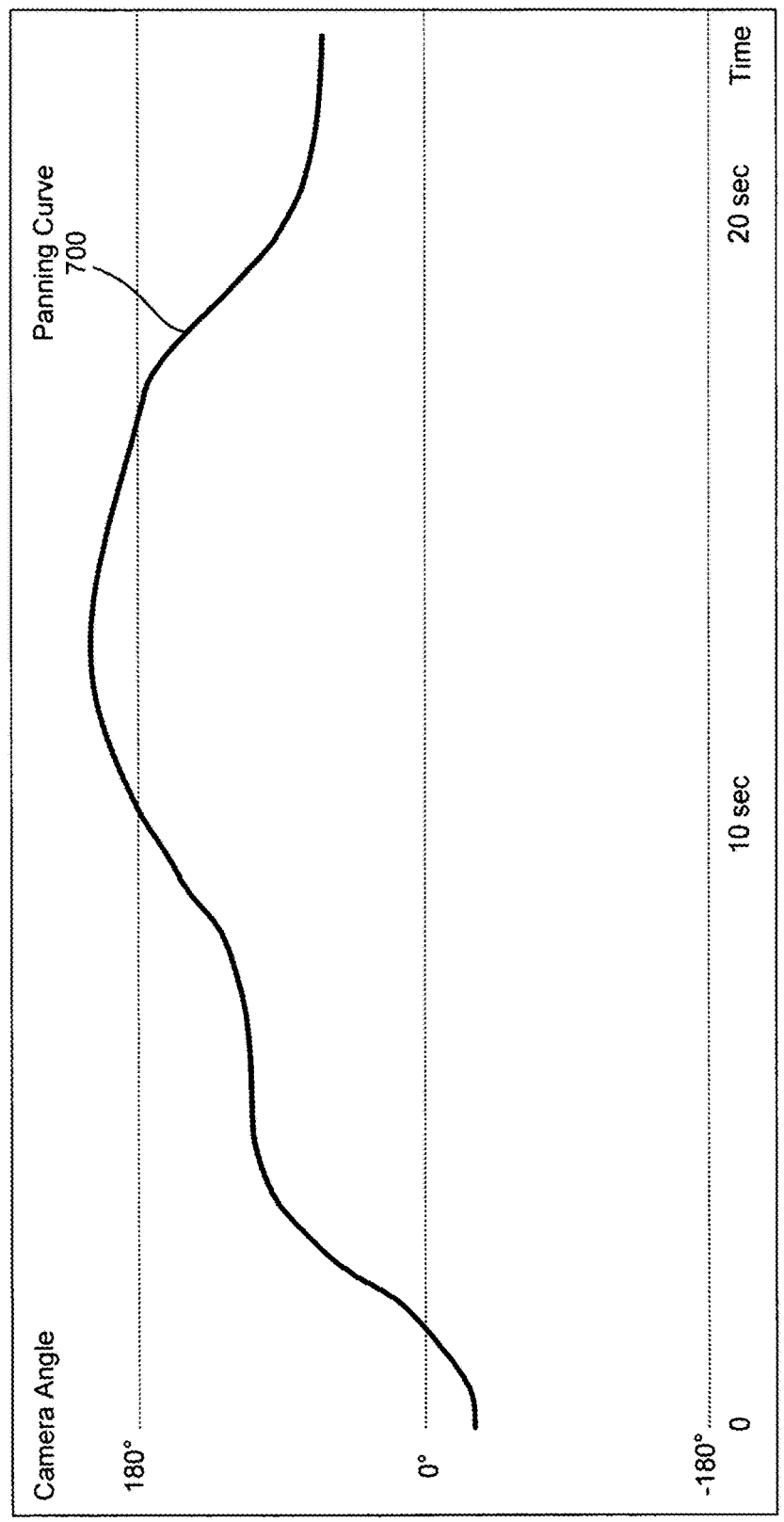

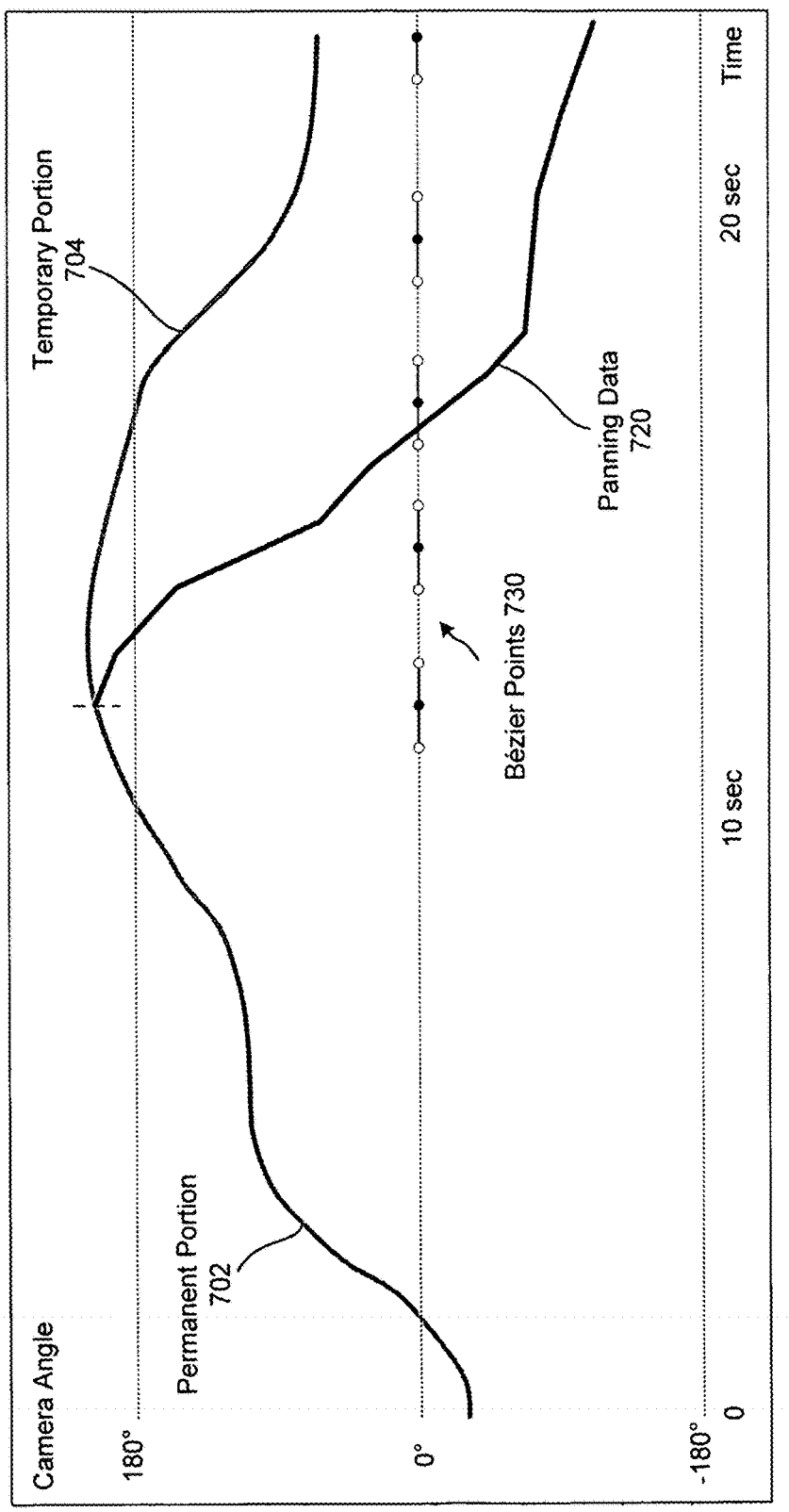

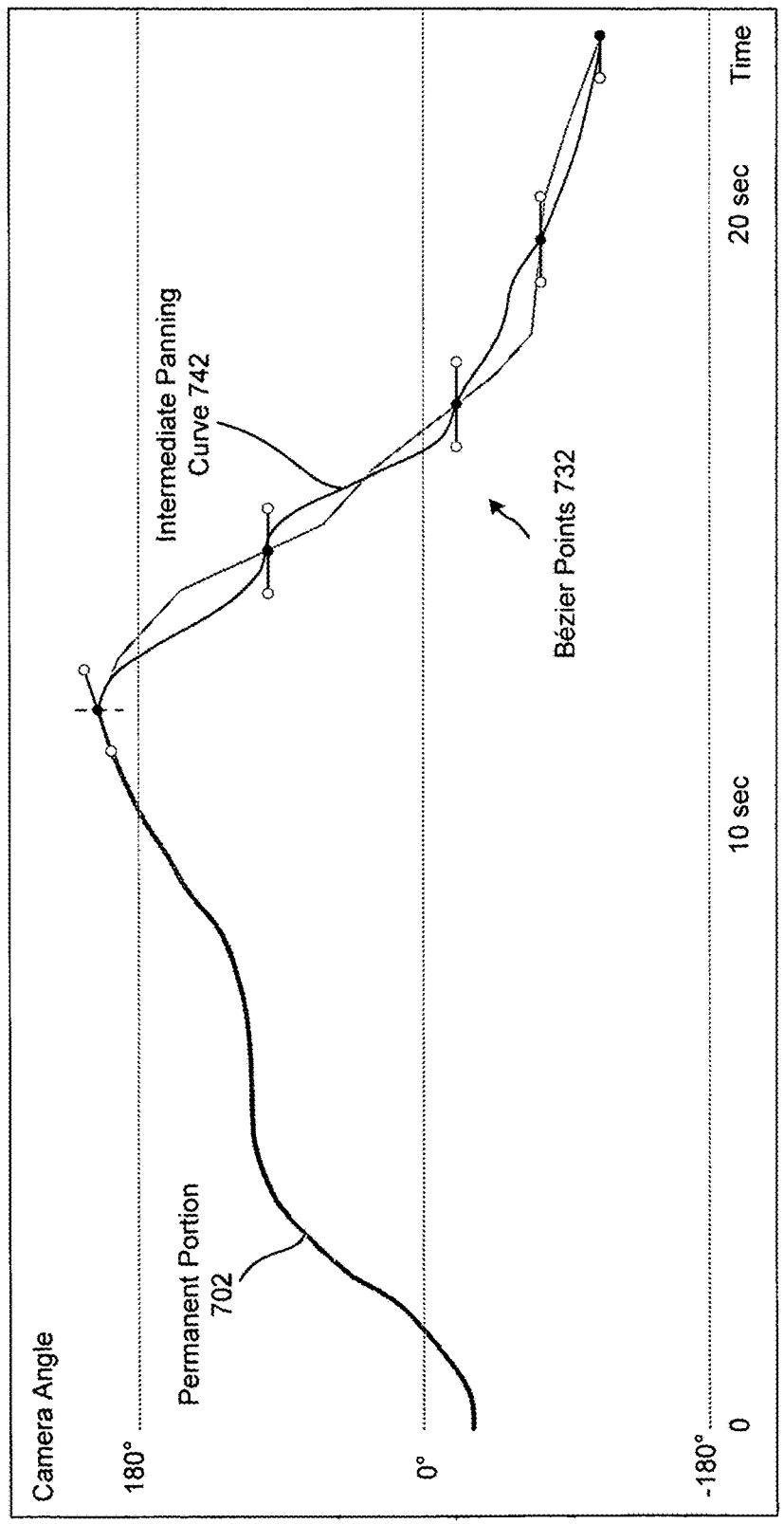

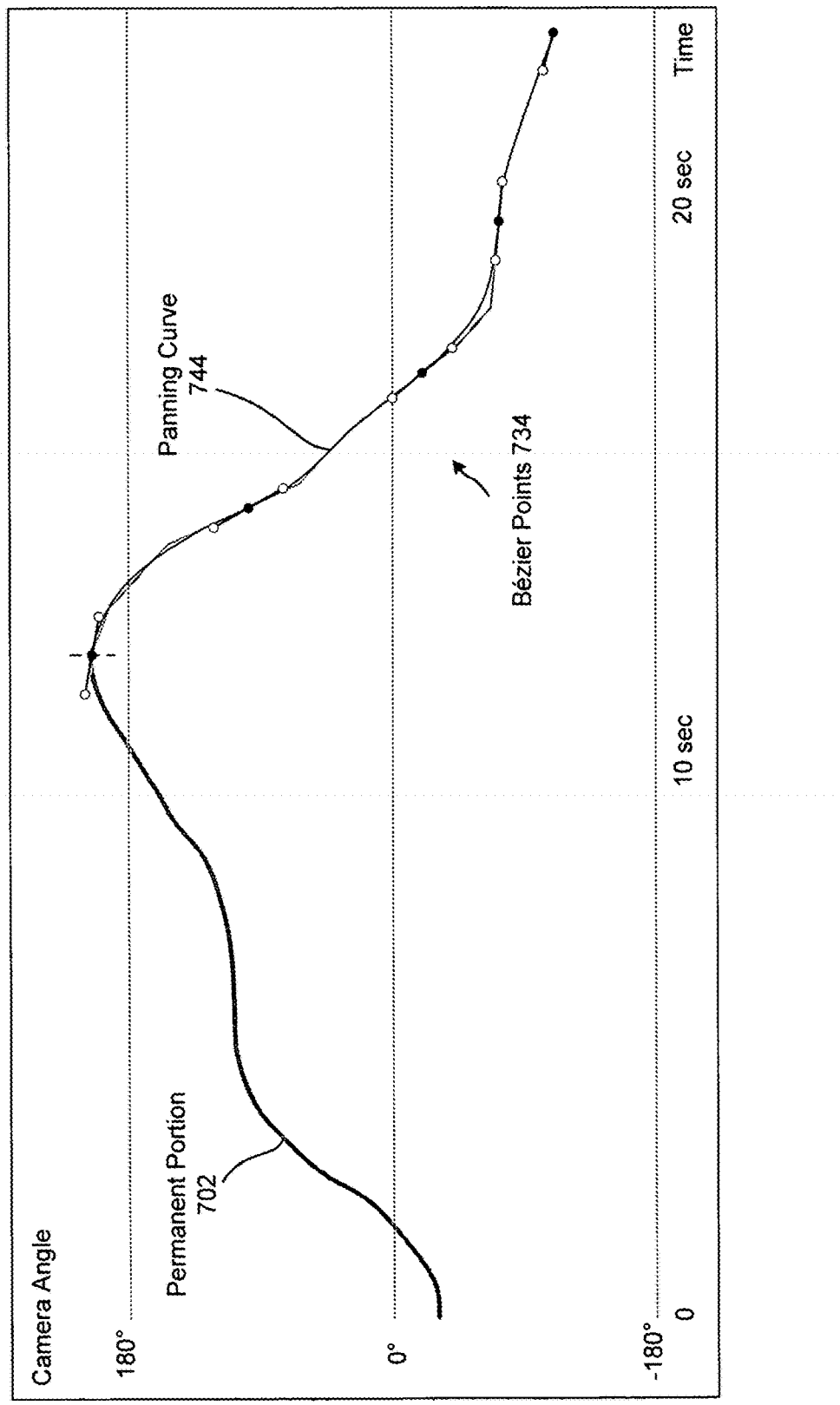

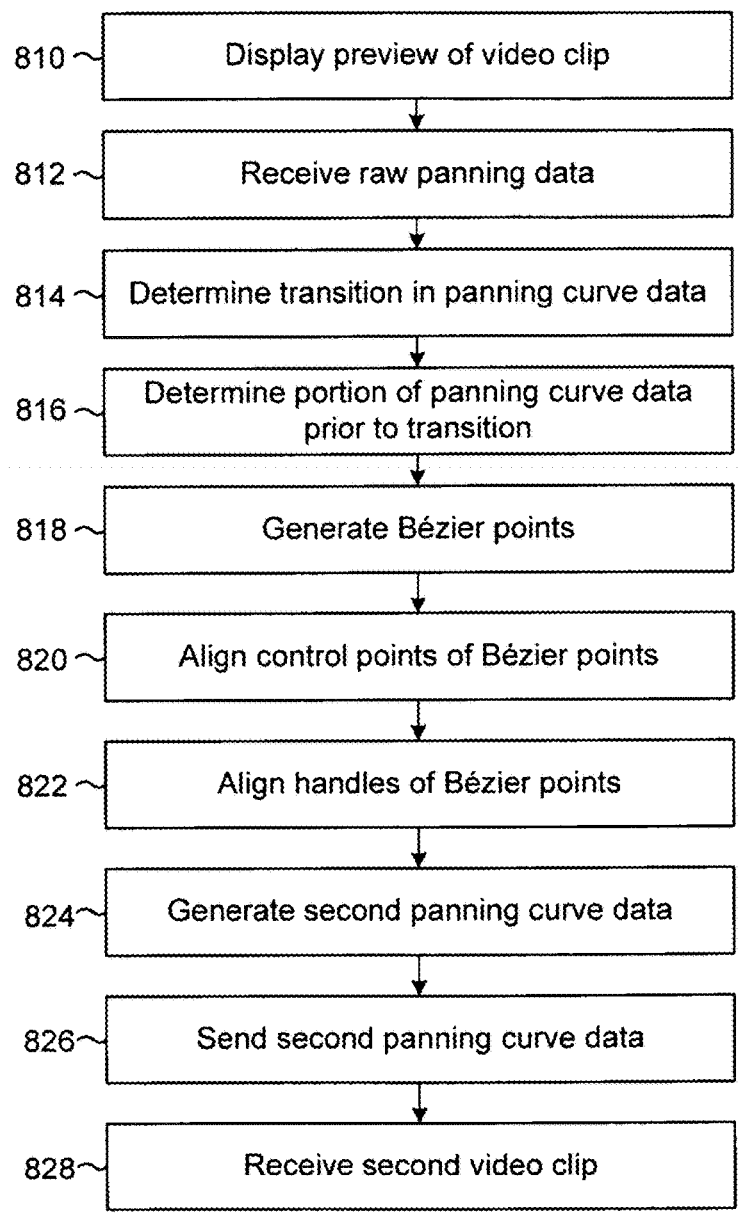

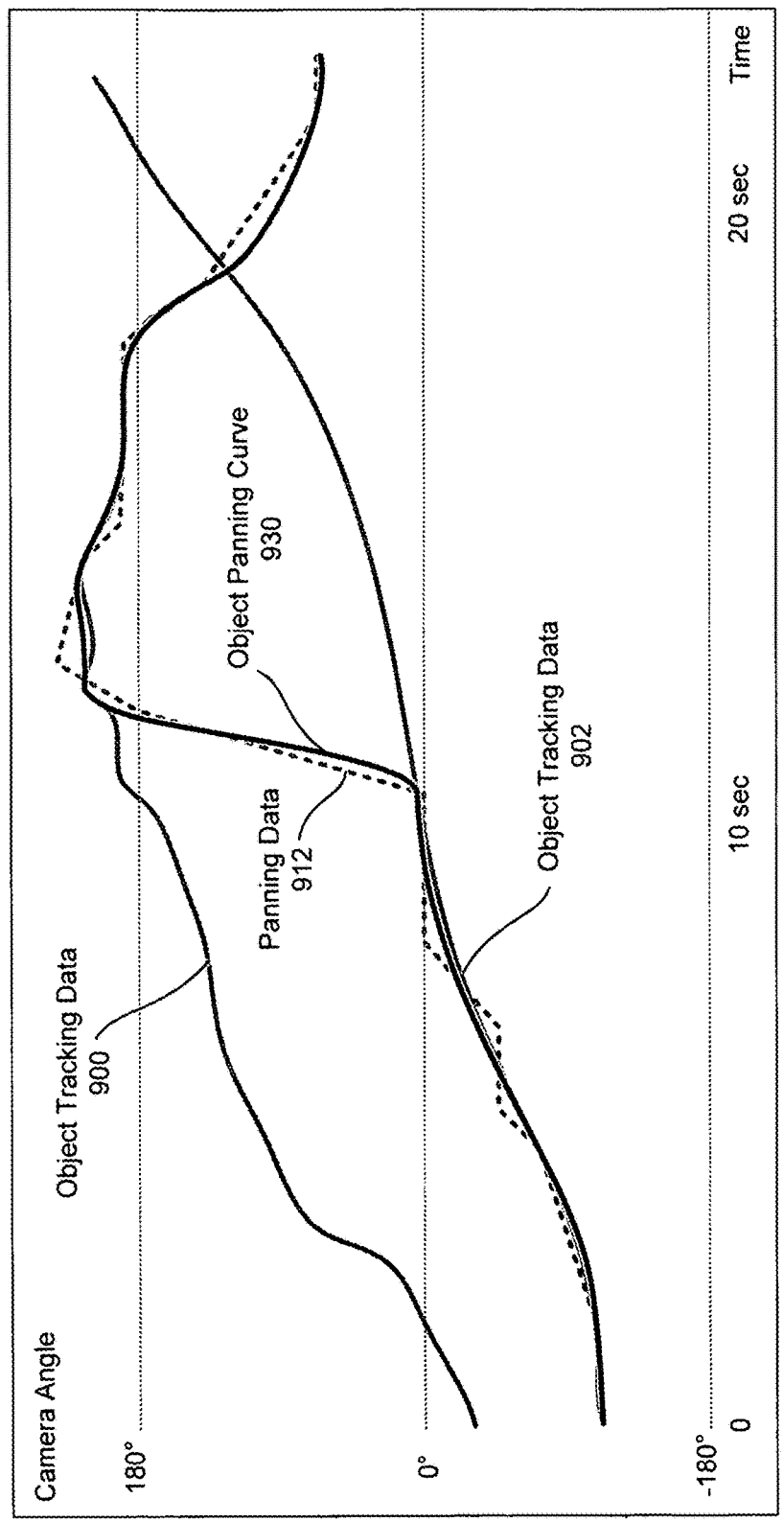

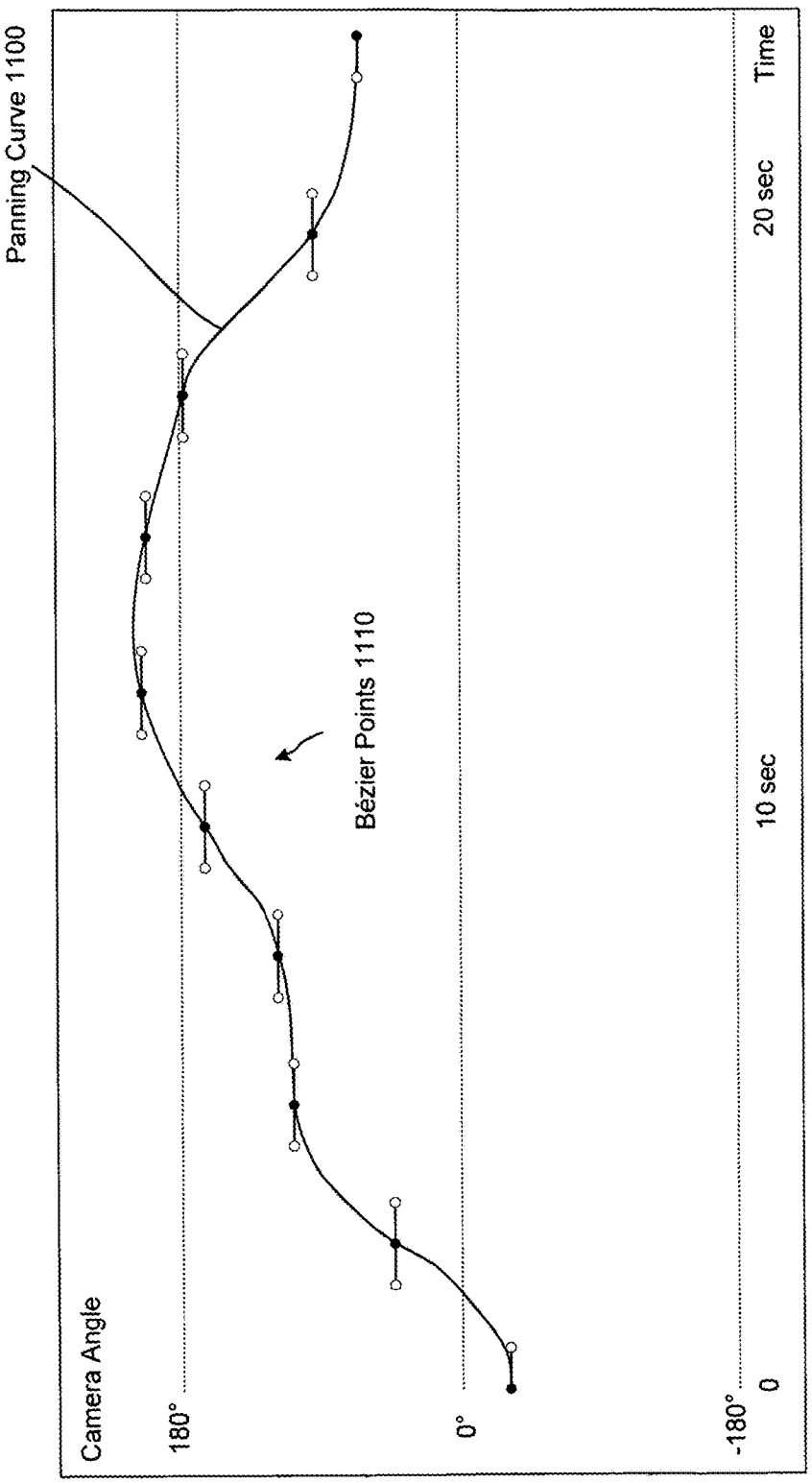

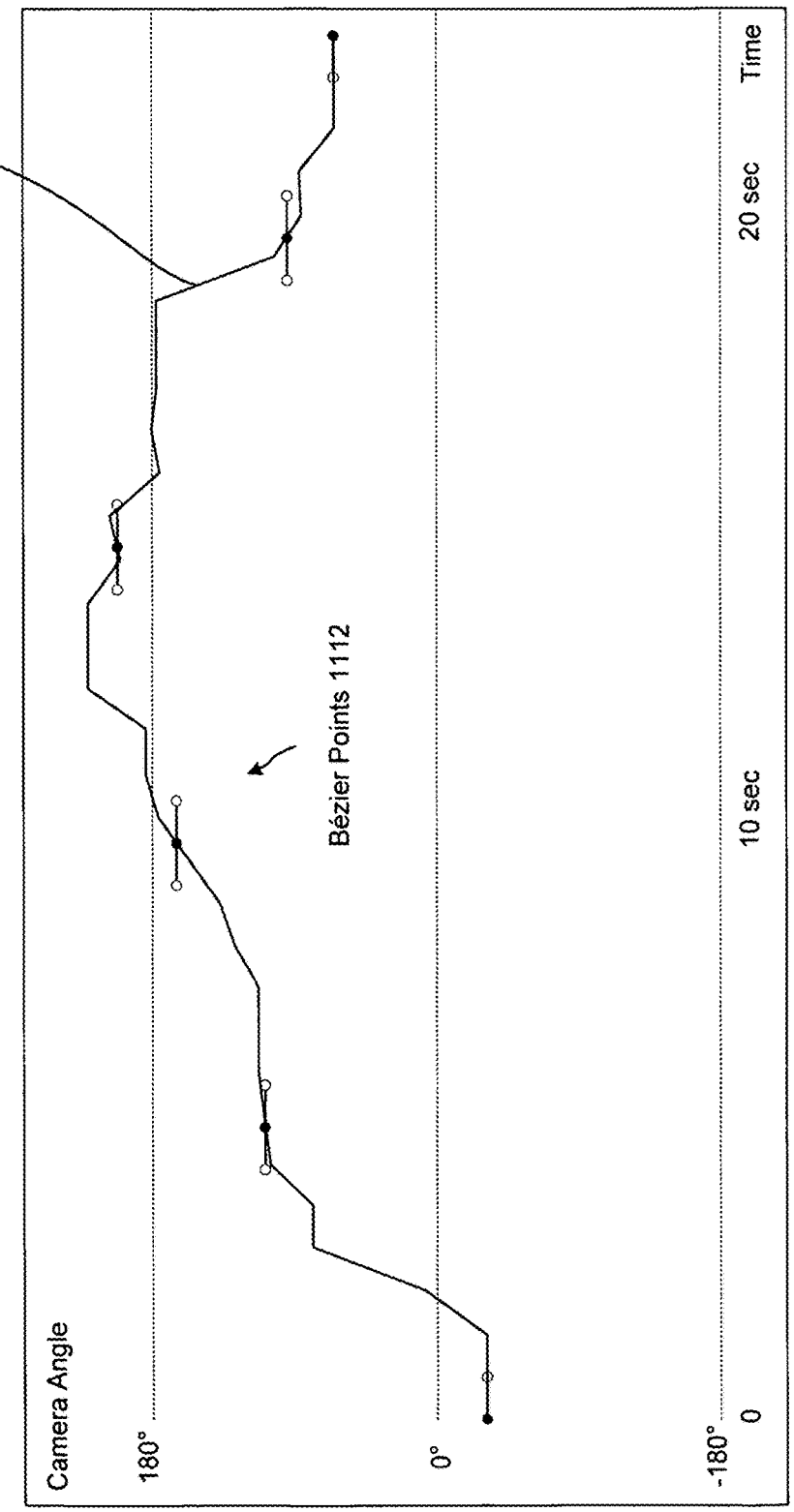

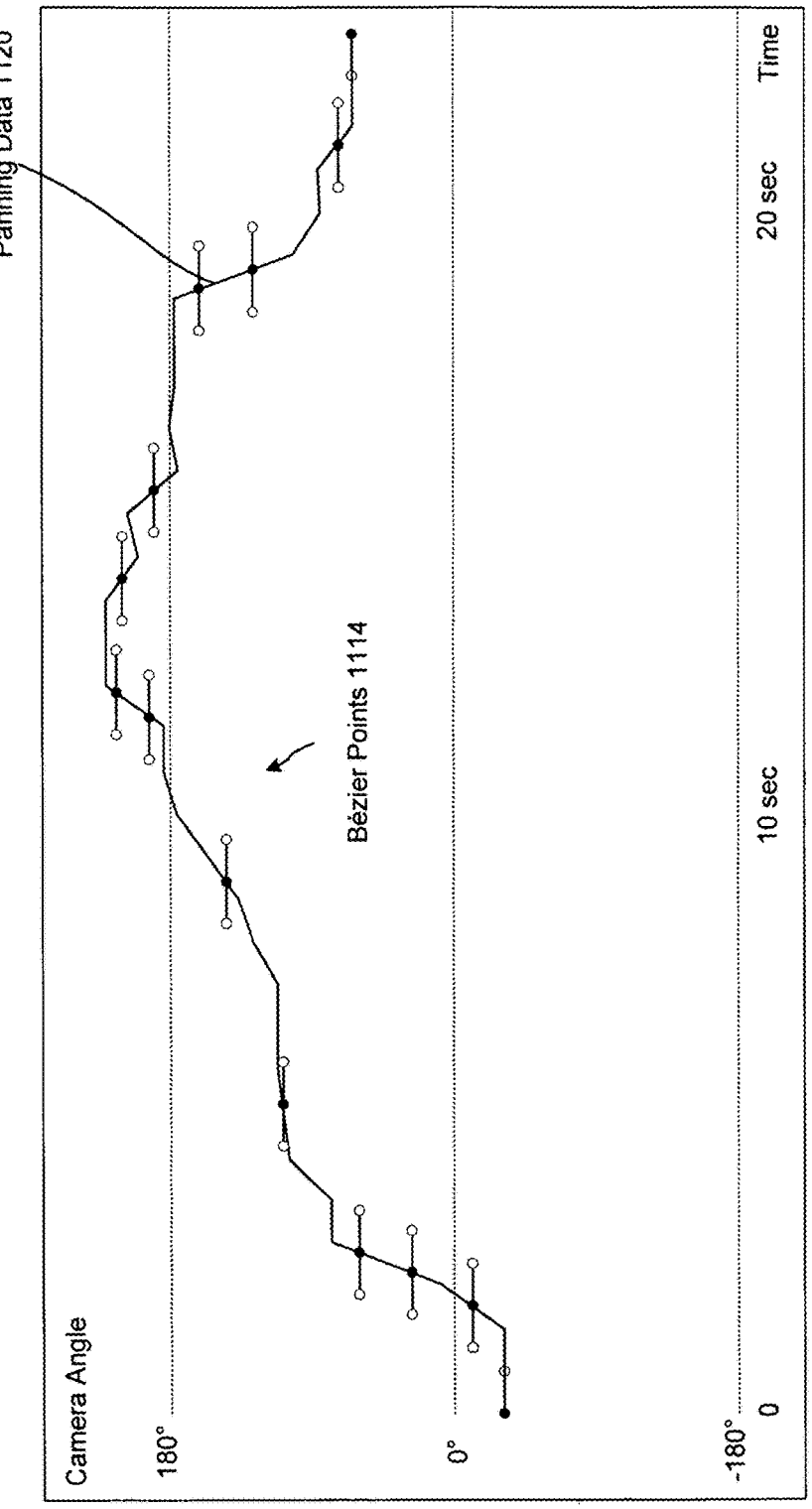

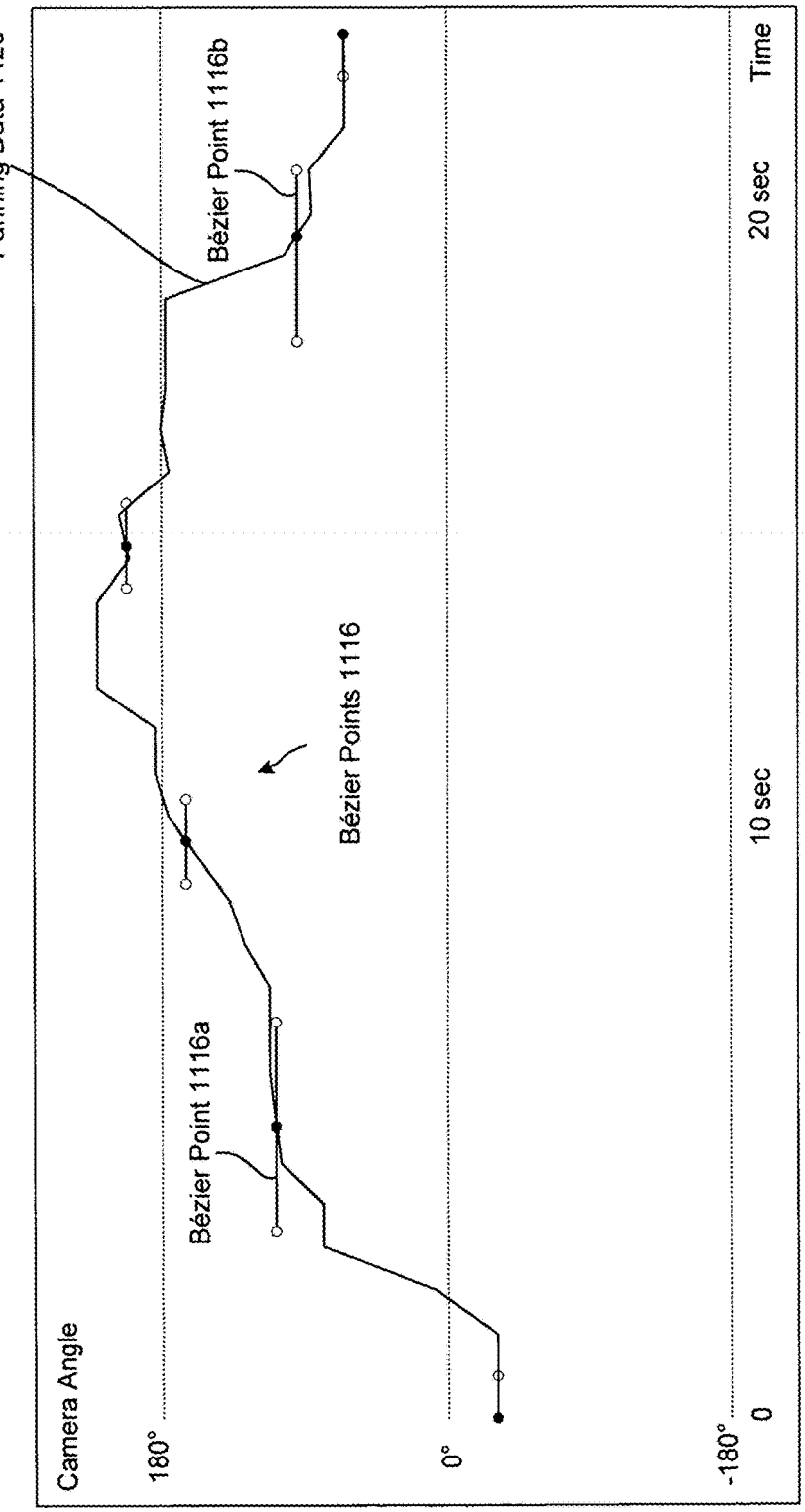

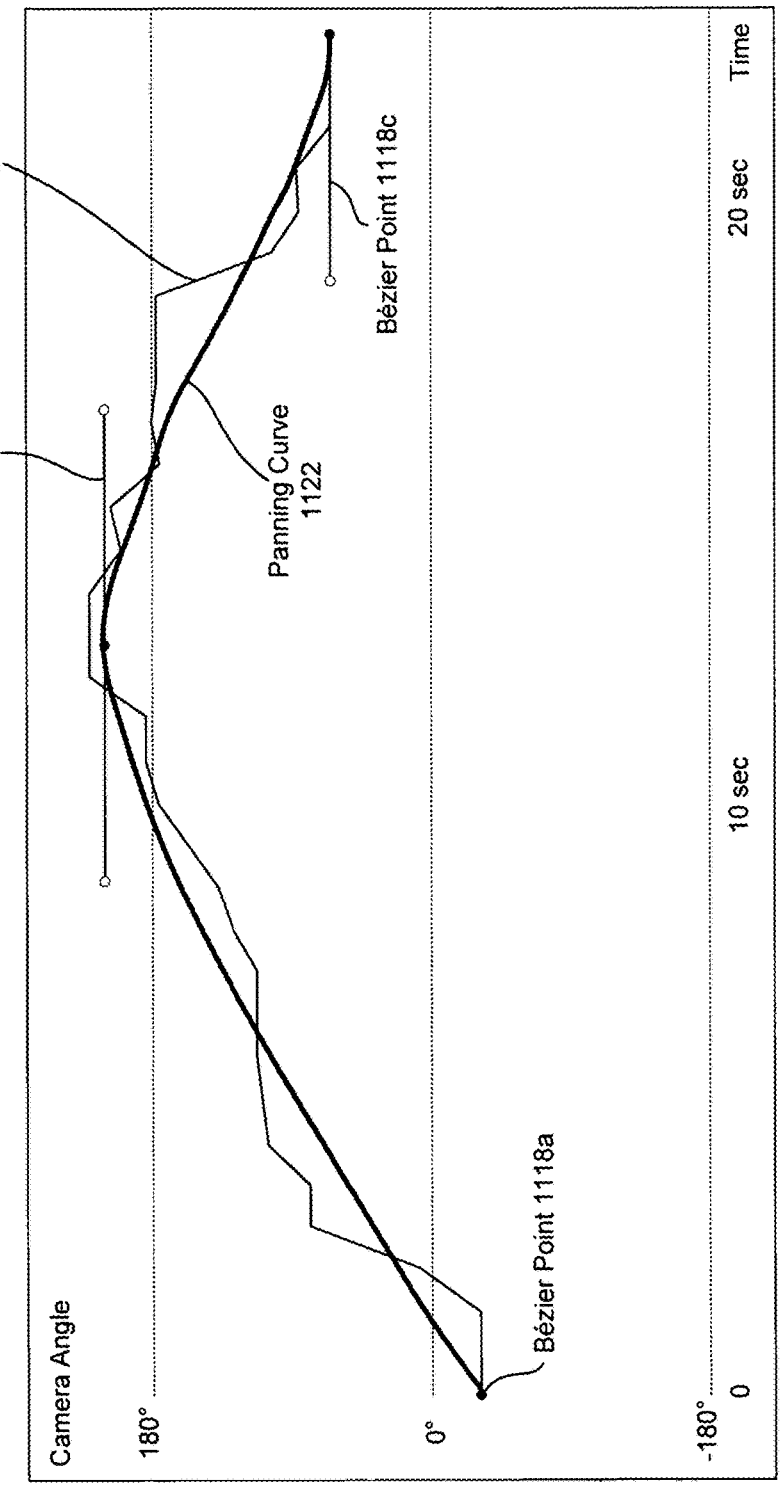

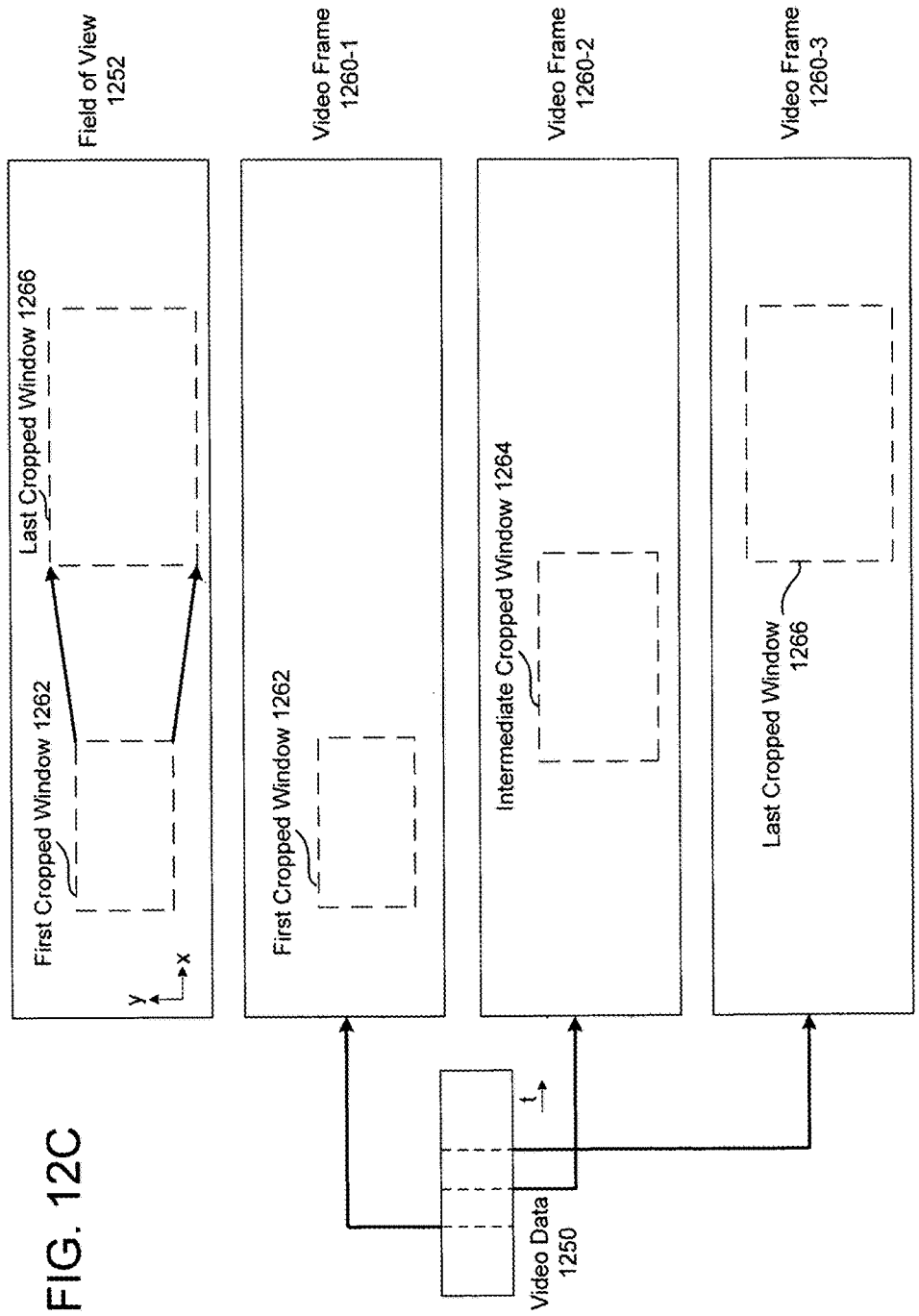

FIG. 13
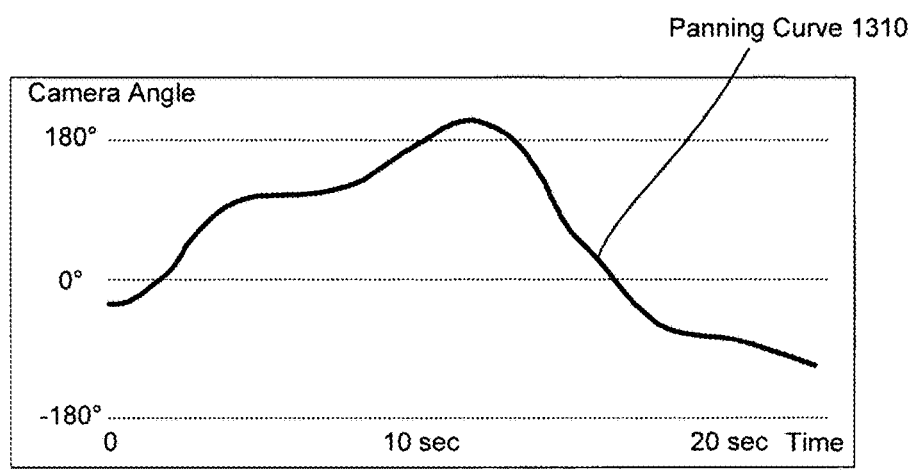
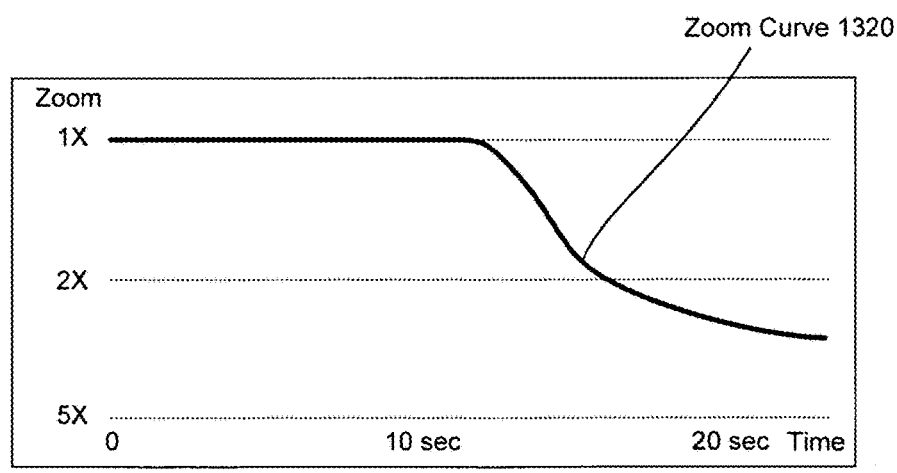

SMOOTHING VIDEO PANNING

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIG. 1 illustrate overviews of systems for implementing embodiments of the present disclosure.

FIGS. 2A-2B illustrate examples of cropping video data in time and space according to embodiments of the present disclosure.

FIGS. 3A-3G illustrate examples of generating panning data according to embodiments of the present disclosure.

FIG. 4 is a flowchart conceptually illustrating an example method for generating panning data according to embodiments of the present disclosure.

FIGS. 6A-6F illustrate examples of smoothing panning data according to embodiments of the present disclosure.

FIGS. 7A-7G illustrate examples of modifying smoothed panning data according to embodiments of the present disclosure.

FIG. 8 is a flowchart conceptually illustrating an example method for modifying smoothed panning data according to embodiments of the present disclosure.

FIGS. 9A-9E illustrate examples of generating panning data using object tracking according to embodiments of the present disclosure.

FIGS. 11A-11F illustrate examples of smoothing panning data according to embodiments of the present disclosure.

FIGS. 12A-12C illustrate examples of panning, zooming and panning while zooming according to embodiments of the present disclosure.

FIG. 13 illustrates an example of generating smoothed panning data and smoothed zooming data according to embodiments of the present disclosure.

DETAILED DESCRIPTION

Figure 2B:
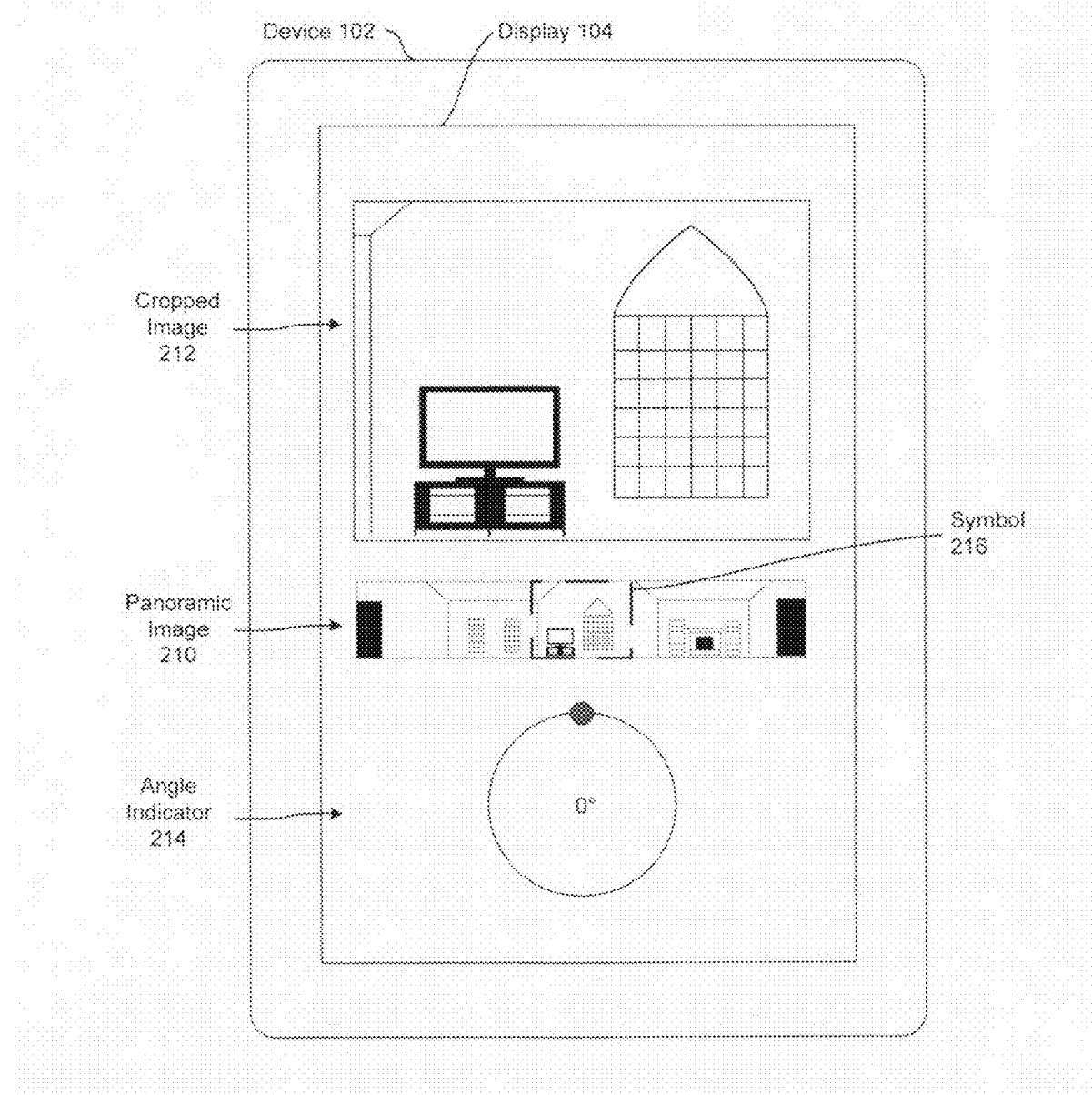

Electronic devices are commonly used to capture image/video data using one or more cameras. While the video data may include a wide field of view in order to capture a wide area, playback of the video data may include only a portion of the wide field of view. During editing playback, a user of a device may control the portion of the video data displayed to generate an output video clip. For example, the user may control an angle of view (e.g., panning) and/or an amount of zoom (e.g., magnification) with which to render the output video clip. However, user editing inputs may not always be smooth or precise, thus resulting in unintended variations in the panning and/or the magnification. For example, the user may intend to zoom in at a constant rate, but may perform a series of pinching motions to change an amount of zoom, resulting in variations in the magnification speed. Similarly, the user may intend to pan at a constant rate, but may swipe multiple times to track an object, resulting in variations in the panning speed.

To improve a panning and/or zooming in the output video clip, devices, systems and methods are disclosed that smooth the panning data and/or magnification data prior to rendering the output video clip. This was, jumps or uneven editing inputs made by a user are smoothed, resulting in an improved ultimate output video. Particular techniques may be used to achieve the smoothing. For example, raw panning data may be recorded at a first sampling rate and Bézier points (or other control points that create a smooth curve) may be generated at a second sampling rate. The Bézier points may be centered on corresponding data points in the raw panning data and aligned with the raw panning data to generate smooth panning curve data. The panning curve data may remove unintended variations in the panning data to create more consistent panning speeds. The panning curve data may be used to render a video clip that may be displayed to the user. If the user inputs additional panning data during playback of the video clip, the system may retain a portion of the panning curve data and generate additional Bézier points corresponding to the additional panning data. The retained portion of the panning curve data and the additional Bézier points may be used to generate second panning curve data. In some examples, the panning curve data may be determined based on a position of an object in the video data and/or locations of the Bézier points may vary and may be determined based on the raw panning data.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While FIG. 1 illustrates the camera(s) 115 being equally spaced around the image capture device 110, the disclosure is not limited thereto and a location of the camera(s) 115 may vary without departing from the disclosure. Similarly, while FIG. 1 illustrates the microphone(s) 116 located on a top portion of the image capture device 110, the disclosure is not limited thereto and a location of the microphone(s) 116 may vary without departing from the disclosure. For example, the microphone(s) 116 may be aligned with the camera(s) 115 or may be spaced between the camera(s) 115 without departing from the disclosure.

While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the device 102 may receive panoramic video data (120). In some examples, the panoramic video data may be captured by the image capture device 110 and the device 102 may receive the panoramic video data from a second device (e.g., directly from the image capture device 110 and/or via the server(s) 112). In other examples, the device 102 may capture the panoramic video data and/or the image capture device 110 may perform the steps illustrated in FIG. 1 without departing from the disclosure. As used herein, panoramic video data may include video data having a field of view beyond 180 degrees, which corresponds to video data with an aspect ratio greater than 2:1. However, the present disclosure is not limited thereto and the video data may be any video data from which an output video having smaller dimensions may be generated. While the received panoramic video data may be raw video data captured by the one or more cameras, the present disclosure is not limited thereto. Instead, the received panoramic video data may be an edited clip or a video clip generated from larger video data without departing from the present disclosure. For example, a user of the device 102 may identify relevant video clips within the raw video data for additional editing, such as specifying events of interest or regions of interest within the raw video data. The device 102 may then input the selected portions of the raw video data as the received panoramic video data for further editing, such as selecting a portion of the panoramic image 10 to display as the cropped image 12.

The device 102 may display (122) the panoramic video data and may receive (124) raw panning data. For example, the device 102 may display the panoramic video data to the user 10 as part of a video editing application (illustrated below with regard to FIG. 3), may detect contact on the display 104 and may determine that the contact identifies a first angle (e.g., direction) in the panoramic video data, which corresponds to a first portion of the panoramic video data. The device 102 may record panning values associated with keyframes every x video frames (or increments of time) to generate the raw panning data. As a first example, the device 102 may record the panning values associated with keyframes every 3 video frames, 30 video frames, every second or the like. Thus, the raw panning data may include a series of panning values based on a first sampling rate. The panning data may correspond to how a user interacted with the video editing application when selecting video pans while playing back video.

In some examples, the device 102 may generate a video tag including data representing raw panning data. For example, the device 102 may generate a video tag indicating the first angle and a time associated with the first angle (e.g., a timestamp associated with receiving the user input, a timestamp associated with an individual video frame, a range of time associated with the first angle or the like). A video tag is a tag (i.e., data structure) including information that may be used to render a video clip, such as an angle, a size, a location and/or a timestamp associated with video frame(s). In some examples, the device 102 may determine to record the raw panning data inherently from related input without requiring an explicit command from a user. For example, the device 102 may determine that the user selected angles while viewing the panoramic video data for a period of time exceeding a threshold. If the user exits the video playback or inputs another command (e.g., share command), the device 102 may determine to generate the video tag based on the period of time exceeding the threshold. Similarly, if the device 102 determines that the user didn't change the angle while viewing the panoramic video data, the device 102 may generate a video tag with the default angle despite the user not selecting the default angle.

The device 102 may generate (126) Bézier points corresponding to the raw panning data. An individual Bézier point may include a control point (e.g., center point) through which a smoothed curve will pass, along with a handle (e.g., two endpoints) that defines the tangent vector to the curve at the control point. Bézier points enable the server(s) 112 to control the smoothed curve in two different ways: 1) by controlling a magnitude of the control point, the server(s) 112 may control a magnitude of the smoothed curve at various points, and 2) by controlling a size and angle of the handle, the server(s) 112 may control a slope between the control points. For example, a shorter handle (e.g., endpoints are closer to the control point) may result in a sharper angle/slop, whereas a longer handle (e.g., endpoints are further from the control point) may result in a smoother angle/slope. In some examples, the server(s) 112 may control a "steepness" of the curve by determining the handles length, with a longer handle corresponding to a steeper curve. However, the present disclosure is not limited thereto and the handles may have a uniform length without departing from the disclosure. Further, the present disclosure is not limited to Bézier points and the server(s) 112 may generate other control points configured to create a smooth curve without departing from the disclosure. For example, the server(s) 112 may generate control points without handles and may generate the smoothed curve using fixed angles/slopes.

In some examples, the device 102 may generate the Bézier points every y video frames (or increments of time), resulting in a second sampling rate that is smaller than the first sampling rate. For example, the device 102 may generate the Bézier points every 90 video frames, every 3 seconds or the like, although the disclosure is not limited thereto. In some examples, the device 102 may control a number of intervals and/or a distance between the intervals. For example, decreasing the number of intervals (e.g., increasing the distance) may further smooth the panning curve data as the device 102 may generate the panning curve data using fewer Bézier points. However, the present disclosure is not limited thereto and the device 102 may generate the Bézier points using variable intervals without departing from the disclosure. For example, the device 102 may generate Bézier points based on a slope of the raw panning data, such that portions of the raw panning data associated with larger slopes (e.g., faster rates of change) have more Bézier points than portions of the raw panning data associated with smaller slopes (e.g., slower rates of change). Thus, the device 102 may determine how many Bézier points to generate.

In some examples, the device 102 may change a weighting associated with the handles of the Bézier points. For example, the device 102 may select a first weighting (e.g., short handle) for a first Bézier point and a second weighting (e.g., long handle) for a second Bézier point. Thus, the device 102 may determine the weighting for a Bézier point based on a number of Bézier points, a slope of the panning data or the like.

The device 102 may align (128) control points of the Bézier points with the raw panning data (e.g., set a magnitude of a control point equal to a corresponding angle in the raw panning data) and align (130) handles of the Bézier points based on the raw panning data (e.g., determine curve vectors on either side of the control point using a corresponding tangent derived from the raw panning data). In some examples, a first Bézier point associated with a first time may be vertically shifted to be aligned with a data point in the raw panning data associated with the first time. For example, a magnitude of the control point of the first Bézier point may be equal to an angle associated with the first time. Similarly, the handles of the first Bézier point may be aligned with a tangent of the raw panning data. The device 102 may calculate the tangent using a single data point (e.g., tangent associated with the first time) and/or multiple data points (e.g., tangent associated with an average over a period of time, such as a trailing average or the like). Thus, the device 102 may determine the handles of the first Bézier point with regard to data points in the raw panning data in proximity to the first time (e.g., difference in time is below a threshold).

The device 102 may generate (132) panning curve data based on the Bézier points. In some examples, the device 102 may determine an amount of smoothing associated with the Bézier points and generate the panning curve data using the Bézier points. For example, the device 102 may determine individual data points included in the panning curve data using a mathematical algorithm (e.g., Bernstein polynomial or De Casteljau's algorithm) with the Bézier points as control points in the algorithm. As used herein, Bézier points may indicate control points used to determine a shape of a Bézier curve, which may be computed mathematically as individual data points. For example, the device 102 may sample the raw panning data to generate individual control points and may use the individual control points to mathematically determine the individual data points included in the Bézier curve that may be graphically displayed. However, the disclosure is not limited thereto. Instead of using Bézier points to generate a Bézier curve, the device 102 may use any control points that may be used to determine the shape of a spline curve or, more generally, a surface or higher-dimensional object. Therefore, the examples provided may be broadly generalized to include any function that models smooth curves using control points.

The device 102 may send (134) the panning curve data to a remote device (e.g., the server(s) 112 and/or the image capture device 110) and receive (136) a video clip generated using the panning curve data from the remote device. For example, the server(s) 112 may generate the video clip data including portions of high resolution video data indicated by the panning curve data. However, the disclosure is not limited thereto and in some examples the device 102 may use the panning curve data to generate the video clip locally on the device 102. For example, the device 102 may generate the video clip including portions of low resolution video data indicated by the panning curve data, although the disclosure is not limited thereto.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip).

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, "annotation data" may indicate subjects included in the panoramic video data or other characteristics of the video data (hereinafter, subjects and characteristics may be jointly referred to as "characteristics"), such as specific identities, people, faces, objects, pets, locations, landmarks, scenes, etc. represented in the panoramic video data or motion data, scene data, audio information, time data, directional data, etc. corresponding to the panoramic video data. In some examples, the annotation data may include an annotation database listing individual video frames and associated characteristics and/or video tag(s) indicating characteristics corresponding to specific video frame(s). The device 102 may use the annotation data to determine angles and/or positions associated with objects represented in the panoramic video data.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width, or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

As part of rendering the video clip, the device 102 may display output video data and may request input from a user 10 of the device 102. For example, the user 10 may instruct the device 102 to generate additional video data (e.g., create an additional video clip), to modify an amount of video data included in the output video data (e.g., change a beginning time and/or an ending time to increase or decrease a length of the output video data), to modify a portion of the video data included in the output video data (e.g., zoom or pan within the video data), shift a time window associated with the video clip within the output video data, specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

Figure 3C:
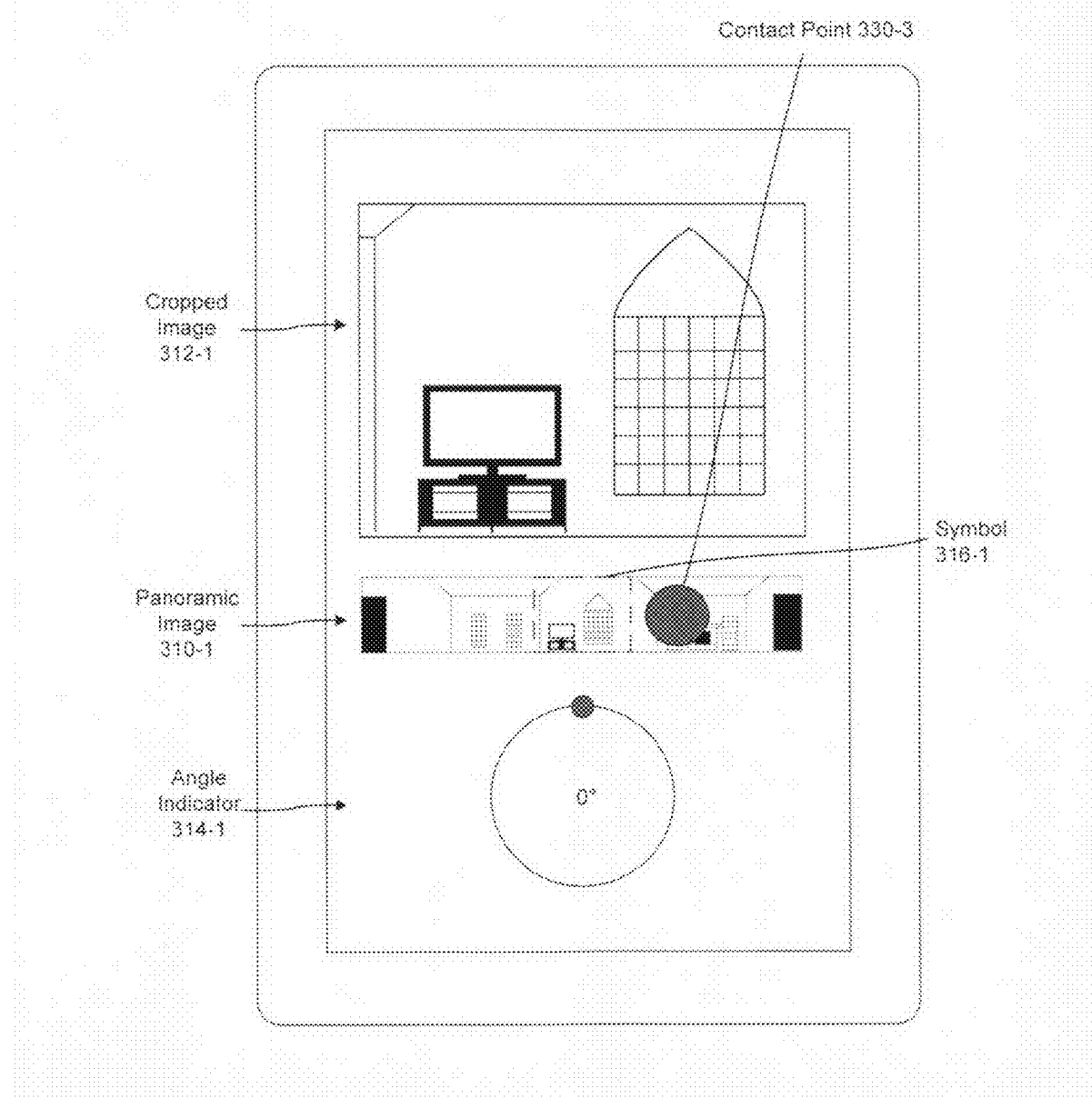

FIGS. 3A-3G illustrate examples of generating panning data according to embodiments of the present disclosure. These figures may conceptually illustrate how a user may interact with the device 102 to view raw video data and select portions of the raw video data to display or to include in a video clip rendered from the raw video data. For example, the user may control panning, zooming or other features that may be used to render the video clip. To enable the user to control the rendering of the video clip, the device 102 may display a panoramic image (e.g., all available pixels), a selected video frame (e.g., portion of the pixels) and an angle (e.g., an angle of the selected video frame with respect to the panoramic image). As illustrated in FIG. 3A, the device 102 may display a first cropped image 312-1, a first panoramic image 310-1, a first angle indicator 314-1 and a first symbol 316-1. The first cropped image 312-1 may be centered on a fixed position relative to the image capture device 110 (e.g., a front of the image capture device 110) and may therefore the first symbol 316-1 may be centered within the first panoramic image 310-1 and the first angle indicator 314-1 may display an angle of 0 degrees.

FIG. 3B illustrates a first example of the device 102 changing a directional view of the cropped image 312 in response to user input. As illustrated in FIG. 3B, the device 102 may detect a first contact point 330-1, corresponding to a user touching the display 104 at a first location, and may detect repeated contact until a second contact point 330-2, corresponding to the user releasing the display 104 at a second location. Based on the first contact point 330-1 and the second contact point 330-2, the device 102 may determine that the user input a swipe motion in the cropped image 312 and may determine to pan right (e.g., increase the angle from 0 degrees). Therefore, the user may change a directional view of the cropped image 312 by swiping the cropped image 312 and the device 102 may update the display 104.

FIG. 3C illustrates a second example of the device 102 changing a directional view of the cropped image 312 in response to user input. As illustrated in FIG. 3C, the device 102 may detect a third contact point 330-3, corresponding to a user touching the display 104 at a third location. Based on the third contact point 330-3, the device 102 may determine a desired position within the panoramic image 310 corresponding to the third contact point 330-3, may determine an angle associated with the desired position (e.g., 70 degrees) and may display the cropped image centered on the angle (e.g., 70 degrees). Therefore, the user may change a directional view of the cropped image 312 by tapping a desired location on the display 104 (corresponding to a desired position in the panoramic image 310) and the device 102 may update the display 104. Additionally or alternatively, the device 102 may detect a swipe motion associated with the panoramic image 310 and may determine to pan based on the swipe motion, similar to the example discussed above with regard to FIG. 3B.

FIG. 3D illustrates a third example of the device 102 changing a directional view of the cropped image 312 in response to user input. As illustrated in FIG. 3D, the device 102 may detect a fourth contact point 330-4, corresponding to a user touching the display 104 at a fourth location. Based on the fourth location within the angle indicator 314, the device 102 may determine a desired angle corresponding to the fourth contact point 330-4 (e.g., 70 degrees) and may display the cropped image centered on the desired angle (e.g., 70 degrees). Therefore, the user may change a directional view of the cropped image 312 by tapping a desired location on the display 104 (corresponding to a desired angle in the angle indicator 314) and the device 102 may update the display 104. Additionally or alternatively, the device 102 may detect a swipe motion associated with the angle indicator 314 and may determine to pan based on the swipe motion, similar to the example discussed above with regard to FIG. 3B. For example, the user may maintain contact with the angle indicator 314 and slowly pan through the panoramic image 310 by moving along the angle indicator 314.

In some examples, the device 102 may determine to perform object tracking, event tracking, facial tracking or the like to determine the directional view of the cropped image based on the contact points 330. For example, the user may touch an object on the display 104 and the device 102 may track the object across video frames and directions/angles. Therefore, in addition to determining the directional view in response to the user panning left/right, selecting a portion of the panoramic image 310 or selecting an angle using the angle indicator 314, the device 102 may determine the directional view in response to the user selecting an object/face/event/etc. to track within the panoramic image 310 (and associated video frames).

Figure 3E:
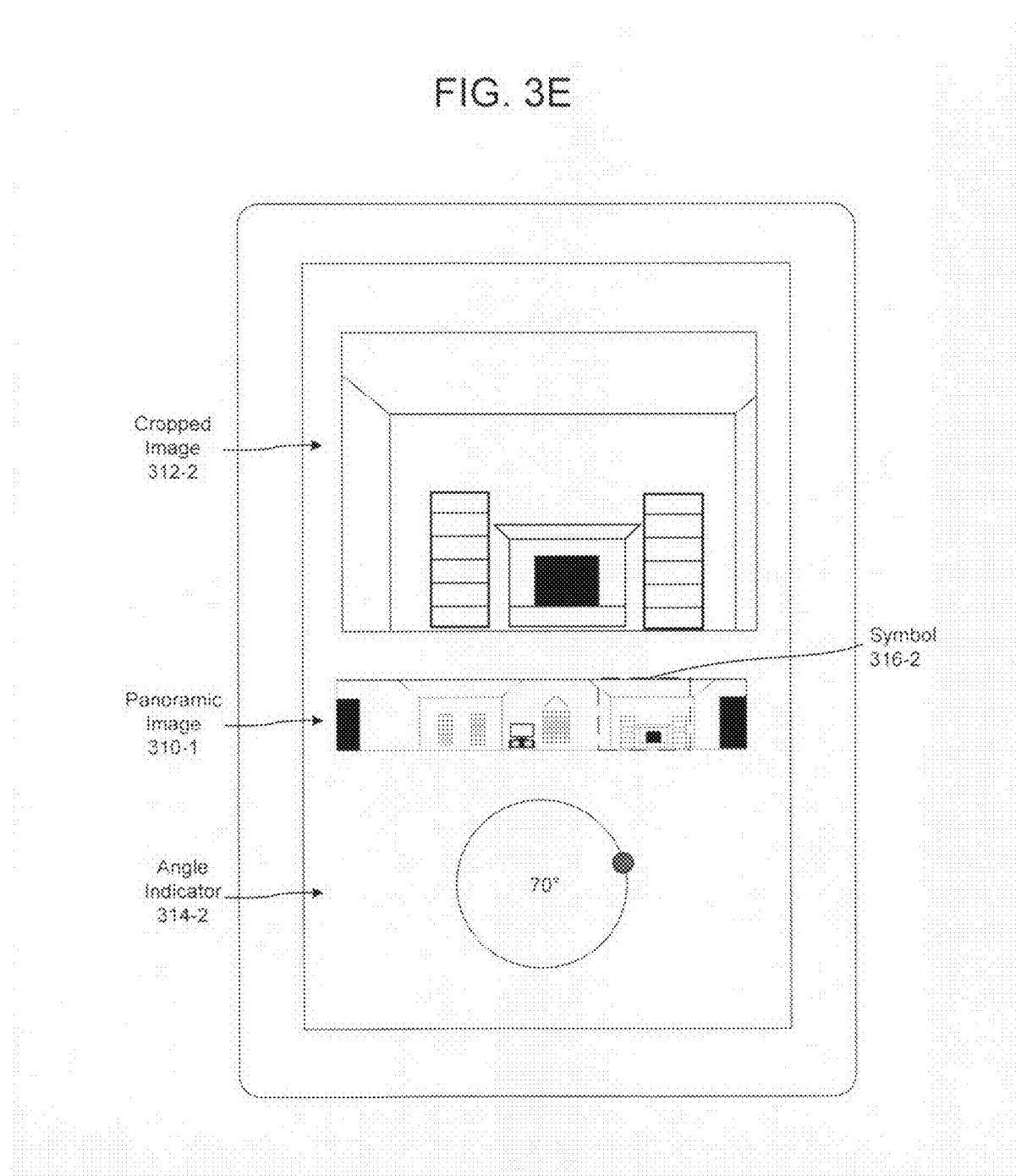

FIG. 3E illustrates a first example of the updated display 104 showing the new directional view using a fixed position for the panoramic image 310. As illustrated in FIG. 3E, the device 102 may display the first panoramic image 310-1, a second cropped image 312-2, a second symbol 316-2 and a second angle indicator 314-2. Thus, in response to the user input specifying the new directional view, the device 102 may change a portion of the panoramic image 310 included in the second cropped image 312-2 based on the new directional view, move the second symbol 316-2 along the first panoramic image 310-1 to indicate the portion of the first panoramic image 310-1 included in the second cropped image 312-2 and update the second angle indicator 314-2 to display an angle associated with the second cropped image 312-2. Therefore, as the second cropped image 312-2 changes, the first panoramic image 310-1 remains fixed, the second symbol 316-2 moves along the first panoramic image 310-1 and the second angle indicator 314-2 updates the angle.

FIG. 3F illustrates a second example of the updated display 104 showing the new directional view using a fixed position for the symbol 316. As illustrated in FIG. 3F, the device 102 may display a second panoramic image 310-2, the second cropped image 312-2, the first symbol 316-1 and the second angle indicator 314-2. Thus, in response to the user input specifying the new directional view, the device 102 may change a portion of the panoramic image 310 included in the second cropped image 312-2 based on the new directional view, move data in the panoramic image 310 from a left edge to a right edge to center the second cropped image 312-2 in the second panoramic image 310-2 (e.g., pixels wrap around to the opposite edge to center the second panoramic image 310-2 on the second cropped image 312-2) and update the second angle indicator 314-2 to display an angle associated with the second cropped image 312-2. Therefore, as the second cropped image 312-2 changes, the first symbol 316-1 remains fixed in the center of the second panoramic image 310-2, the second panoramic image 310-2 moves to center the second panoramic image 310-2 on the second cropped image 312-2 and the second angle indicator 314-2 updates the angle.

As illustrated in FIGS. 3A-3F, the device 102 may change the angle of video data being displayed based on multiple different techniques for detecting input, and each technique may have a particular benefit or usage. For example, changing the angle based on the cropped image as illustrated in FIG. 3B allows for fine control over what is being displayed and/or smooth panning, while changing the angle based on the panoramic image as illustrated in FIG. 3C and/or the angle indicator as illustrated in FIG. 3D allows for a quick adjustment and/or rough panning. In response to the input, the device 102 may generate panning data corresponding to the angle of video data displayed. As illustrated in FIG. 3G, the device 102 may generate panning data 340 that indicates a camera angle from −180° to 180° during a period of time. For example, FIG. 3G illustrates a time period of just over 20 seconds, during which time the panning data 340 begins below 0°, extends to beyond 180° and pans back down to end at roughly 45°. As illustrated in FIG. 3G, the panning data 340 may include jerky motion and minor variations that are likely to be unintentional during the input process. To smooth the panning data 340, the device 102 may perform the techniques discussed above with regard to FIG. 1 and/or discussed in greater detail below.

FIG. 4 is a flowchart conceptually illustrating an example method for generating panning data according to embodiments of the present disclosure. FIG. 4 illustrates a flowchart associated with generating panning data during playback of a video clip. As illustrated in FIG. 4, the device 102 may display (410) a video clip, receive (412) an input and determine (414) a direction from the input. For example, the device 102 may receive user input selecting a particular area in the video clip and may determine a direction associated with the particular area. In some examples, the device 102 may pause the video clip during playback in order to select the particular area with greater precision. The device 102 may update (416) a direction displayed in the video clip to match the direction. The device 102 may determine (418) an angle associated with the direction and may associate (420) the angle with corresponding video frame(s). For example, a first angle may be associated with a first video frame and a second angle may be associated with a second video frame following the first video frame if the input continues to change between the first video frame and the second video frame. Additionally or alternatively, the first angle may be associated with the first video frame, the second video frame and any additional video frames until additional input is received.

The device 102 may determine (422) if the device 102 receives additional input. If the device 102 receives additional input, the device 102 may loop (424) to step 414 and repeat steps 414-422. If the device 102 does not receive additional input, the device 102 may generate (426) panning data, smooth (428) the panning data, send (430) the smoothed panning data to the server 112 and may receive (432) a video clip from the server 112 generated using the panning data. In some examples, the device 102 may generate panning data including a plurality of angles, generate one or more video tags including the panning data and/or store angle and timestamp information into individual frames of the video clip. For example, the device 102 may store angle and timestamp information in each video frame of the video clip, in a portion of the video frames using a fixed pattern or in individual video frames associated with a change in the angle.

When generating the panning data, the device 102 may use a variety of animations between different angles. As a first example, the device 102 may interpolate between selected angles, such that a smooth panning occurs from a first angle to a second angle. As a second example, the device 102 may use a selected angle until a subsequent angle is selected, such as displaying a first angle until a sharp transition to a second angle. Similarly, angles stored in video frames may be interpolated for a smooth panning effect or maintained until the angle changes. The device 102 may display additional icons/buttons illustrating one or more transition animations to allow the user more control over panning when generating the video tag(s).

In some examples, the device 102 may determine that a command to generate panning data (or a video tag including panning data) and/or send the panning data/video tag was received inherently from related input without requiring an explicit command from a user. For example, the device 102 may determine that the user selected angles while viewing the panoramic video data for a period of time exceeding a threshold. If the user exits the video playback or inputs another command (e.g., share command), the device 102 may determine to generate the panning data/video tag and/or send the panning data/video tag based on the period of time exceeding the threshold. The device 102 may generate a single video tag including a single angle, a video tag including a plurality of angles and/or a plurality of video tags including one or more angles.

While FIG. 4 illustrates an example of generating panning data, the disclosure is not limited thereto. Instead, the device 102 may generate panning data using any technique known to one of skill in the art without departing from the disclosure. Additionally or alternatively, the device 102 may receive panning data generated by the image capture device 110, the server(s) 112 or another device without departing from the disclosure.

Figure 5:
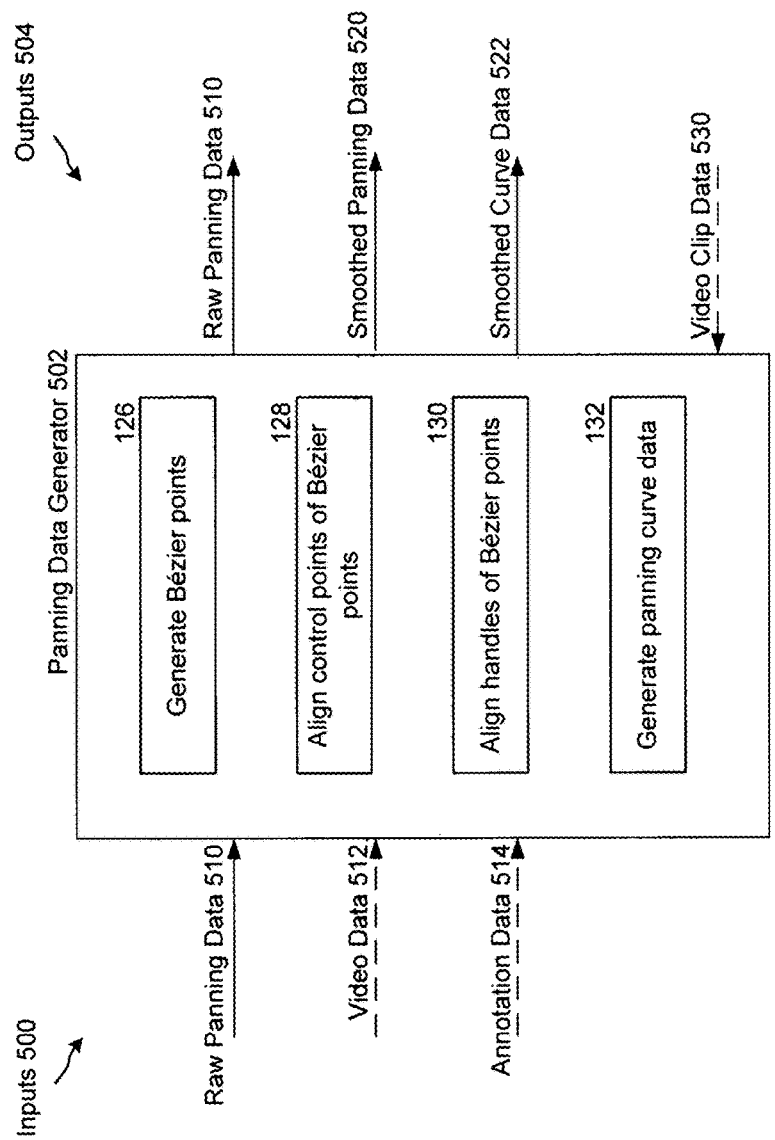
FIG. 5 illustrates an example of a panning data generator according to embodiments of the present disclosure.

FIG. 5 illustrates an example of a panning data generator according to embodiments of the present disclosure. As illustrated in FIG. 5, a panning data generator 502 may receive inputs 500 and may generate outputs 504. For example, the inputs 500 may include raw panning data 510 along with optional video data 512 and/or annotation data 514. The raw panning data 510 may be generated by the device 102 or other devices using the techniques discussed in greater detail above or any technique known to one of skill in the art. In some examples, the raw panning data 510 may be generated by the panning data generator 502 during playback of the video data 512. Thus, the video data 512 may be video data (e.g., a video clip) that the device 102 may display to a user 10 and the panning data generator 502 may receive the raw panning data 510 as input based on the user 10 selecting portions of the video data to display at various times during playback. In some examples, the device 102 may pause playback of the video data 512 to enable more precise control over the raw panning data 510. However, the raw panning data 510 may be generated by a remote device and input to the panning data generator 502 for smoothing without departing from the disclosure.

The video data 512 may represent objects and the panning data generator 502 may identify locations and/or angles associated with the objects. In some examples, the device 102 may use computer vision processing to identify an object in the video data and track locations/angles associated with the object throughout the video data. Additionally or alternatively, the annotation data 514 may indicate locations/angles associated with the objects in individual video frames of the video data 512. For example, the annotation data 510 may include time (e.g., a timestamp, video frame(s), a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame), although the disclosure is not limited thereto. The panning data generator 502 may use the annotation data 514 to improve the smoothing process and/or to increase a likelihood that the panning data includes the objects and/or scenes desired by the user 10.

The panning data generator 502 may output the raw panning data 510, smoothed panning data 520 and/or smoothed curve data 522. The panning data generator 502 may generate the smoothed panning data 520 and/or the smoothed curve data 522 based on the inputs 500. In some examples, the smoothed panning data 520 may include a plurality of data points, such as a plurality of angles associated with individual video frame(s). For example, the smoothed panning data 520 may indicate an angle associated with each video frame in the video data 512, every n video frames in the video data 512 and/or in individual video frames associated with a change in the angle exceeding a threshold. In contrast to the discrete data points indicated by the smoothed panning data 520, the smoothed curve data 522 may indicate panning for the entirety of the video data 512 without granularity. For example, the server(s) 112 may modify individual data points included in the smoothed panning data 520 but may only shift a portion of the smoothed curve data 522 as a group.

In some examples, the panning data generator 502 may send the outputs 504 to the server(s) 112 and may receive video clip data 530 that was generated using the outputs 504. However, the present disclosure is not limited thereto and the video clip data 530 may be saved on the server(s) 112, sent from the server(s) 112 to the image capture device 110 and/or a remote device without departing from the disclosure. Additionally, the panning data generator 502 may send the raw panning data 510 to the server(s) 112 to enable the server(s) 112 to generate additional smoothed panning data and/or smoothed curve data. For example, the server(s) 112 may generate a first video clip using the smoothed panning data 520 and/or the smoothed curve data 522 and may perform additional processing on the video data 512 and the raw panning data 510 to generate a second video clip at a later point in time. Thus, the device 102 may receive the first video clip after a minimal delay (e.g., latency) to display to the user 10 and may receive the second video clip, having a higher resolution and/or more smoothing due to the additional processing, after a lengthier delay.

Figure 6B:
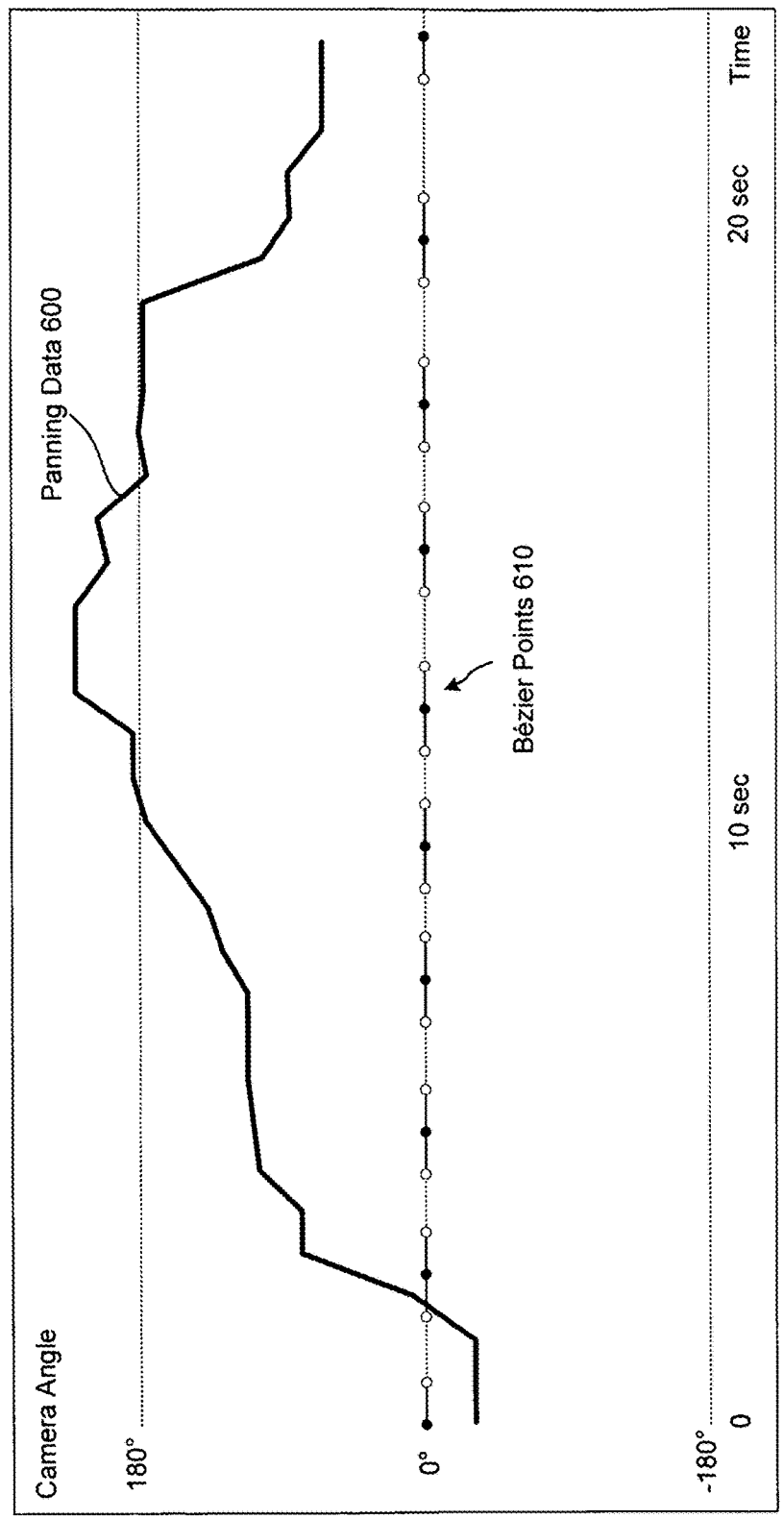

FIGS. 6A-6F illustrate examples of smoothing panning data according to embodiments of the present disclosure. The device 102 may receive raw panning data, may sample the raw panning data and may generate a smooth curve to maintain constant panning speeds and/or reduce variations in the panning speeds. While FIGS. 6A-6F graphically illustrate generating a panning curve from raw panning data, the panning curve may correspond to individual data points that may be manipulated mathematically, for example using the Bernstein polynomial (e.g., for Bézier curves) or other equations (e.g., for other parametric curves). As illustrated in FIG. 6A, the device 102 may receive panning data 600 including a plurality of individual data points associated with a camera angle (e.g., $-180°$ to $180°$) over a period of time (e.g., 20 seconds). The panning data 600 may include smooth transitions (e.g., change in angle is below a threshold over a duration of time) and rough transitions (e.g., change in angle exceeds the threshold over the duration of time) that may be choppy/jumpy. For example, video data rendered using the panning data 600 may have poor image quality due to the rough transitions, detracting from the video data.

As discussed above, the panning data 600 may be received by the device 102 and/or generated by the device 102 during playback of the video data. In some examples, the device 102 may playback the video data and may record camera angles associated with keyframes every x video frames (or increments of time). For example, the device 102 may record the camera angles associated with keyframes every 3 video frames, 30 video frames, every second or the like. Thus, the panning data 600 may include a series of camera angles based on a first sampling rate.

To smooth the panning data 600, the device 102 may generate Bézier points 610, as illustrated in FIG. 6B. The Bézier points 610 may be generated every y video frames (or increments of time), resulting in a second sampling rate that is smaller than the first sampling rate. For example, the device 102 may generate the Bézier points 610 every 90 video frames, every 3 seconds or the like, although the disclosure is not limited thereto. After generating the Bézier points 610, the device 102 may shift the Bézier points 610 to align with corresponding data points in the panning data 600, as illustrated by Bézier points 612 in FIG. 6C. The Bézier points 610 illustrated in FIG. 6B are intended to conceptually illustrate the process and are not intended to limit the present disclosure. In some examples, the device 102 may generate the Bézier points 612 without performing the steps illustrated in FIG. 6B.

As illustrated in FIG. 6C, the Bézier points 612 are matched with corresponding keyframes in the panning data 600. For example, a first Bézier point associated with a first time may be vertically shifted to be aligned with a data point in the panning data 600 associated with the first time. The first Bézier point may include a control point (e.g., center point) through which a smoothed curve will pass, along with a handle (e.g., two endpoints) that defines the tangent vector to the curve at the control point. As illustrated in FIG. 6C, the Bézier points 612 include control points aligned with the panning data 600 (e.g., magnitude of the control point at the first time is equal to a magnitude of the panning data 600 at the first time) and two endpoints extending from the control point. The two endpoints generate the handle through the control point that may be used in smoothing the panning data 600. As illustrated in FIG. 6C, the handles of the Bézier points 612 are unaffected by the panning data 600 and extend along a horizontal axis from the control points. Using the Bézier points 612, the device 102 may generate an intermediate panning curve 622, as illustrated in FIG. 6D. The intermediate panning curve 622 is smoother than the panning data 600, but includes discrete plateaus caused by the handles of the Bézier points 612.

Figure 6E:
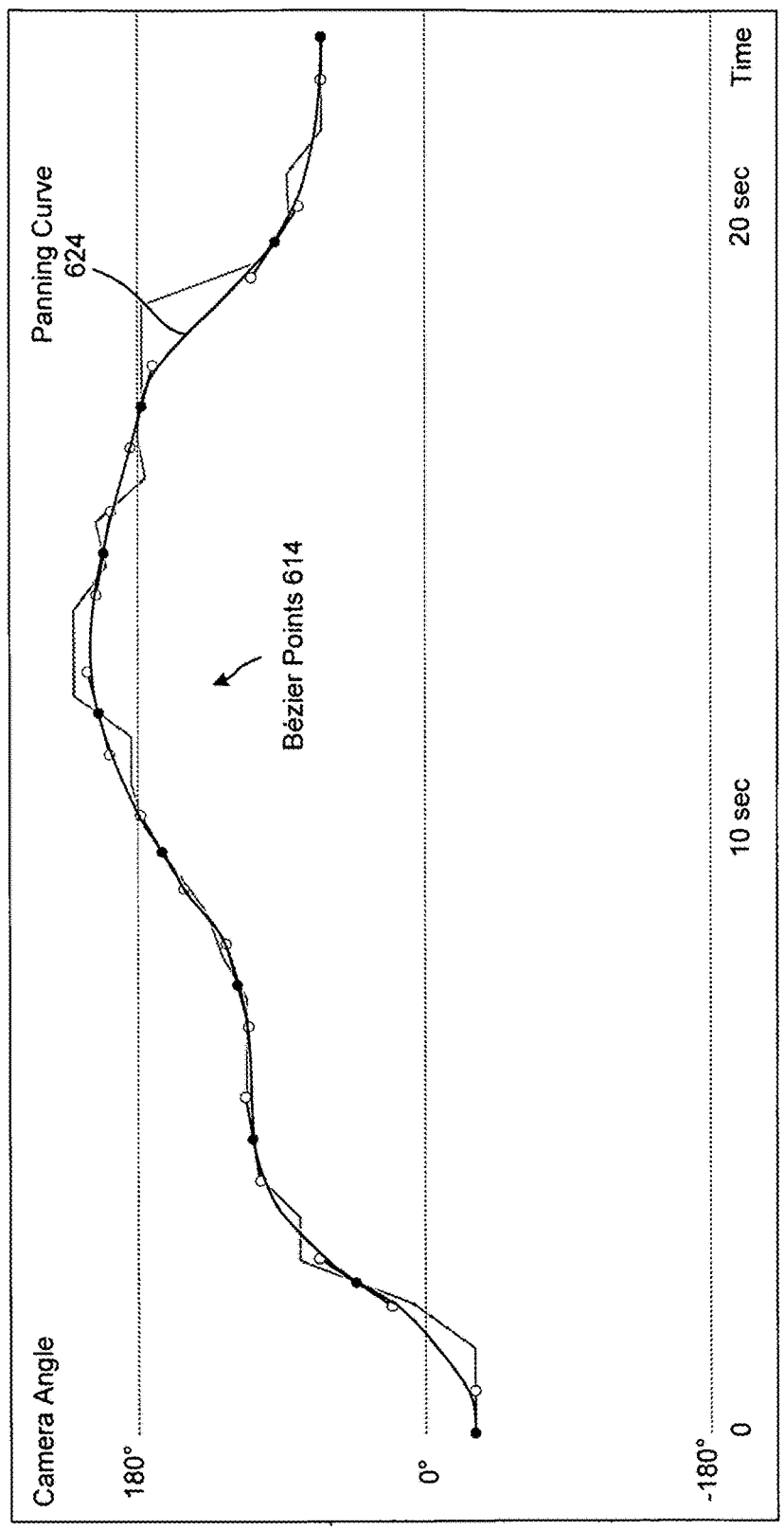
Figure 6F:
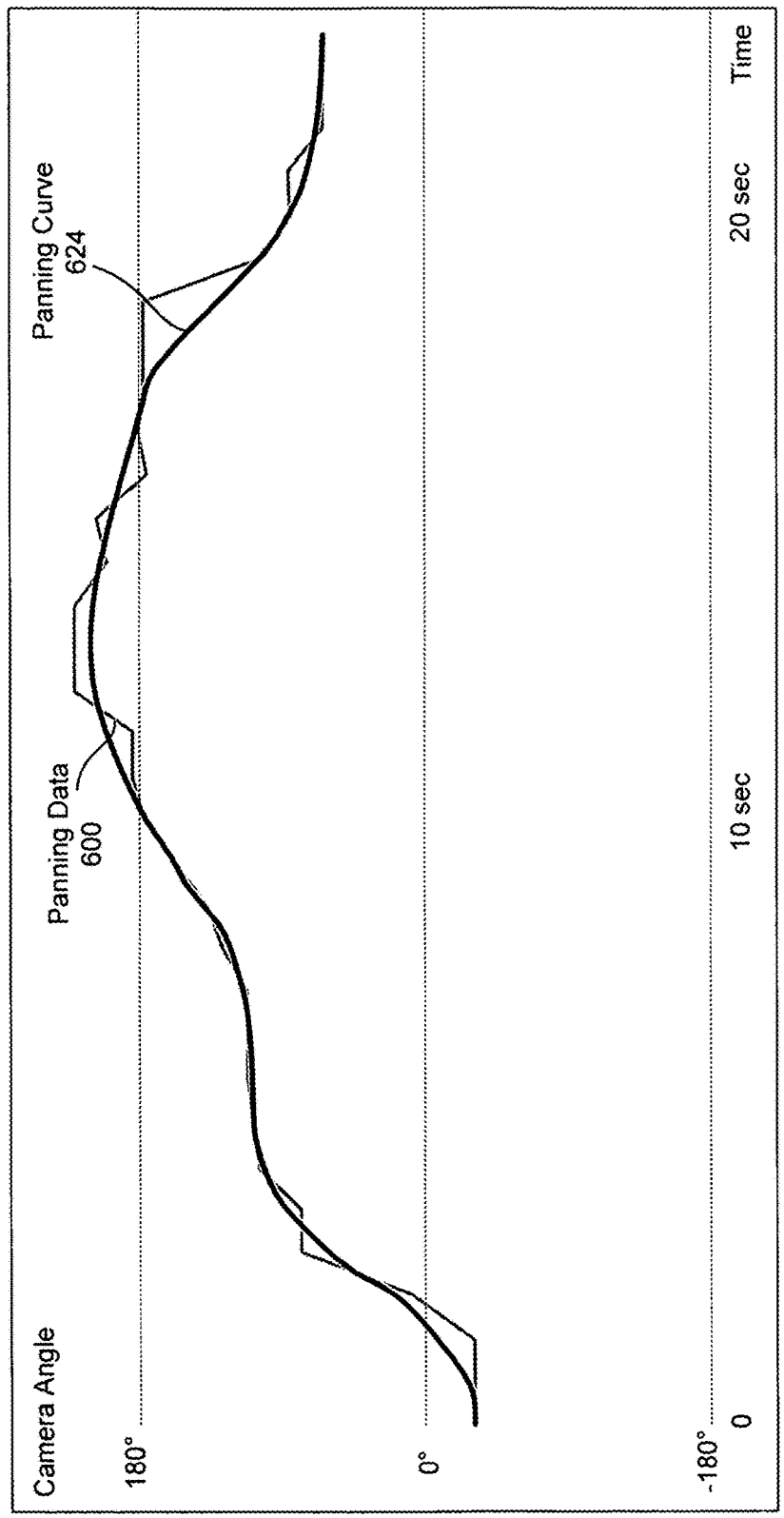

To smooth the panning data 600, the device 102 may align the handles with tangents of the panning data 600. For example, FIG. 6E illustrates Bézier points 614 with handles aligned with the panning data 600. Using the Bézier points 614, the device 102 may generate a panning curve 624 that is smoothed to improve a video playback when the video clip is rendered. As illustrated in FIG. 6F, the panning curve 624 removes variations in the panning data 600 and pans through the video data without rough transitions associated with choppy/jumpy video playback.

While FIGS. 6A-6F illustrate the device 102 generating the panning curve 624 using discrete steps, these discrete steps are included to conceptually illustrate the invention and the disclosure is not limited thereto. For example, the device 102 may receive the panning data 600 and may generate the Bézier points 614 and/or the panning curve 624 in a single step without departing from the disclosure.

Figure 7B:
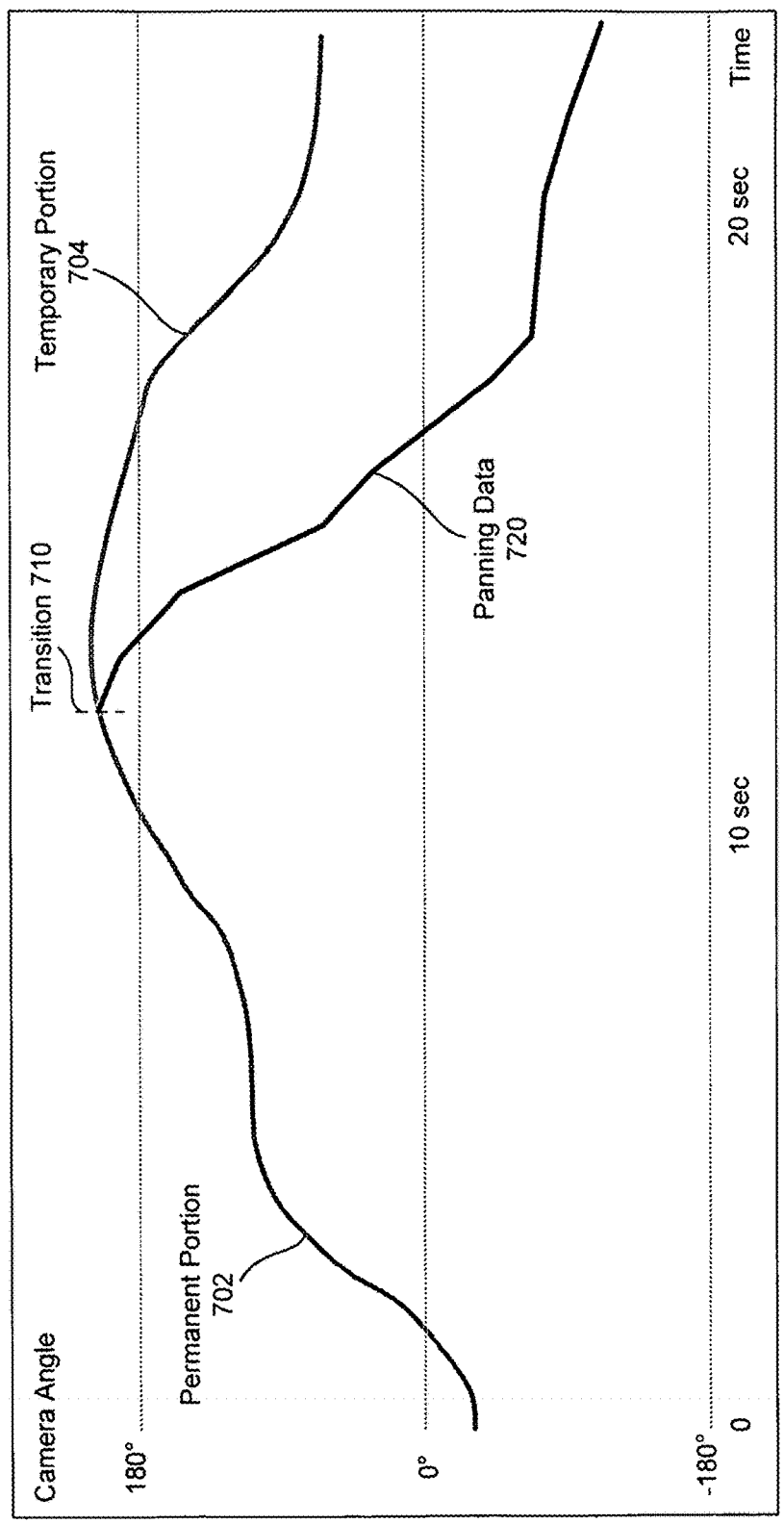

FIGS. 7A-7G illustrate examples of modifying smoothed panning data according to embodiments of the present disclosure. For example, the device 102 may display a video clip rendered using a first panning curve, may receive raw panning data associated with only a portion of the video clip and may generate a second panning curve based on the raw panning data and portions of the first panning curve. As illustrated in FIG. 7A, the device 102 may receive a panning curve 700 including a plurality of individual data points associated with a camera angle (e.g., −180° to 180°) over a period of time (e.g., 20 seconds). While FIGS. 7A-7G graphically illustrate the panning curve, the individual data points of the panning curve may be manipulated mathematically without necessarily generating a full graph or curve, for example using the Bernstein polynomial (e.g., for Bézier curves) or other parametric equations (e.g., for other parametric curves). As a result of the smoothing processing described above with regard to FIGS. 6A-6F, the panning curve 700 may include smooth transitions (e.g., change in angle is below a threshold over a duration of time). Using the panning curve 700, the device 102 may display preview video data including a portion of panoramic video data corresponding to the panning curve 700. For example, the preview video data may pan at varying speeds in a first direction from 0 seconds until 12 seconds and may pan at varying speeds in a second direction from 12 seconds to 24 seconds.

However, during playback of the preview video data, the device 102 may receive an input changing an angle within the video data. As illustrated in FIG. 7B, additional panning data 720 may be received by the device 102 beginning at transition 710. In some examples, the device 102 may playback the preview video data and may record camera angles associated with keyframes every x video frames (or increments of time) to generate the panning data 720. For example, the device 102 may record the camera angles associated with keyframes every 3 video frames, 30 video frames, every second or the like. Thus, the panning data 720 may include a series of camera angles based on a first sampling rate.

The device 102 may determine the transition 710 associated with a beginning of the panning data 720 and may separate the panning curve 700 into a permanent portion 702 prior to the transition 710 and a temporary portion subsequent to the transition 710. The device 102 may keep the permanent portion 702 and may replace the temporary portion 704 with the panning data 720.

To smooth the panning data 720, the device 102 may generate Bézier points 730, as illustrated in FIG. 7C. The Bézier points 730 may be generated every y video frames (or increments of time), resulting in a second sampling rate that is smaller than the first sampling rate. For example, the device 102 may generate the Bézier points 730 every 90 video frames, every 3 seconds or the like, although the disclosure is not limited thereto. After generating the Bézier points 730, the device 102 may shift the Bézier points 730 to align with corresponding data points in the panning data 720, as illustrated by Bézier points 732 in FIG. 7D. The Bézier points 730 illustrated in FIG. 7C are intended to conceptually illustrate the process and are not intended to limit the present disclosure. In some examples, the device 102 may generate the Bézier points 732 without performing the steps illustrated in FIG. 7C.

Figure 7D:
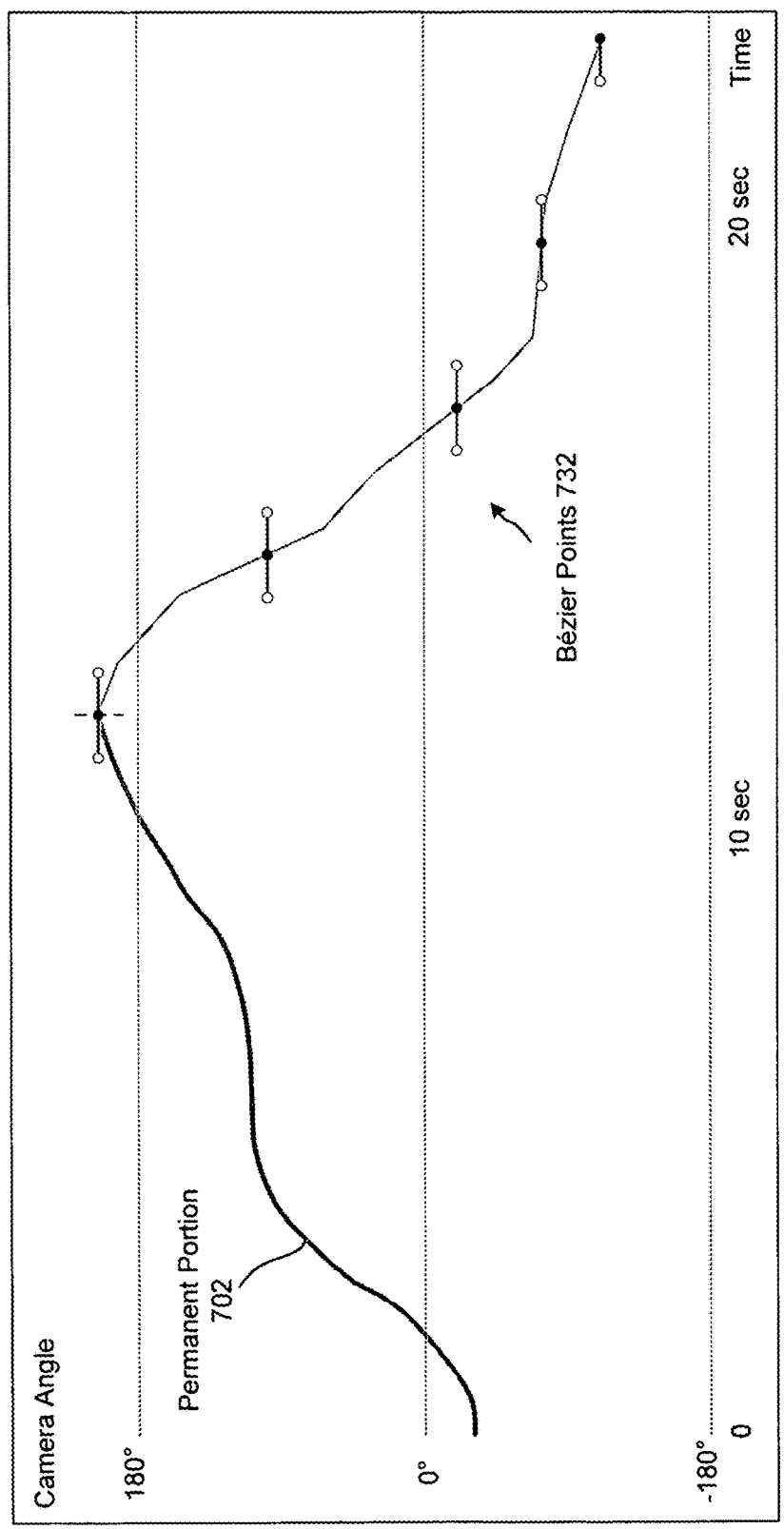

As illustrated in FIG. 7D, the Bézier points 732 are matched with corresponding keyframes in the panning data 720. For example, a first Bézier point associated with a first time may be vertically shifted to be aligned with a data point in the panning data 720 associated with the first time. The first Bézier point may include a control point (e.g., center point) through which a smoothed curve will pass, along with a handle (e.g., two endpoints) that defines the tangent vector to the curve at the control point. As illustrated in FIG. 7D, the Bézier points 732 include control points aligned with the panning data 720 (e.g., magnitude of the control point at the first time is equal to a magnitude of the panning data 730 at the first time) and two endpoints extending from the control point. The two endpoints generate the handle through the control point that may be used in smoothing the panning data 720. As illustrated in FIG. 7D, the handles of the Bézier points 732 are unaffected by the panning data 720 and extend along a horizontal axis from the control points. Using the Bézier points 732, the device 102 may generate an intermediate panning curve 742, as illustrated in FIG. 7E. The intermediate panning curve 742 is smoother than the panning data 720, but includes discrete plateaus caused by the handles of the Bézier points 732.

Figure 7G:
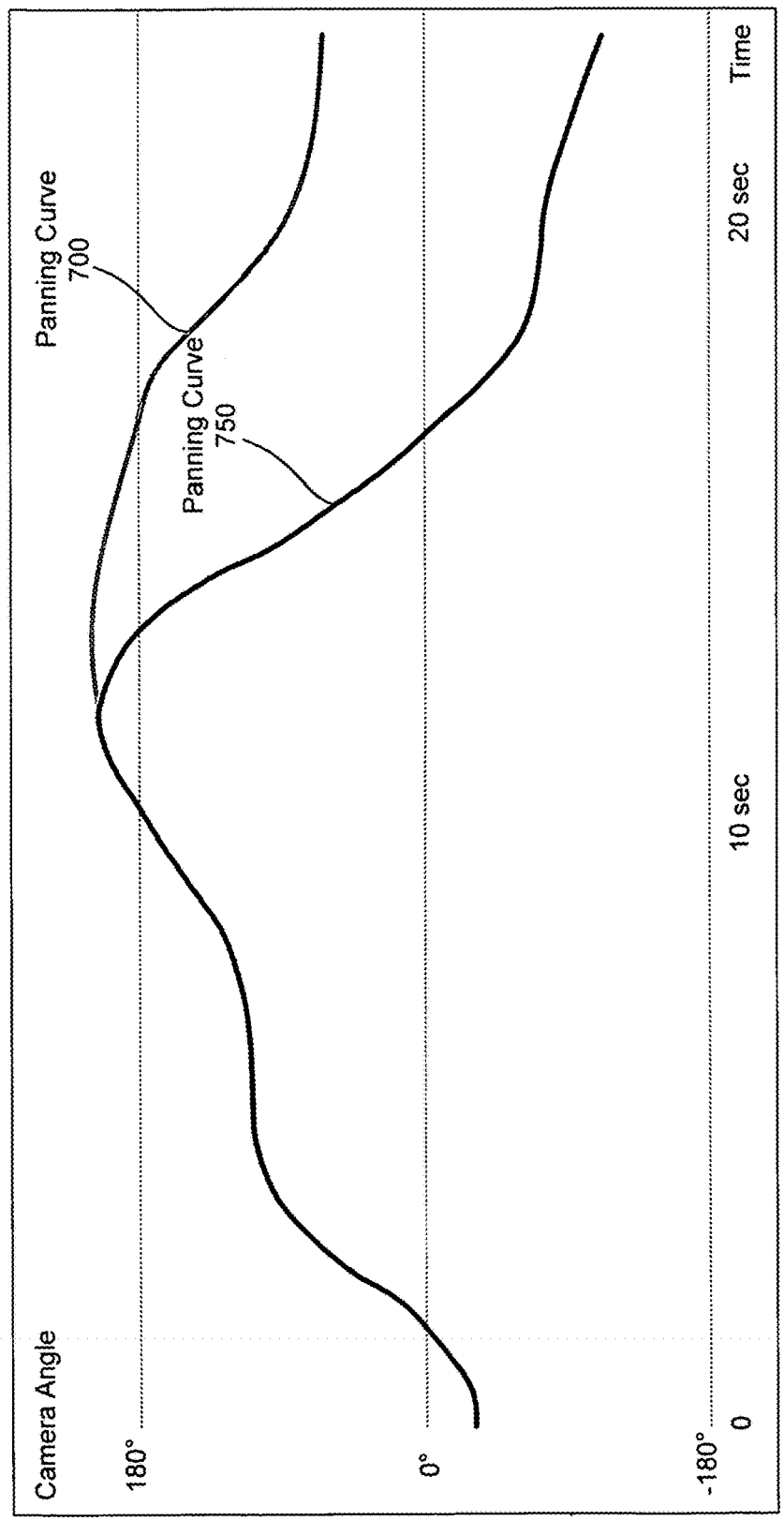

To smooth the panning data 720, the device 102 may align the handles with tangents of the panning data 720. For example, FIG. 7F illustrates Bézier points 734 with handles aligned with the panning data 720. Using the Bézier points 734, the device 102 may generate a panning curve 744 that is smoothed to improve a video playback when the video clip is rendered. The panning curve 744 removes variations in the panning data 720 and pans through the video data without rough transitions associated with choppy/jumpy video playback. As illustrated in FIG. 7G, the device 102 may combine the permanent portion 702 with the panning curve 744 to generate a panning curve 750. Thus, the device 102 may modify the temporary portion 704 of the previously created panning curve 700 while keeping the permanent portion 702 and may smoothly transition from the permanent portion 702 to the panning curve 744.

While FIGS. 7A-7G illustrate the device 102 generating the panning curve 750 using discrete steps, these discrete steps are included to conceptually illustrate the invention and the disclosure is not limited thereto. For example, the device 102 may receive the panning data 720 and may generate the Bézier points 734 and/or the panning curves 744/750 in a single step without departing from the disclosure.

In some examples, the device 102 may retain the temporary portion 704 after the panning data 720 is received and/or the panning curve 744 is generated. For example, the device 102 may retain the temporary portion 704 to enable the device 102 to revert changes and provide the previous panning curve 700 instead of the panning curve 750.

FIG. 8 is a flowchart conceptually illustrating an example method for modifying smoothed panning data according to embodiments of the present disclosure. For example, the example method illustrated in FIG. 8 may perform the steps described above to generate the panning curve 750. As illustrated in FIG. 8, the device 102 may display (810) a preview of a video clip generated using panning curve data. For example, the device 102 may have received panning data and may have generated the panning curve data, as described above with regard to FIGS. 6A-6F. The panning curve data may indicate angles within corresponding video data and the video clip may include portions of the video data corresponding to the angles. The device 102 may display a preview of the video clip as the video clip has not been fully rendered. For example, the preview of the video clip may have a relatively low resolution and/or frame rate compared to the rendered video clip. In some examples, the video clip may be rendered by the server(s) 112.

The device 102 may receive (812) raw panning data. For example, the device 102 may display the video clip to the user 10, may detect contact on the display 104 and may determine that the contact identifies a first angle (e.g., direction) in the video clip, which corresponds to a first portion of the video clip. The device 102 may record camera angles associated with keyframes every x video frames (or increments of time) to generate the raw panning data. For example, the device 102 may record the camera angles associated with keyframes every 3 video frames, 30 video frames, every second or the like. Thus, the raw panning data may include a series of camera angles based on a first sampling rate.

The device 102 may determine (814) a transition in the panning curve data associated with a beginning of the raw panning data. For example, the device 102 may determine that the raw panning data was first received at a first time and may identify a first video frame in the panning curve data associated with the first time. The device 102 may determine (816) a portion of the panning curve data prior to the transition. For example, the device 102 may identify the panning curve data prior to the transition (e.g., first video frame) and may maintain the portion of the panning curve data.

The device 102 may generate (818) Bézier points corresponding to the raw panning data. An individual Bézier point may include a control point (e.g., center point) through which a smoothed curve will pass, along with a handle (e.g., two endpoints) that defines the tangent vector to the curve at the center point. In some examples, a "steepness" of the curve may be controlled by the handles' length, with a longer handle corresponding to a steeper curve. However, the present disclosure is not limited thereto and the handles may have a uniform length without departing from the disclosure. In some examples, the device 102 may generate the Bézier points every y video frames (or increments of time), resulting in a second sampling rate that is smaller than the first sampling rate. For example, the device 102 may generate the Bézier points every 90 video frames, every 3 seconds or the like, although the disclosure is not limited thereto. In some examples, the device 102 may control a number of intervals and/or a distance between the intervals. For example, decreasing the number of intervals (e.g., increasing the distance) may further smooth the panning curve data as the device 102 may generate the panning curve data using fewer Bézier points. However, the present disclosure is not limited thereto and the device 102 may generate the Bézier points using variable intervals without departing from the disclosure. For example, the device 102 may generate Bézier points based on a slope of the raw panning data, such that portions of the raw panning data associated with larger slopes (e.g., faster rates of change) have more Bézier points than portions of the raw panning data associated with smaller slopes (e.g., slower rates of change). Thus, the device 102 may determine how many Bézier points to generate.

In some examples, the device 102 may change a weighting associated with the handles of the Bézier points. For example, the device 102 may select a first weighting (e.g., short handle) for a first Bézier point and a second weighting (e.g., long handle) for a second Bézier point. Thus, the device 102 may determine the weighting for a Bézier point based on a number of Bézier points, a slope of the panning data or the like.

The device 102 may align (820) control points of the Bézier points with the raw panning data (e.g., set a magnitude of a control point equal to a corresponding angle in the raw panning data) and may align (822) handles of the Bézier points based on the raw panning data (e.g., determine curve vectors on either side of the control point using a corresponding tangent derived from the raw panning data). In some examples, a first Bézier point associated with a first time may be vertically shifted to be aligned with a data point in the raw panning data associated with the first time. For example, a magnitude of the control point of the first Bézier point may be equal to an angle associated with the first time. Similarly, the handles of the first Bézier point may be aligned with a tangent of the raw panning data. The device 102 may calculate the tangent using a single data point (e.g., tangent associated with the first time) and/or multiple data points (e.g., tangent associated with an average over a period of time, such as a trailing average or the like). Thus, the device 102 may determine the handles of the first Bézier point with regard to data points in the raw panning data in proximity (e.g., difference in time is below a threshold) to the first time.

The device 102 may generate (824) second panning curve data using the Bézier points. For example, the device 102 may determine an amount of smoothing associated with the Bézier points and generate the second panning curve data using the Bézier points. The device 102 may send (826) the second panning curve data to a remote device (e.g., the server(s) 112 and/or the image capture device 110) and may receive (828) a second video clip generated using the second panning curve data from the remote device. For example, the server(s) 112 may generate the second video clip data including portions of high resolution video data indicated by the second panning curve data. However, the disclosure is not limited thereto and in some examples the device 102 may use the second panning curve data to generate the second video clip locally on the device 102. For example, the device 102 may generate the second video clip including portions of low resolution video data indicated by the second panning curve data, although the disclosure is not limited thereto.

Figure 9A:
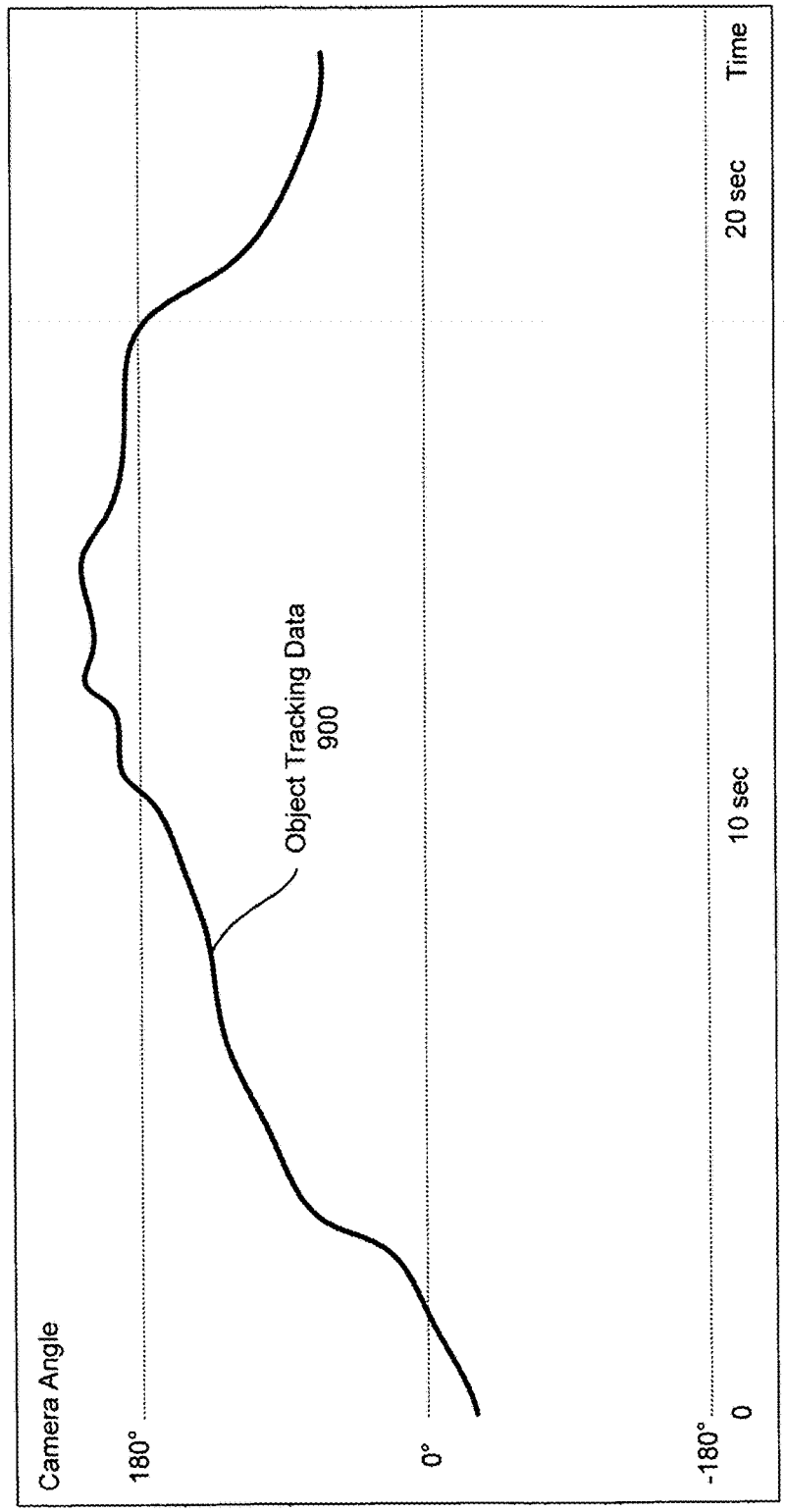

FIGS. 9A-9E illustrate examples of generating panning data using object tracking according to embodiments of the present disclosure. As illustrated in FIG. 9A, the device 102 may determine object tracking data 900 that indicates a relative angle/position of the object in the video data at various times. In some examples, the device 102 may determine the object tracking data 900 using computer vision processing of the video data. Additionally or alternatively, the device 102 may determine the object tracking data 900 based on annotation data received by the device 102. The annotation data may include an angle and/or position associated with an object represented in the video data.

The device 102 may use the object tracking data 900 as the raw panning data, to modify portions of the raw panning data, replace portions of the raw panning data and/or modify Bézier points. In some examples, the device 102 may determine to use the object tracking data 900 as the raw panning data and generate Bézier points and/or panning curve data based on the object tracking data 900. As a first example, during playback of video data the device 102 may receive a command identifying the object in the video data and the device 102 may determine the object tracking data 900 and generate the panning curve data. For example, the device 102 may display the video data to a user 10 and the user 10 may select the object represented in the video data as a tracking point. As a second example, the device 102 may determine that the panning data is similar to the object tracking data 900 and replace the raw panning data with the object tracking data 900.

Figure 9B:
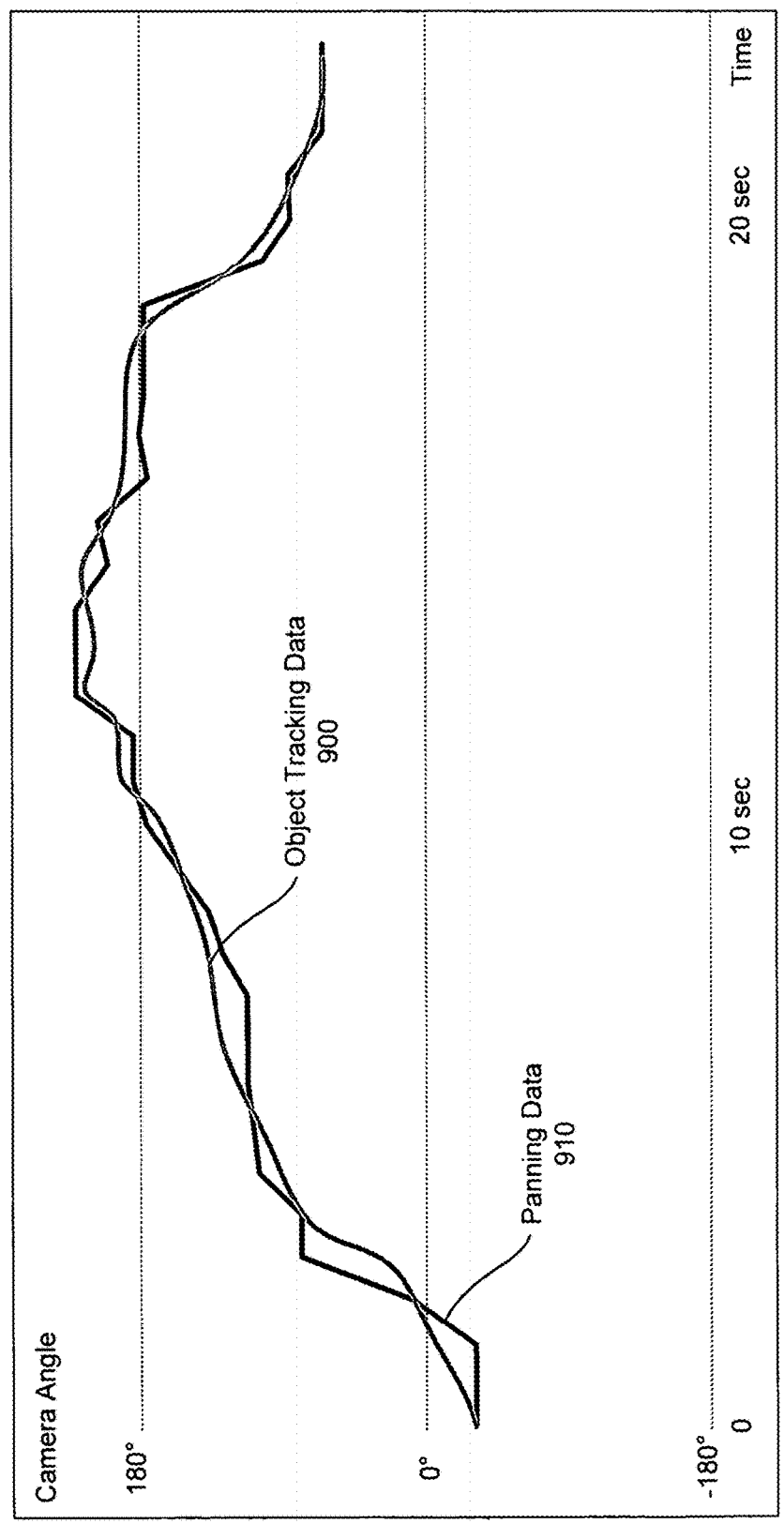

As illustrated in FIG. 9B, the device 102 may determine that raw panning data is similar to the object tracking data 900 and may determine that the user 10 intended to track the object. Thus, the device 102 may receive panning data 910 illustrated in FIG. 9B and may determine that the panning data 910 is substantially similar to the object tracking data 900. The device 102 may determine that the panning data 910 is similar to the object tracking data 900 based on a proximity between individual data points (e.g., a distance between the individual data points is below a threshold), based on similar waveforms (e.g., peak values coincide) or the like. After determining that the user 10 intended to track the object, the device 102 may replace the panning data 910 with the object tracking data 900 and generate the panning curve data corresponding to the tracked object.

Additionally or alternatively to replacing an entirety of the panning data 910 with the object tracking data 900, the device 102 may replace portions of the panning data 910 with portions of the object tracking data 900. For example, the device 102 may determine that only a portion of the panning data 910 corresponds to the object tracking data 900 and may replace only the portion.

In some examples, the device 102 may modify the panning data 910, generated Bézier curves and/or panning curve data based on the object tracking data 900 to ensure that the object is represented in a rendered video clip. For example, the device 102 may determine that the panning data 910 corresponds to the object tracking data 900 but may modify portions of the panning data 910, generate Bézier points and/or panning curve data using the panning data 910. As a first example, the device 102 may determine that a distance between individual data points between the panning data 910 and the object tracking data 900 exceeds a threshold and may modify the individual data points of the panning data 910 accordingly. As a second example, the device 102 may generate a Bézier point associated with the panning data 910 and may determine a control point and/or handles of the Bézier point using the panning data 910 and the object tracking data 900. For example, the device 102 may align the handles with a tangent of the object tracking data 900, an average of a first tangent of the object tracking data 900 and a second tangent of the panning data 910 or the like.

Figure 9C:
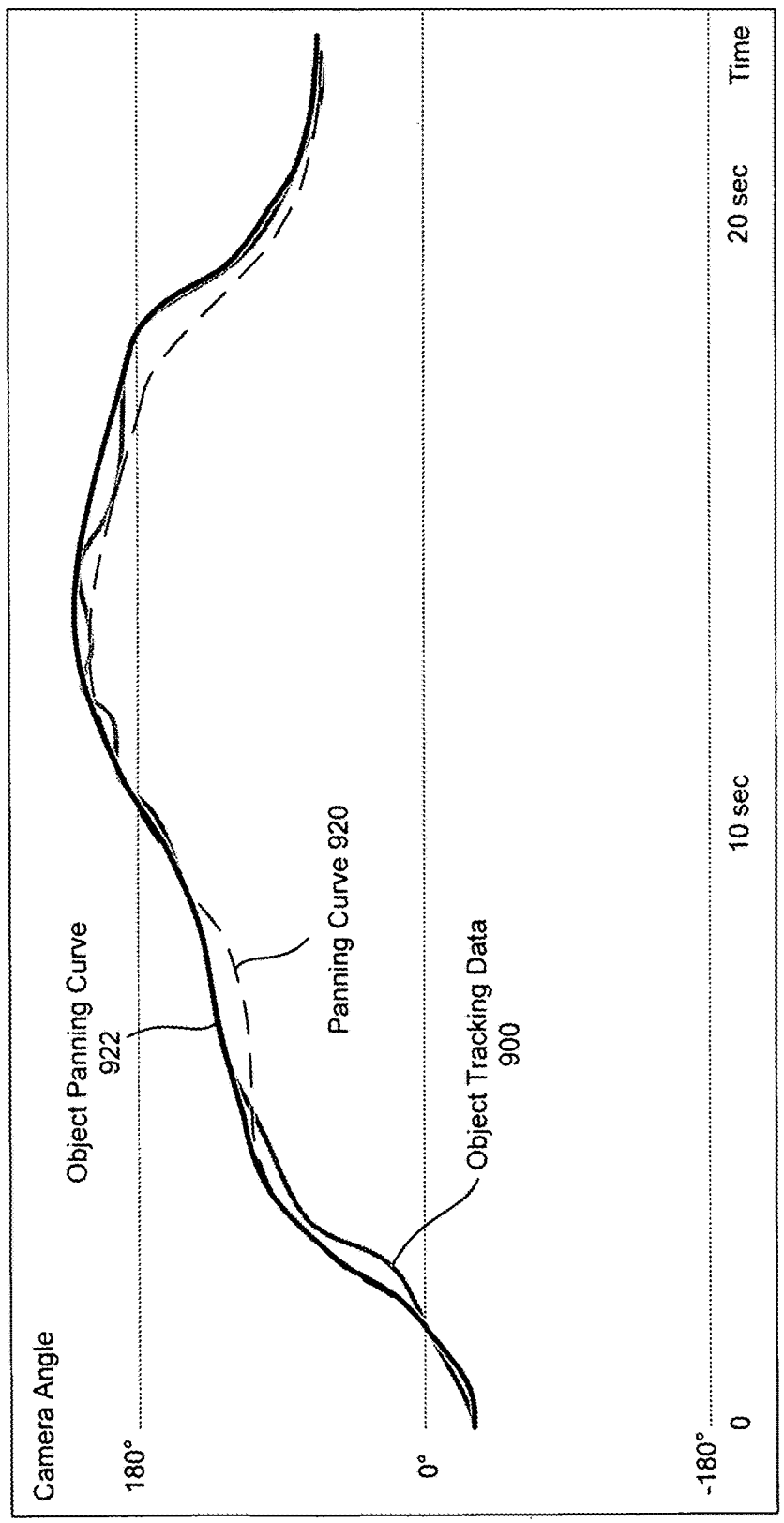

As a third example, the device 102 may generate panning curve data based on the panning data 910 and may compare the panning curve data to the object tracking data 900. If the device 102 determines that a portion of the panning curve data does not include the object based on the object tracking data 900, the device 102 may modify the panning curve data accordingly. For example, FIG. 9C illustrates a panning curve 920 determined by the device 102 based on the panning data 910. While the panning curve 920 smoothes the panning data 910 to remove rough transitions or jumpy/choppy video frames, portions of the panning curve 920 do not correspond to the object tracking data 900. Therefore, the device 102 may generate an object panning curve 922, modifying the panning curve 920 based on the object tracking data 900. In the example illustrated in FIG. 9C, the device 102 may generate the object panning curve 922 based on a furthest angle associated with the object. For example, while the object tracking data 900 includes a series of small peaks, the object panning curve 922 includes a smooth peak encompassing the furthest angle associated with the series of small peaks. Thus, the object panning curve 922 maintains a similar waveform as the panning curve 920, with smooth transitions (e.g., slopes below a threshold) and panning between camera angles, while including the object at all times.

Figure 9D:
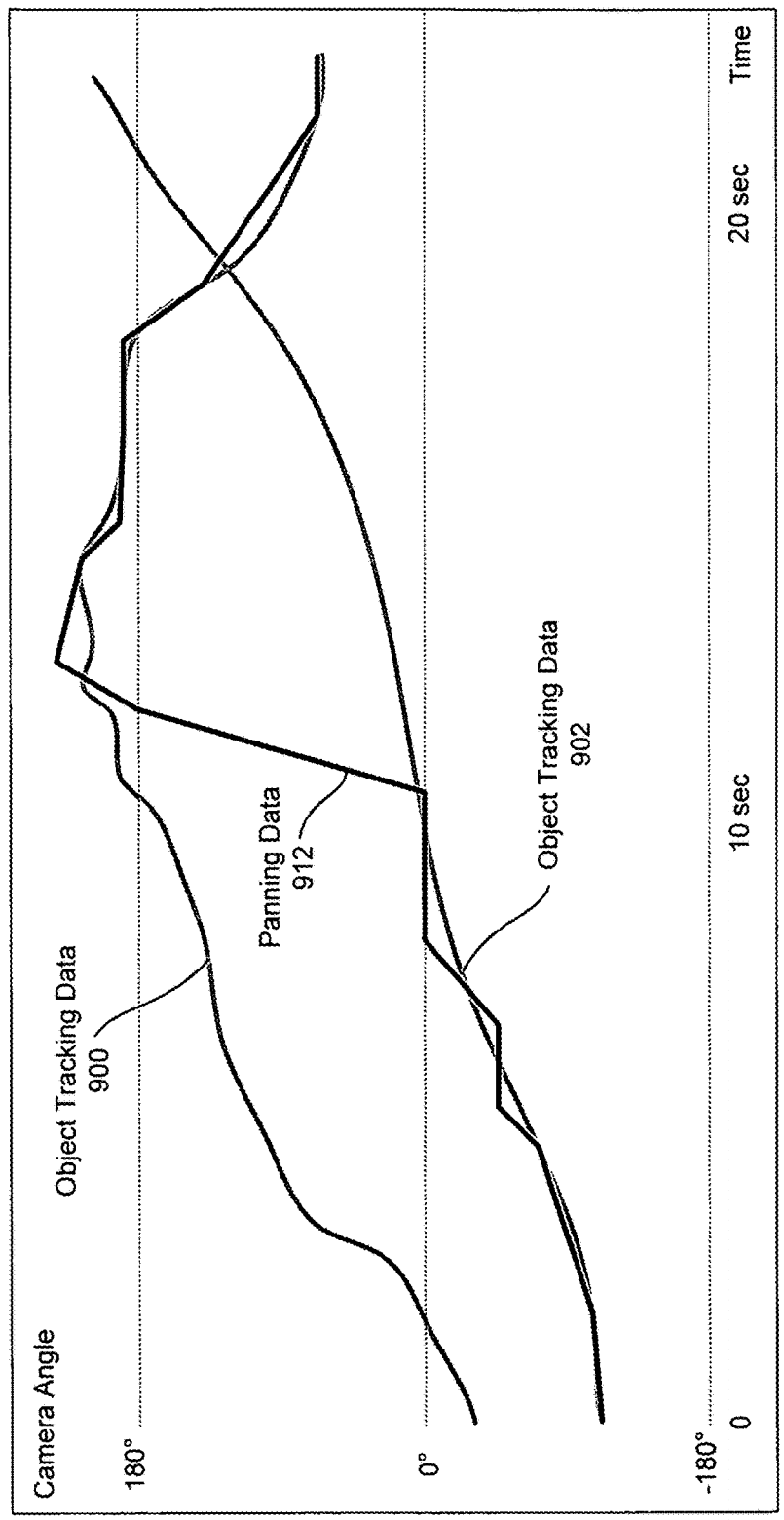

In some examples, the device 102 may associate panning data with object tracking data and snap the panning data to the object tracking data. For example, the device 102 may determine first object tracking data 900 and second object tracking data 902 and may receive panning data 912. As illustrated in FIG. 9D, the device 102 may determine that a first portion of the panning data 912 corresponds to the second object tracking data 902 while a second portion of the panning data 912 corresponds to the first object tracking data 900. Therefore, the device 102 may snap the panning data 912 to corresponding data points from the first object tracking data 900 and the second object tracking data 902 to generate an object panning curve 930. Thus, the device 102 may determine that the panning data is in proximity to object tracking data and may replace the panning data with the object tracking data or may determine that the panning data is not in proximity to the object tracking data and may maintain the panning data. While examples of the panning data being snapped to the object tracking data are illustrated, the present disclosure is not limited thereto. In some examples, the snapping function may be selectively enabled or disabled based on user preference.

Figure 10:
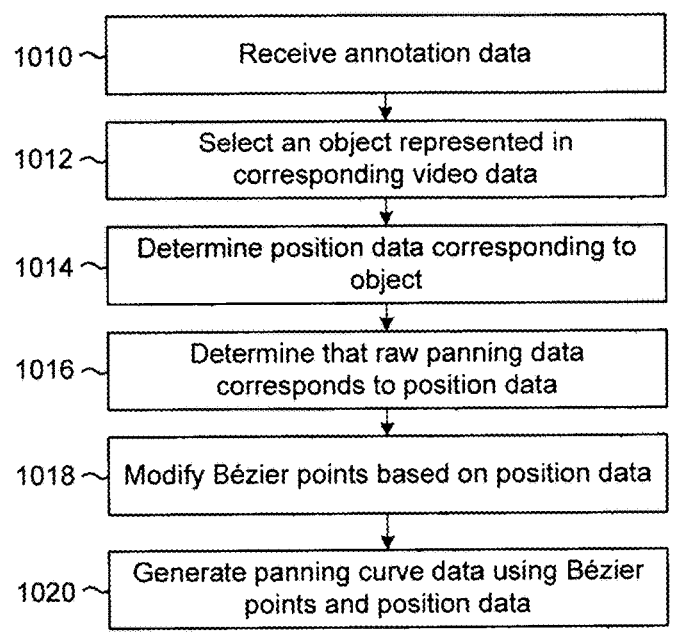
FIG. 10 is a flowchart conceptually illustrating an example method for modifying smoothed panning data according to embodiments of the present disclosure.

FIG. 10 is a flowchart conceptually illustrating an example method for modifying smoothed panning data according to embodiments of the present disclosure. As illustrated in FIG. 10, the device 102 may receive (1010) annotation data, may select (1012) an object represented in corresponding video data and may determine (1014) position data associated with the object. The device 102 may determine (1016) that raw panning data corresponds to the pixel coordinates (e.g., angle) and may determine that the raw panning data corresponds to the object. The device 102 may modify (1018) Bézier points based on the position data and may generate (1020) panning curve data using the Bézier points and/or the position data. Thus, as discussed above with regard to FIGS. 9A-9E, the device 102 may generate the panning curve data to keep the object in view in the rendered video data.

In some examples, the device 102 may determine an amount of smoothing and/or perform additional smoothing after generating the panning curve data. For example, the device 102 may determine that the raw panning data includes a number of rough transitions or other unintended variations that exceeds a threshold and therefore requires additional smoothing prior to rendering the video data. FIGS. 11A-11F illustrate examples of smoothing panning data according to embodiments of the present disclosure. However, increasing the amount of smoothing may result in less granularity and detail in the panning curve data, which may negatively impact a video rendered using the palming curve data. For example, the rendered video may omit portions of an object/scene intended to be included by the user 10 as a result of the smoothing. Therefore, the device 102 may perform additional smoothing in conjunction with the object tracking described above with regard to FIGS. 9A-9E.

In some examples, the device 102 may perform a first smoothing process on raw panning input to generate first panning curve data and may perform a second smoothing process on the first panning curve data to generate second panning curve data. As illustrated in FIG. 11A, the device 102 may generate Bézier points 1110 using a panning curve 1100 to create the second panning curve data. The device 102 may perform the steps described above with regard to FIGS. 6A-6F until output panning curve data is sufficiently smooth, which may be determined by a number of rough transitions (e.g., variations in slope exceeding a first threshold) being below a second threshold. However, the present disclosure is not limited thereto and the device 102 may determine to perform multiple iterations of the smoothing process based on other criteria and/or using any technique known to one of skill in the art without departing from the disclosure.

In some examples, the device 102 may control an amount of smoothing by determining a number of Bézier points and/or an interval associated with the Bézier points. For example, reducing a number of Bézier points and/or increasing the interval between the Bézier points may result in additional smoothing. As illustrated in FIG. 11B, the device 102 may receive panning data 1120 and generate Bézier points 1112 using a reduced number of Bézier points and/or increased interval between the Bézier points relative to the Bézier points 1110. For example, the Bézier points 1110 illustrated in FIG. 11A include ten discrete points whereas the Bézier points 1112 illustrated in FIG. 11B include six discrete points. By reducing the number of Bézier points, the device 102 may increase an amount of smoothing associated with generated panning curve data.

In some examples, the device 102 may determine an amount of Bézier points to include based on variations and/or slopes in raw panning data. Thus, the device 102 may group portions of the raw panning data and may generate the Bézier points accordingly. For example, portions of the raw panning data associated with a rapid change in camera angle (e.g., slope above a threshold) may have additional Bézier points relative to portions of the raw panning data associated with slow change in camera angle (e.g., slope below the threshold). The device 102 may determine the points of greatest change and/or the slopes using derivatives of the panning data. As illustrated in FIG. 11C, the device 102 may receive panning data 1120 and may generate Bézier points 1114 with shorter intervals where the camera angle changes quickly (e.g., 1 second to 4 seconds, 11 seconds to 15 seconds, etc.) and longer intervals where the camera angle changes slowly (e.g., 4 seconds to 10 seconds, 15 seconds to 18 seconds, etc.). Thus, the device may include additional Bézier points 1114 to smooth the panning data 1120 while maintaining granularity and detail intended by the user 10.

In some examples, the device 102 may determine a weighting associated with a handle for each of the Bézier points. As illustrated in FIG. 11D, Bézier points 1116 may include a first Bézier point 1116a with a relatively longer handle than the other Bézier points 1116. While the first Bézier point 1116a includes a symmetric handle (e.g., endpoints are an equal distance from the center point), the present disclosure is not limited thereto. Instead, the Bézier points 1116 may include a second Bézier point 1116b having an asymmetric handle (e.g., first endpoint is a first distance from center pointer and second endpoint is a second distance from center point). Other variations in the handles and/or Bézier points may be included in the present disclosure.

In some examples, the device 102 may determine a panning curve based on three Bézier points. As illustrated in FIG. 11E, the device 102 may determine a first Bézier point 1118a at a beginning of the panning data 1120, a second Bézier point 1118b in the middle of the panning data 1120 and a third Bézier point 1118c at an end of the panning data 1120. As shown, the first Bézier point 1118a has no handle, the second Bézier point 1118b has a relatively large, symmetric handle and the third Bézier point 1118c has half of a handle. Using the Bézier points 1118, the device 102 may generate the panning curve 1122, which may be an extremely smooth curve generated from very few Bézier points.

Figure 11F:
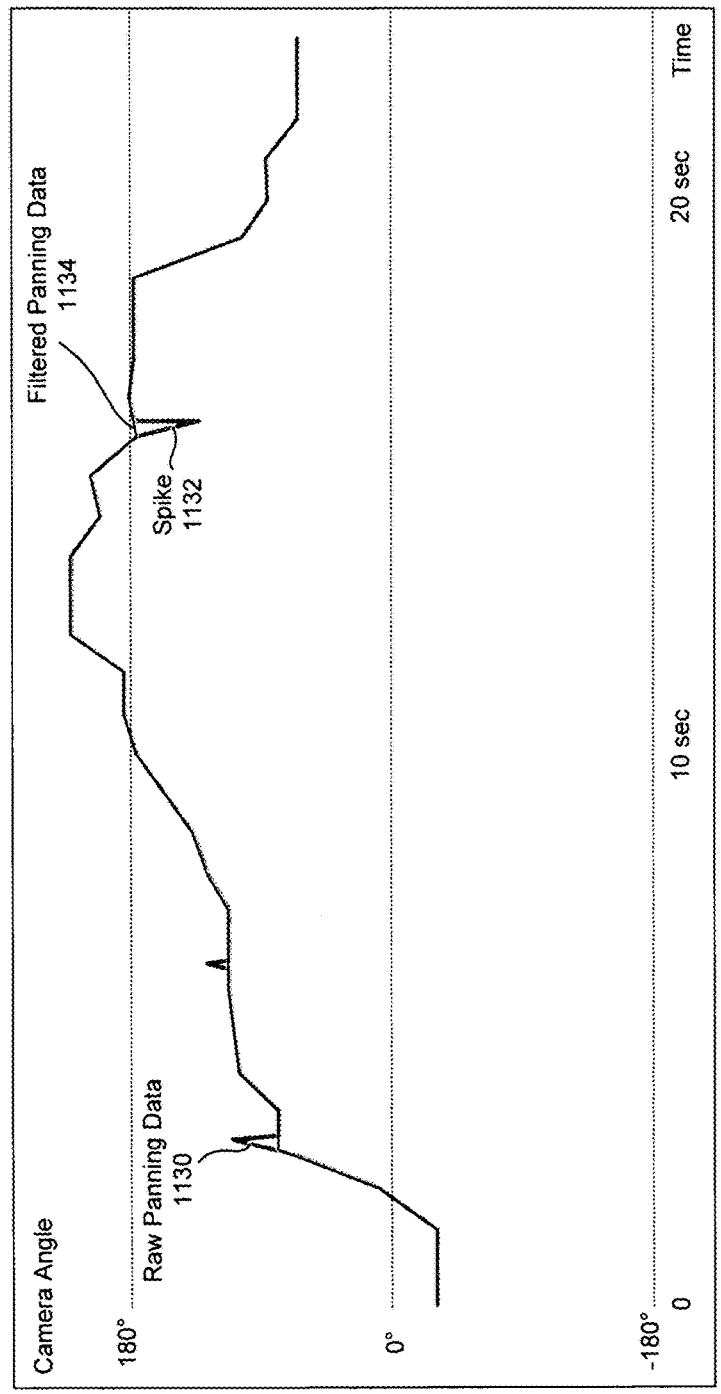

In some examples, the device 102 may filter raw panning data to remove sharp transitions prior to performing smoothing to generate the panning curve data. As illustrated in FIG. 11F, the device 102 may receive raw panning data 1130 including rapid transitions such as a spike 1132. By filtering the raw panning data 1130, the device 102 may generate filtered panning data 1134 that removes the spike 1132. As an example of filtering the raw panning data, the device 102 may determine a difference between adjacent camera angles and may remove camera angels associated with a difference above a threshold. For example, the device 102 may determine that the spike 1132 fluctuates from adjacent data camera angles above the threshold and the device 102 may replace the spike 1132 with an average of the adjacent camera angles or the like.

Figure 12A:
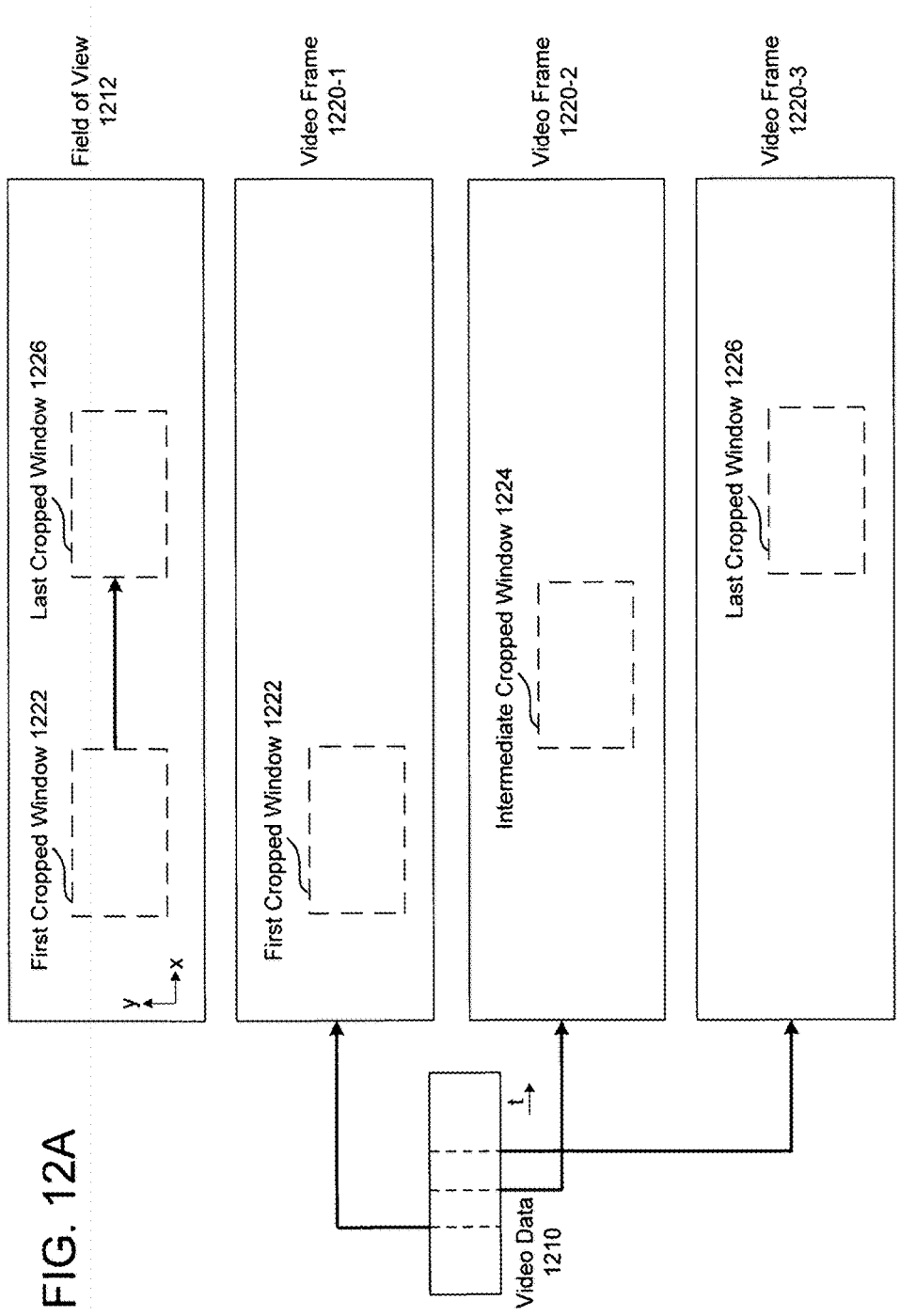
Figure 12B:
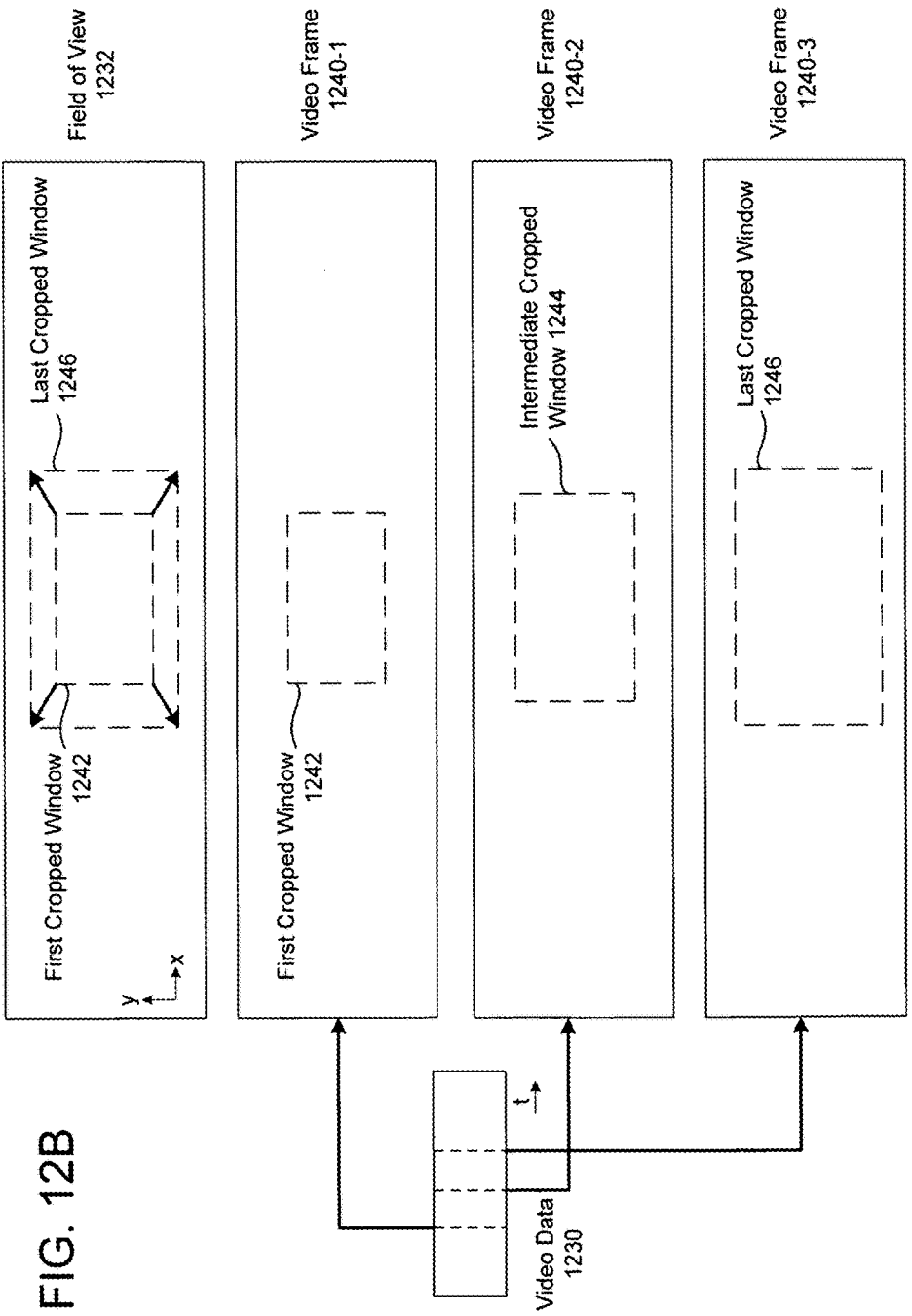

In addition receiving raw panning data associated with video data (to pan within the video data), the device 102 may receive raw magnification data (to zoom within the video data). Therefore, in addition to smoothing panning data to generate panning curve data, the device 102 may receive raw magnification data (e.g., amount of zoom) and may smooth the raw magnification data to generate magnification curve data. To illustrate the concept, FIGS. 12A-12C illustrate examples of panning, zooming and panning while zooming according to embodiments of the present disclosure. For example, the device 102 may determine a first framing window at a beginning of a video clip and a second framing window at an end of the video clip and may pan/zoom between the first framing window and the second framing window over a length of the video clip. As used hereinafter, for ease of explanation and to avoid confusion with a "video frame," a "framing window" may be referred to as a "cropped window" in reference to the video clip data. For example, a video frame may include image data associated with the video data and the device 102 may determine a framing window within the image data associated with a cropped window. Thus, the cropped window may include a portion of the image data (e.g., cropped image) and dimensions of the cropped window may be smaller than dimensions of the video frame, in some examples significantly smaller. The output video data may include a plurality of cropped windows, effectively cropping the video data based on the framing windows determined by the device 102.

FIG. 12A illustrates an example of panning using a panning curve according to embodiments of the present disclosure. As illustrated in FIG. 12A, the device 102 may pan from a first cropped window 1222 to a last cropped window 1226 within a field of view 1212 associated with video data 1210. For example, the field of view 1212 may include a plurality of pixels in an x and y array, such that each pixel is associated with x and y coordinates of the video data 1210. A first video frame 1220-1 includes first image data associated with a first time, a second video frame 1220-2 includes second image data associated with a second time and a third video frame 1220-3 includes third image data associated with a third time. To simulate panning, the device 102 may determine a first cropped window 1222 in the first video frame 1220-1, an intermediate cropped window 1224 in the second video frame 1220-2 and a last cropped window 1226 in the third video frame 1220-3.

As illustrated in FIG. 12A, the simulated panning travels in a horizontal direction (e.g., positive x direction) from a first location of the first cropped window 1222 through a second location of the intermediate cropped window 1224 to a third location of the last cropped window 1226. Therefore, the simulated panning extends along the x axis without vertical movements in the output video data, although the disclosure is not limited thereto. Further, as dimensions of the first cropped window 1222 are equal to dimensions of the intermediate cropped window 1224 and the last cropped window 1226, the output video data generated by the device 102 will pan from left to right without zooming in or out.

While FIG. 12A illustrates a single intermediate cropped window 1224 between the first cropped window 1222 and the last cropped window 1226, the disclosure is not limited thereto and the output video data may include a plurality of intermediate cropped windows without departing from the present disclosure.

FIG. 12B illustrates an example of zooming using a magnification curve according to embodiments of the present disclosure. As illustrated in FIG. 12B, the device 102 may zoom from a first cropped window 1242 to a last cropped window 1246 within a field of view 1232 associated with video data 1230. For example, the field of view 1232 may include a plurality of pixels in an x and y array, such that each pixel is associated with x and y coordinates of the video data 1230. A first video frame 1240-1 includes first image data associated with a first time, a second video frame 1240-2 includes second image data associated with a second time and a third video frame 1240-3 includes third image data associated with a third time. To simulate zooming, the device 102 may determine a first cropped window 1242 in the first video frame 1240-1, an intermediate cropped window 1244 in the second video frame 1240-2 and a last cropped window 1246 in the third video frame 1240-3.

As illustrated in FIG. 12B, the simulated zooming increases horizontal and vertical dimensions (e.g., x and y dimensions) from first dimensions of the first cropped window 1242 through second dimensions of the intermediate cropped window 1244 to third dimensions of the last cropped window 1246. Therefore, the output video data generated by the device 102 will zoom out without panning left or right, such that the last cropped window 1246 may appear to include more content than the first cropped window 1242. While FIG. 12B illustrates a single intermediate cropped window 1244 between the first cropped window 1242 and the last cropped window 1246, the disclosure is not limited thereto and the output video data may include a plurality of intermediate cropped windows without departing from the present disclosure.

FIG. 12C illustrates an example of panning using a panning curve and zooming using a magnification curve according to embodiments of the present disclosure. As illustrated in FIG. 12C, the device 102 may pan and zoom from a first cropped window 1262 to a last cropped window 1266 within a field of view 1252 associated with video data 1250. For example, the field of view 1252 may include a plurality of pixels in an x and y array, such that each pixel is associated with x and y coordinates of the video data 1250. A first video frame 1260-1 includes first image data associated with a first time, a second video frame 1260-2 includes second image data associated with a second time and a third video frame 1260-3 includes third image data associated with a third time. To simulate both panning and zooming, the device 102 may determine a first cropped window 1262 in the first video frame 1260-1, an intermediate cropped window 1264 in the second video frame 1260-2 and a last cropped window 1266 in the third video frame 1260-3.

As illustrated in FIG. 12C, the device 102 simulates panning by moving in a horizontal direction (e.g., positive x direction) between the first cropped window 1262, the intermediate cropped window 1264 and the last cropped window 1266. Similarly, the device 102 simulates zooming by increasing horizontal and vertical dimensions (e.g., x and y dimensions) from first dimensions of the first cropped window 1262 through second dimensions of the intermediate cropped window 1264 to third dimensions of the last cropped window 1266. Therefore, the output video data generated by the device 102 will zoom out while panning to the right, such that the last cropped window 1266 may appear to include more content than the first cropped window 1262 and may be associated with a location to the right of the first cropped window 1262. While FIG. 12C illustrates a single intermediate cropped window 1264 between the first cropped window 1262 and the last cropped window 1266, the disclosure is not limited thereto and the output video data may include a plurality of intermediate cropped windows without departing from the present disclosure.

As discussed above, the device 102 receive raw panning data and/or raw magnification data and may smooth the raw panning data and/or the raw magnification data. For example, a user 10 may input the raw magnification data using a pinching motion to zoom in or out. However, each pinching motion may result in a fixed change in magnification. Therefore, the user 10 may need to perform multiple pinching motions to input a change in magnification above a threshold, resulting in jerky zooming. To smooth the zooming effect to remove unintended variations in the raw magnification data, the device 102 may perform the steps described above on the raw magnification data. FIG. 13 illustrates an example of generating smoothed panning data and smoothed zooming data according to embodiments of the present disclosure. As illustrated in FIG. 13, the device 102 may generate a panning curve 1310 (e.g., by smoothing raw panning data input to the device 102) and a zoom curve 1320 (e.g., by smoothing raw magnification data input to the device 102). Therefore, unintended variations included in the raw panning data and/or the raw magnification data input to the device 102 may be removed.

While FIG. 13 illustrates the device 102 generating smoothed panning data and/or smoothed zooming data, the disclosure is not limited thereto. Instead, the device 102 may receive input data associated with additional commands and may smooth the input data. For example, the additional commands may be associated with video transitions (e.g., rotating video during animated transitions between a first video clip and a second video clip), audio transitions (e.g., smoothly transitioning to include audio data associated with a portion of a video clip), or the like. For example, a video clip capturing a birthday party may include audio data and the device 102 may receive input transitioning from a music track to the audio data to enable a video summarization to include the audio data corresponding to singing "Happy Birthday."

Figure 14:
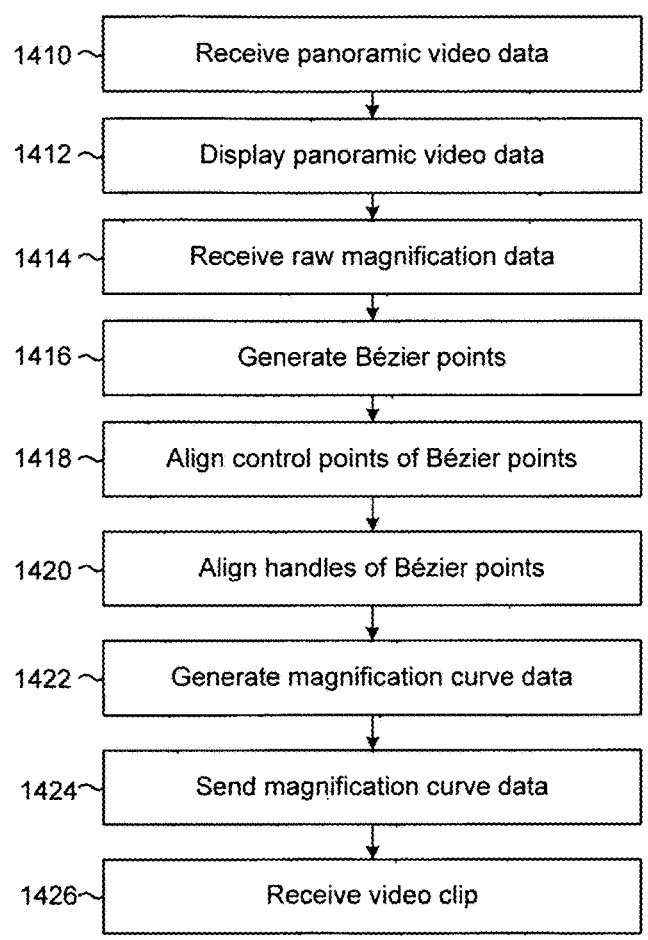
FIG. 14 is a flowchart conceptually illustrating an example method for smoothing magnification data according to embodiments of the present disclosure.

FIG. 14 is a flowchart conceptually illustrating an example method for smoothing magnification data according to embodiments of the present disclosure. As illustrated in FIG. 14, the device 102 may receive panoramic video data (1410), may display (1412) the panoramic video data and may receive (1414) raw magnification data. For example, the device 102 may display the panoramic video data to the user 10, may detect contact on the display 104 and may determine that the contact identifies a first magnification value (e.g., zoom) in the panoramic video data, which corresponds to a first portion of the panoramic video data. The device 102 may record magnification values associated with keyframes every x video frames (or increments of time) to generate the raw magnification data. For example, the device 102 may record the magnification values associated with keyframes every 3 video frames, 30 video frames, every second or the like. Thus, the raw magnification data may include a series of magnification values based on a first sampling rate.

The device 102 may generate (1416) Bézier points corresponding to the raw magnification data. An individual Bézier point may include a control point (e.g., center point) through which a smoothed curve will pass, along with a handle (e.g., two endpoints) that defines the tangent vector to the curve at the center point. In some examples, a "steepness" of the curve may be controlled by the handles length, with a longer handle corresponding to a steeper curve. However, the present disclosure is not limited thereto and the handles may have a uniform length without departing from the disclosure. In some examples, the device 102 may generate the Bézier points every y video frames (or increments of time), resulting in a second sampling rate that is smaller than the first sampling rate. For example, the device 102 may generate the Bézier points every 90 video frames, every 3 seconds or the like, although the disclosure is not limited thereto. In some examples, the device 102 may control a number of intervals and/or a distance between the intervals. For example, decreasing the number of intervals (e.g., increasing the distance) may further smooth the magnification curve data as the device 102 may generate the magnification curve data using fewer Bézier points. However, the present disclosure is not limited thereto and the device 102 may generate the Bézier points using variable intervals without departing from the disclosure. For example, the device 102 may generate Bézier points based on a slope of the raw magnification data, such that portions of the raw magnification data associated with larger slopes (e.g., faster rates of change) have more Bézier points than portions of the raw magnification data associated with smaller slopes (e.g., slower rates of change).

The device 102 may align (1418) control points of the Bézier points with the raw magnification data (e.g., set a magnitude of a control point equal to a corresponding magnification value in the raw magnification data) and align (1420) handles of the Bézier points based on the raw magnification data (e.g., determine curve vectors on either side of the control point using a corresponding tangent derived from the raw magnification data). In some examples, a first Bézier point associated with a first time may be vertically shifted to be aligned with a data point in the raw magnification data associated with the first time. For example, a magnitude of the control point of the first Bézier point may be equal to a magnification value associated with the first time. Similarly, the handles of the first Bézier point may be aligned with a tangent of the raw magnification data. The device 102 may calculate the tangent using a single data point (e.g., tangent associated with the first time) and/or multiple data points (e.g., tangent associated with an average over a period of time, such as a trailing average or the like). Thus, the device 102 may determine the handles of the first Bézier point with regard to data points in the raw magnification data in proximity to the first time (e.g., difference in time is below a threshold).

The device 102 may generate (1422) magnification curve data based on the Bézier points. For example, the device 102 may determine an amount of smoothing associated with the Bézier points and generate the magnification curve data using the Bézier points.

The device 102 may send (1424) the magnification curve data to a remote device (e.g., the server(s) 112 and/or the image capture device 110) and receive (1426) a video clip generated using the magnification curve data from the remote device. For example, the server(s) 112 may generate the video clip data including portions of high resolution video data indicated by the magnification curve data. However, the disclosure is not limited thereto and in some examples the device 102 may use the magnification curve data to generate the video clip locally on the device 102. For example, the device 102 may generate the video clip including portions of low resolution video data indicated by the magnification curve data, although the disclosure is not limited thereto.

Figure 15:
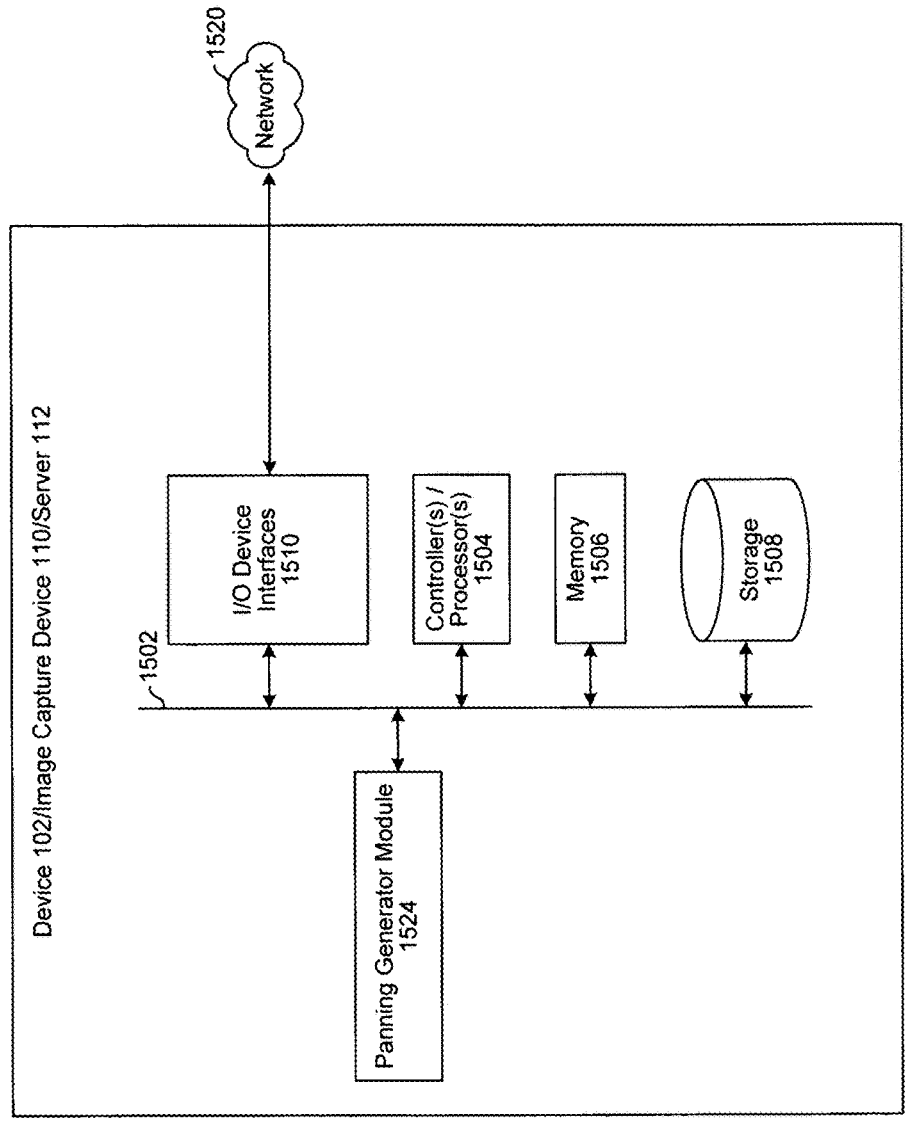
FIG. 15 is a block diagram conceptually illustrating example components of a system according to embodiments of the present disclosure.

FIG. 15 illustrates a block diagram conceptually illustrating example components of a system 100 including one or more of a device 102, an image capture device 110 and/or a server(s) 112. Depending upon how the system is structured, some of the components illustrated in FIG. 15 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1508 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 15, the device 102/image capture device 110/server(s) 112 may include an address/data bus 1502 for conveying data among components of the device 102/image capture device 110/server(s) 112. Each component within the device 102/image capture device 110/server(s) 112 may also be directly connected to other components in addition to (or instead of) being connected to other components across the bus 1502.

The device 102/image capture device 110/server(s) 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/image capture device 110/server(s) 112 may also include a data storage component 1508 for storing data and processor-executable instructions. The data storage component 1508 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1510.

The device 102/image capture device 110/server(s) 112 includes input/output device interfaces 1510. A variety of components may be connected to the device 102/image capture device 110/server(s) 112 through the input/output device interfaces 1510, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 1510 may be configured to operate with a network 1520, for example a wireless local area network (WLAN) (such as WiFi), Bluetooth, ZigBee and/or wireless networks, such as a Long Term Evolution (LTE) network, WiMAX network, 3G network, etc. The network 1520 may include a local or private network or may include a wide network such as the internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a panning generator module 1524, which may comprise processor-executable instructions stored in storage 1508 to be executed by controller(s)/processor(s) 1504 (e.g., software, firmware), hardware, or some combination thereof. For example, components of the panning generator module 1524 may be part of a software application running in the foreground and/or background on the device 102/image capture device 110/server(s) 112. The panning generator module 1524 may control the device 102/image capture device 110/server(s) 112 as discussed above, for example with regard to FIGS. 1, 4, 8, 10 and/or 14. Some or all of the controllers/modules of the panning generator module 1524 may be executable instructions that may be embedded in hardware or firmware in addition to, or instead of, software. In one embodiment, the device 102/image capture device 110/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the device(s) 102/image capture device 110/server(s) 112, as illustrated in FIG. 15, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 16:
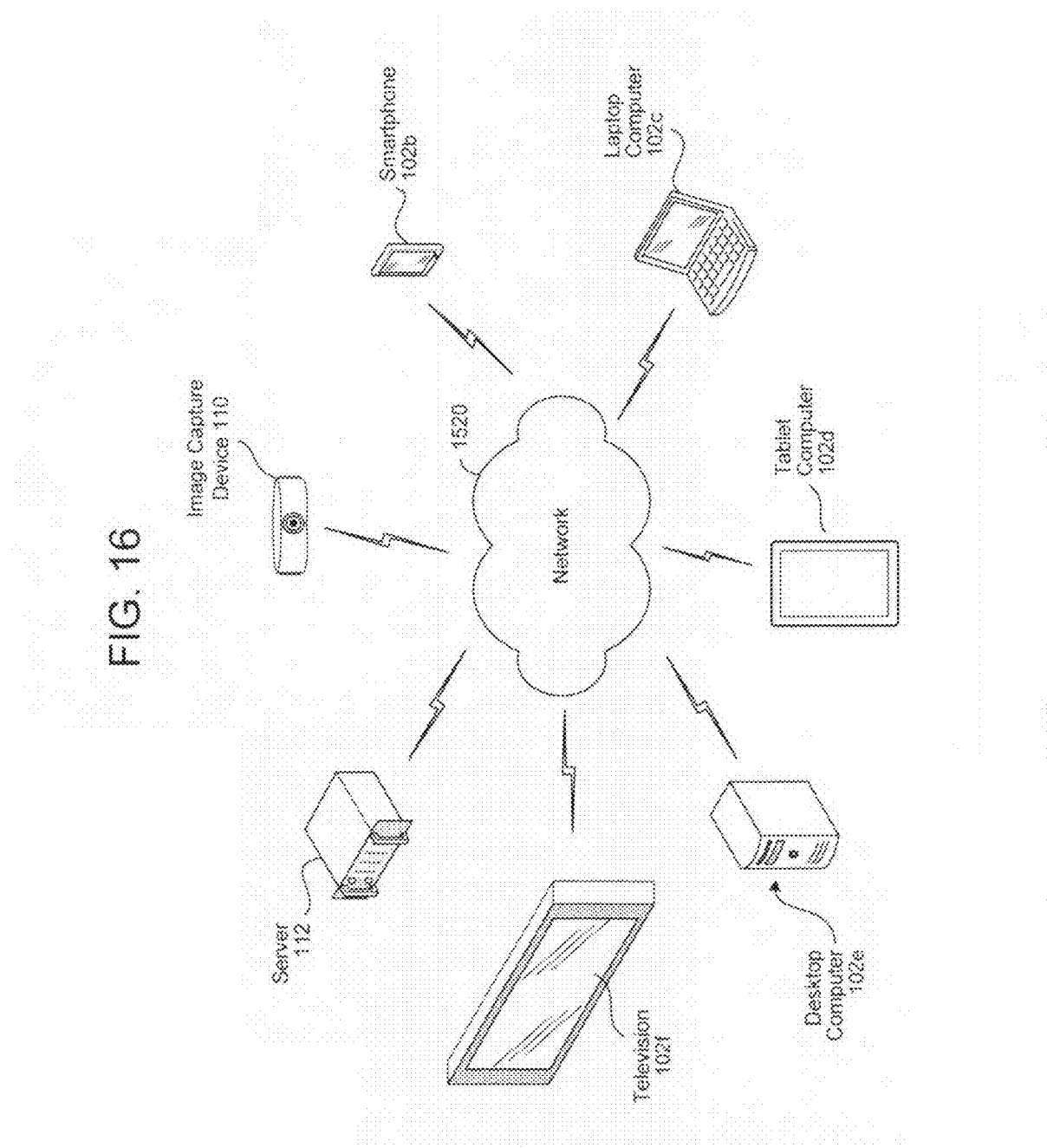
FIG. 16 illustrates an example of a computer network for use with the system.

As shown in FIG. 16, multiple devices may be connected over a network 1520. The network 1520 may include a local or private network or may include a wide network such as the internet. Devices may be connected to the network 1520 through either wired or wireless connections. For example, a smart phone 102b may be connected to the network 1520 through a wireless service provider. Other devices, such as an image capture device 110, laptop computer 102c, tablet computer 102d, desktop computer 102e, television 102f, and/or server(s) 112, may connect to the network 1520 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 4, 8, 10 and/or 14. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating a video clip, the method comprising:
   receiving, from a remote device, panoramic video data comprising panoramic video frames that have a first aspect ratio greater than 2:1, the panoramic video data representing a wide field of view surrounding a panoramic image capture device;
   displaying, during operation of a video editing application, the panoramic video data;
   receiving, during operation of the video editing application, touch inputs that correspond to the panoramic video data;
   generating raw panning data from the touch inputs using a first sampling rate, wherein the raw panning data includes a first data point indicating a first angle of view that corresponds to a first video frame of the panoramic video frames;
   generating control points from the raw panning data using a second sampling rate smaller than the first sampling rate, wherein the control points include a first control point that:
      corresponds to the first video frame, and
      has a magnitude equal to a magnitude of the first data point;
   determining a tangent of a portion of the raw panning data that corresponds to the first video frame;
   generating panning curve data that corresponds to the control points and includes a first curve data point corresponding to the first video frame and indicating the first angle of view, wherein a slope of the panning curve data that corresponds to the first video frame is equal to the tangent;
   sending, to the remote device, the panning curve data; and
   receiving, from the remote device, a video clip that has a second aspect ratio smaller than the first aspect ratio and corresponds to portions of the panoramic video data indicated by the panning curve data.

2. The computer-implemented method of claim 1, further comprising:
   displaying, during operation of a video editing application, the video clip;
   receiving, during operation of the video editing application, second touch inputs that correspond to the video clip;
   generating second raw panning data from the second touch inputs using the first sampling rate, wherein the second raw panning data includes a second data point indicating a second angle of view that corresponds to the first video frame;
   determining a second video frame corresponding to a beginning of the second raw panning data;
   determining a first portion of the panning curve data ending at the second video frame;
   generating second control points from the second raw panning data using the second sampling rate, wherein the second control points include a second control point that:
      corresponds to the second video frame, and
      has a magnitude equal to a magnitude of the second data point; and
   generating second panning curve data that corresponds to the second control points and includes a second curve data point corresponding to the first video frame and indicating the second angle of view.

3. The computer-implemented method of claim 1, further comprising:
receiving annotation data associated with the panoramic video data, the annotation data including first annotation data indicating characteristics associated with the first video frame;
selecting, from the first annotation data, a first face represented in the first video frame;
determining, from the first annotation data, first pixel coordinates corresponding to a position of the first face represented in the first video frame;
determining that the first data point of the raw panning data corresponds to the first pixel coordinates;
determining that the raw panning data corresponds to the first face;
determining, from the annotation data, position data corresponding to a position of the first face represented in the panoramic video data; and
generating the panning curve data using the control points and the position data.

4. The computer-implemented method of claim 1, further comprising:
receiving raw magnification data generated using the first sampling rate that includes a second data point indicating a first magnification value corresponding to the first video frame;
generating second control points from the raw magnification data using the second sampling rate, wherein the second control points include a second control point that:
corresponds to the first video frame, and
has a magnitude equal to a magnitude of the second data point;
generating magnification curve data that corresponds to the second control points and includes a second curve data point that corresponds to the first video frame and indicates the first magnification value;
sending, to the remote device, the panning curve data and the magnification curve data; and
receiving, from the remote device, the video clip that has the second aspect ratio and corresponds to portions of the panoramic video data indicated by the panning curve data and the magnification curve data.

5. A computer-implemented method, comprising:
receiving input data that is associated with video data having a first aspect ratio greater than 2:1;
determining a first value from the input data that is associated with a first video frame of the video data, the first value indicating at least one of an angle of view or a magnification value associated with the first video frame;
generating, using the input data, a first control point that:
corresponds to the first video frame, and
has a magnitude equal to the first value;
determining a tangent of a portion of the input data associated with the first video frame; and
generating, using the first control point and the tangent, output curve data that indicates the first value associated with the first video frame, wherein the output curve data is generated by modifying the input data based on the tangent.

6. The computer-implemented method of claim 5, further comprising:
sending, to a remote device, the output curve data; and
receiving, from the remote device, a video clip that:
has a second aspect ratio smaller than the first aspect ratio, and
corresponds to portions of the video data indicated by the output curve data.

7. The computer-implemented method of claim 5, further comprising:
generating, using the output curve data, preview video data that:
has a second aspect ratio smaller than the first aspect ratio, and
corresponds to portions of the video data indicated by the output curve data;
displaying the preview video data;
receiving second input data that:
is associated with the preview video data, and
indicates a second value associated with the first video frame;
determining a second video frame associated with a beginning of the second input data;
determining a first portion of the output curve data ending at the second video frame;
generating, using the second input data, a second control point that:
corresponds to the second video frame, and
has a magnitude equal to the second value;
aligning the second control point with a tangent of the second input data associated with the second video frame; and
generating, using the first portion and the second control point, second output curve data that indicates the second value associated with the first video frame.

8. The computer-implemented method of claim 5, further comprising:
receiving annotation data associated with the video data;
selecting, using the annotation data, a first object represented in the video data;
determining, using the annotation data, first pixel coordinates associated with the first object represented in the first video frame;
determining a second value corresponding to the first pixel coordinates;
determining a difference between the first value and the second value;
determining that the difference is below a threshold;
determining that the input data corresponds to the first object; and
setting the magnitude of the first control point equal to the second value.

9. The computer-implemented method of claim 5, further comprising:
receiving annotation data associated with the video data;
selecting, using the annotation data, a first object represented in the video data;
determining, using the annotation data, first pixel coordinates associated with the first object represented in the first video frame;
determining, using the first pixel coordinates, a second value;
determining a difference between the first value and the second value;
determining that the difference is below a threshold;
determining that the input data corresponds to the first object;
determining, using the annotation data, angle data associated with the first object in the video data; and
generating the output curve data using the angle data.

10. The computer-implemented method of claim 5, further comprising:
   generating, using the output curve data, a second control point that:
      corresponds to the first video frame, and
      has a magnitude equal to the first value;
   determining a second tangent of a portion of the output curve data associated with the first video frame; and
   generating, using the second control point and the second tangent, second output curve data that indicates the first angle associated with the first video frame.

11. The computer-implemented method of claim 5, further comprising:
   determining a first difference between a second value in the input data that is associated with a second video frame of the video data and a third value in the input data that is associated with a third video frame of the video data;
   determining that the first difference is above a threshold;
   determining a second difference between the third value and a fourth value in the input data that is associated with a fourth video frame of the video data;
   determining that the second difference is above the threshold;
   removing the third value from the input data;
   determining a first slope between the second value and the fourth value;
   determining that the first slope is above a second threshold;
   generating a second control point that:
      corresponds to the second video frame; and
      has a magnitude equal to the second value.

12. The computer-implemented method of claim 5, further comprising:
   receiving the input data generated using a first sampling rate;
   generating, using the input data, the first control point, wherein the first control points is a Bézier point generated using a second sampling rate lower than the first sampling rate;
   determining a handle associated with the first control point using the tangent; and
   generating, using the first control point and the tangent, the output curve data including one or more Bézier curves.

13. A system, comprising:
   at least one processor;
   memory including instructions operable to be executed by the at least one processor to cause the system to:
      receive input data that is associated with video data having a first aspect ratio greater than 2:1;
      determine a first value from the input data that is associated with a first video frame of the video data, the first value indicating at least one of an angle of view or a magnification value associated with the first video frame;
      generate, using the input data, a first control point that:
         corresponds to the first video frame, and
         has a magnitude equal to the first value;
      determine a tangent of a portion of the input data associated with the first video frame; and
      generate, using the first control point and the tangent, output curve data that indicates the first value associated with the first video frame, wherein the output curve data is generated by modifying the input data based on the tangent.

14. The system of claim 13, wherein the memory further comprises instructions that, when executed by the at least one processor, further cause the system to:
   send, to a remote device, the output curve data; and
   receive, from the remote device, a video clip that:
      has a second aspect ratio smaller than the first aspect ratio, and
      corresponds to portions of the video data indicated by the output curve data.

15. The system of claim 13, wherein the memory further comprises instructions that, when executed by the at least one processor, further cause the system to:
   generate, using the output curve data, preview video data that:
      has a second aspect ratio smaller than the first aspect ratio, and
      corresponds to portions of the video data indicated by the output curve data;
   display the preview video data;
   receive second input data that:
      is associated with the preview video data, and
      indicates a second value associated with the first video frame;
   determine a second video frame associated with a beginning of the second input data;
   determine a first portion of the output curve data ending at the second video frame;
   generate, using the second input data, a second control point that:
      corresponds to the second video frame, and
      has a magnitude equal to the second value;
   align the second control point with a tangent of the second input data associated with the second video frame; and
   generate, using the first portion and the second control point, second output curve data that indicates the second value associated with the first video frame.

16. The system of claim 13, wherein the memory further comprises instructions that, when executed by the at least one processor, further cause the system to:
   receive annotation data associated with the video data;
   select, using the annotation data, a first object represented in the video data;
   determine, using the annotation data, first pixel coordinates associated with the first object represented in the first video frame;
   determine a second value corresponding to the first pixel coordinates;
   determine a difference between the first value and the second value;
   determine that the difference is below a threshold;
   determine that the input data corresponds to the first object; and
   set the magnitude of the first control point equal to the second value.

17. The system of claim 13, wherein the memory further comprises instructions that, when executed by the at least one processor, further cause the system to:
   receive annotation data associated with the video data;
   select, using the annotation data, a first object represented in the video data;
   determine, using the annotation data, first pixel coordinates associated with the first object represented in the first video frame;
   determine, using the first pixel coordinates, a second value;
   determine a difference between the first value and the second value;

determine that the difference is below a threshold;
determine that the input data corresponds to the first object;
determine, using the annotation data, angle data associated with the first object in the video data; and
generate the output curve data using the angle data.

18. The system of claim 13, wherein the memory further comprises instructions that, when executed by the at least one processor, further cause the system to:
generate, using the output curve data, a second control point that:
corresponds to the first video frame, and
has a magnitude equal to the first value;
determine a second tangent of a portion of the output curve data associated with the first video frame; and
generate, using the second control point and the second tangent, second output curve data that indicates the first angle associated with the first video frame.

19. The system of claim 13, wherein the memory further comprises instructions that, when executed by the at least one processor, further cause the system to:
determine a first difference between a second value in the input data that is associated with a second video frame of the video data and a third value in the input data that is associated with a third video frame of the video data;
determine that the first difference is above a threshold;
determine a second difference between the third value and a fourth value in the input data that is associated with a fourth video frame of the video data;
determine that the second difference is above the threshold;
remove the third value from the input data;
determine a first slope between the second value and the fourth value;
determine that the first slope is above a second threshold;
generate a second control point that:
corresponds to the second video frame; and
has a magnitude equal to the second value.

20. The system of claim 13, wherein the memory further comprises instructions that, when executed by the at least one processor, further cause the system to:
receive the input data generated using a first sampling rate;
generate, using the input data, the first control point, wherein the first control point is a Bézier point generated using a second sampling rate lower than the first sampling rate;
determine a handle associated with the first control point using the tangent; and
generate, using the first control point and the tangent, the output curve data including one or more Bézier curves.

* * * * *